US007882083B2

(12) United States Patent
Kataoka et al.

(10) Patent No.: US 7,882,083 B2
(45) Date of Patent: Feb. 1, 2011

(54) INFORMATION RETRIEVAL APPARATUS, INFORMATION RETRIEVAL METHOD AND COMPUTER PRODUCT

(75) Inventors: Masahiro Kataoka, Kawasaki (JP); Takashi Yamashita, Kawasaki (JP); Kenji Furuichi, Kawasaki (JP); Takashi Tsubokura, Setagaya (JP)

(73) Assignee: Fujitsu Limited, Kawasaki (JP)

( * ) Notice: Subject to any disclaimer, the term of this patent is extended or adjusted under 35 U.S.C. 154(b) by 356 days.

(21) Appl. No.: 11/985,101

(22) Filed: Nov. 14, 2007

(65) Prior Publication Data

US 2008/0098024 A1 Apr. 24, 2008

Related U.S. Application Data

(63) Continuation of application No. PCT/JP2005/021791, filed on Nov. 28, 2005.

(30) Foreign Application Priority Data

May 20, 2005 (WO) .................. PCT/JP2005/009283

(51) Int. Cl.
*G06F 17/30* (2006.01)
(52) U.S. Cl. ...................... 707/692; 707/693
(58) Field of Classification Search ................. 707/101, 707/693, 692
See application file for complete search history.

(56) References Cited

U.S. PATENT DOCUMENTS

| 4,700,175 | A | * | 10/1987 | Bledsoe | ........................ | 341/65 |
| 5,748,953 | A | * | 5/1998 | Mizutani et al. | ............... | 707/6 |
| 6,529,912 | B2 | * | 3/2003 | Satoh et al. | ................. | 707/101 |
| 2003/0079183 | A1 | | 4/2003 | Tada et al. | | |
| 2005/0235014 | A1 | * | 10/2005 | Schauser et al. | ............ | 707/204 |

FOREIGN PATENT DOCUMENTS

JP 04-274557 9/1992

(Continued)

OTHER PUBLICATIONS

Shuichi Fukamachi et al.; "Asshuku Data no tame no Kosoku Mojiretsu Pattern Shogo Gijutsu": Information Processing Society of Japan Dai 43 Kai (Heisei 3 Nen Koki) Zenkoku Taikai Koen Ronbunshu (4); Oct. 19, 1991; pp. 83-84.

(Continued)

*Primary Examiner*—John E Breene
*Assistant Examiner*—Dennis Myint
(74) *Attorney, Agent, or Firm*—Greer, Burns & Crain, Ltd.

(57) ABSTRACT

An information retrieval apparatus includes contents, an index data generating unit, a character frequency management data generating unit, a compressing/encrypting unit, a retrieval initializing unit, a full text retrieving unit, and a retrieval result displaying unit. The character frequency management data generating unit generates character frequency management data based on the contents. The compressing/encrypting unit compresses the contents and encrypts the character frequency management data. The retrieval initializing unit decrypts encrypted character frequency management data. The full text retrieving unit executes full text retrieval for compressed contents using the character frequency management data and index data when receiving a retrieval keyword. The retrieval result displaying unit decompresses a retrieval candidate selected from retrieval candidates and displays as a retrieval result.

17 Claims, 45 Drawing Sheets

FOREIGN PATENT DOCUMENTS

| | | |
|---|---|---|
| JP | 07-182354 | 7/1995 |
| JP | 2817103 | 8/1998 |
| JP | 2835335 | 10/1998 |
| JP | 2002-351736 | 12/2002 |
| WO | WO 99/21092 | 4/1999 |

OTHER PUBLICATIONS

Haruhiko Okumura; "Asshuku Algorithm Nyumon LHarc to Shin LH no Sakusei"; C Magazine, vol. 3, No. 1, Jan. 1, 1991; pp. 44-58.

Shuichi Fukamachi et al.; "Kahencho Fugo Asshuku Data no tame no Mojiretsu Pattern Shogo—Gemon Joho no Kosoku Kensaku Giho"; 1992 Proceedings of the Symposium on Informatics; Jan. 9, 1992; pp. 95-103.

Samuel T. Klein et al.; "Pattern matching in Huffman encoded texts"; Information Processing and Management; vol. 41, Issue 4; Jul. 2005; pp. 829-841.

Japanese Office Action and its partial English translation issued in corresponding Japanese application No. 2007-516202 on Aug. 24, 2010.

* cited by examiner

FIG.5

| FILE NUMBER | FILE PATH (FOLDER RELATIVE PATH) |
|---|---|
| #0 | honmon¥file0.html |
| #1 | honmon¥file1.html |
| ⋮ | ⋮ |
| #n | honmon¥filen.html |

FIG.9

| CHARACTER DATA | OCCUR-RENCE FREQUENCY (COUNTS) | OCCUR-RING FILE NUMBER | OCCUR-RENCE ORDER | OCCURRENCE MAP |
|---|---|---|---|---|
| A | 1,238 | 230 | 102 | 1011000110110011011011101··· ···0110111001 |
| z | 635 | 157 | 135 | 1000101111000101010011··· |
| あ | 14,397 | 382 | 58 | 1101110111111001111··· |
| ん | 5,392 | 436 | 72 | 1011111011111101101··· |
| 亜 | 14,397 | 382 | 1,249 | 1101110111111001111··· |
| 運 | 5,392 | 436 | 4,531 | 1011111011111101101··· |
| SUPPLEMENTARY CHARACTER 1 | 14,397 | 382 | 6,731 | 1101110111111001111··· |
| SUPPLEMENTARY CHARACTER n | 5,392 | 436 | 6,940 | 1011111011111101101··· |
| COMBINED CHARACTER-SUPPLEMENTARY CHARACTER 1 | 1,238 | 230 | 1,235 | 1011000110110011011011101··· |
| COMBINED CHARACTER-SUPPLEMENTARY CHARACTER 256 | 635 | 157 | 2,045 | 1000101111000101010011··· ···0110111001 |

900 901 902 903 904

SEGMENT 0 (16-BIT BOUNDARY)

FIG.10

| CHARACTER DATA 900 | OCCUR-RENCE FREQUENCY (COUNTS) 901 | OCCURRENCE MAP 904 |
|---|---|---|
| 日 | 14,397 | 11011101111001111··· |
| 月 | 8,372 | 10111111011101101··· |
|  | 5,742 | 10111111011101101··· |
|  |  | 11011101111001111··· |
| は | 2,843 | 10111110111101101··· |
|  |  | 11011101111001111··· |
| f | 268 | 10111111011101101··· |
| COMBINED CHARACTER-SUPPLEMENTARY CHARACTER 1 | 3,238 | 10110001101100101101··· |
| COMBINED CHARACTER-SUPPLEMENTARY CHARACTER 256 | 335 | 10001011100010101001··· ···0110111001 |

900b, 900a

- 1501: BLOCK NUMBER (m)
- 1502: ADDRESS INFORMATION (#1) ... ADDRESS INFORMATION (#m)
- 1503: COMPRESSED BLOCK DATA C1 ... COMPRESSED BLOCK DATA Cm

| COMPRESSED BLOCK DATA | | | ORIGINAL BLOCK DATA | | |
|---|---|---|---|---|---|
| | OFFSET | LENGTH | OFFSET | CHARACTER NUMBER | LENGTH |
| C1 | 100 | 1780 | 0 | 4000 | 3575 |
| C2 | 1880 | 1695 | 3575 | 4000 | 3275 |
| . | . | . | . | . | . |
| . | . | . | . | . | . |
| . | . | . | . | . | . |
| . | . | . | . | . | . |
| Cm | 16420 | 160 | 32770 | 352 | 320 |

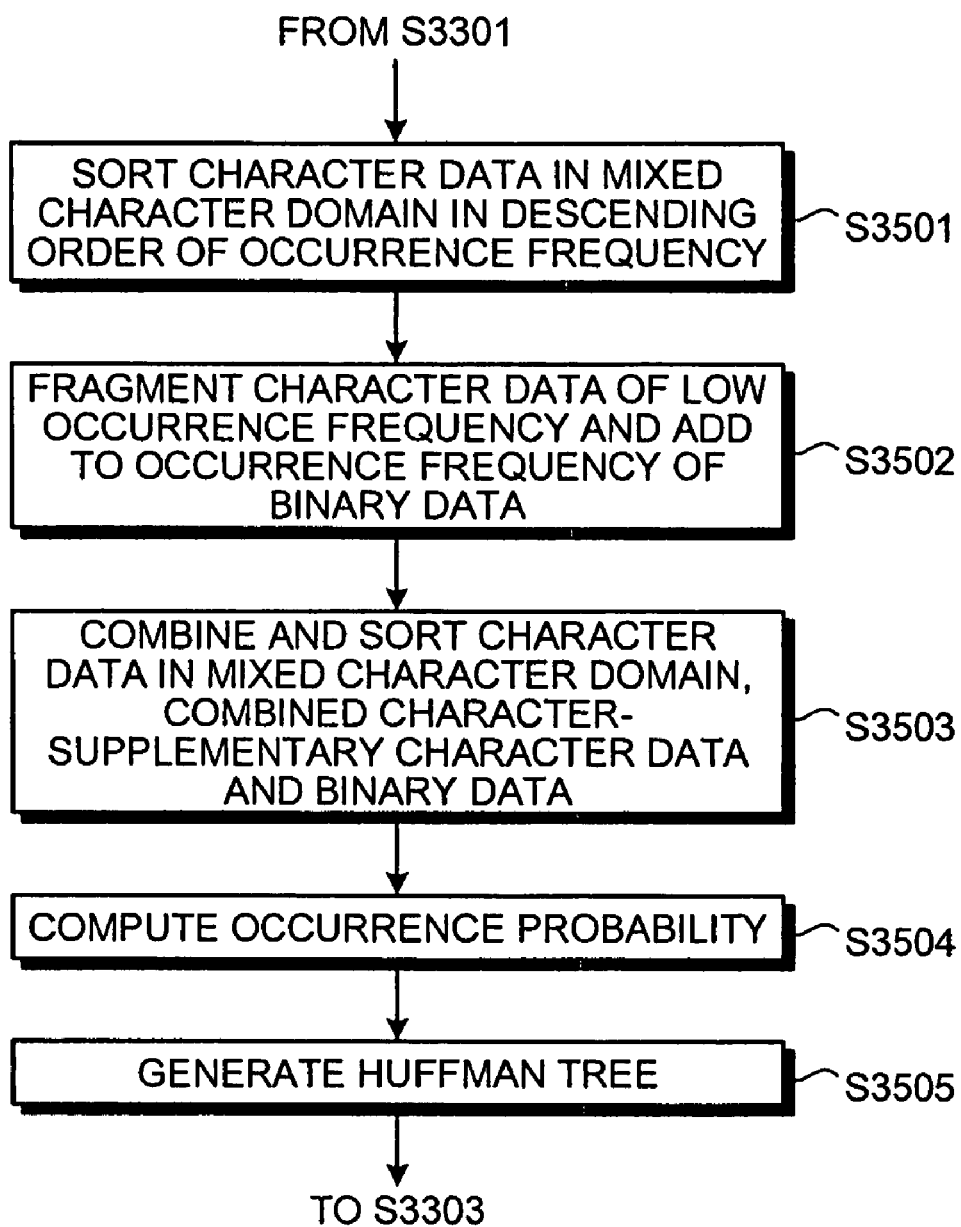

FIG.38

| COMPRESSED KEYWORD LENGTH [bit] | VERIFICATION INTERVAL [byte] | VERIFICATION DETERMINATION [bit] | NOTE |
|---|---|---|---|
| 64~ | 7 | 8 | |
| 56~63 | 6 | 8 | |
| 48~55 | 5 | 8 | |
| 40~47 | 4 | 8 | |
| 32~39 | 3 | 8 | |
| 24~31 | 2 | 8 | |
| 16~23 | 1 | 8 | |
| 11~15 | 1 | 3~7 | COMPENSATE TAIL BITS |
| 01~10 | - | - | EXECUTE DISCREPANCY VERIFICATION AFTER DECOMPRESSION OF CHARACTER STRINGS |

FIG.45

| RETRIEVAL KEYWORD "増殖細胞" | FILE NUMBER OF TEXT HTML FILE | | | |
|---|---|---|---|---|
| | #0 | #1 | #2 | #3 |
| PRESENCE/ABSENCE FLAG ROW OF "増" | 1 | 1 | 0 | 0 |
| PRESENCE/ABSENCE FLAG ROW OF "殖" | 0 | 1 | 1 | 0 |
| PRESENCE/ABSENCE FLAG ROW OF "細" | 0 | 1 | 1 | 0 |
| PRESENCE/ABSENCE FLAG ROW OF "胞" | 0 | 1 | 0 | 0 |
| NARROWING RESULT | 0 | 1 | 0 | 0 |

INFORMATION RETRIEVAL APPARATUS, INFORMATION RETRIEVAL METHOD AND COMPUTER PRODUCT

CROSS-REFERENCE TO RELATED APPLICATIONS

This is a continuation filed under 35 U.S.C. §111(a), of International Application No. PCT/JP2005/021791, filed Nov. 28, 2005.

This application is based upon and claims the benefit of priority from the prior Foreign Application PCT/JP2005/009283, filed on May 20, 2005, the entire contents of which are incorporated herein by reference.

BACKGROUND OF THE INVENTION

1. Field of the Invention

The present invention relates to an information retrieval apparatus and method that also compress and encrypt.

2. Description of the Related Art

Content for a dictionary or the like is conventionally configured with a single file described in 16-bit code character data following Japanese Industrial Standard, JIS X4081 is compressed by a compression technique such as, International Patent Application No. WO 99-21092.

The compression technique recited in International Patent Application No. WO 99-21092 pamphlet can retrieve and display content in a compressed form. The content is blocked into 2 KB blocks and then compressed using a conventional Huffman tree, and is decompressed in blocks when retrieved. The technique is based on Huffman compression resulting in the fastest decompression compared to other compression schemes. To reduce the Huffman tree, 16-bit code characters of low occurrence frequencies are substituted with two 8-bit code characters and compressed. The compression technique can compress not only characters but also binary data such as address pointers.

In recent years, however, content in Hypertext Markup Language (HTML) format has abruptly increased with the propagation of the Internet. Content in HTML format employs Shift JIS code and the like, including character data in 8-bit, 16-bit, and 32-bit codes mixed, and is configured not with a single file but with a plurality of files. Index search technology has also been established in recent years for improving retrieval efficiency.

However, even with this index search technology, needs are rising for the utilization and storage of retrieved content of a large-volume in a portable terminal, such as a mobile phone or a portable digital assistant (PDA), without decompression. Needs for the encrypting of retrieved content are also rising to prevent falsification and/or to protect data copyrights. Needs are also rising for faster full text retrieval.

With full text retrieval, a retrieval process of comparing input keywords and character strings of each text file is executed. The process involves the opening and closing of individual text files, a time consuming task that impedes the speed of the process. To overcome this obstacle, a system has been proposed aiming to speed up full text retrieval by adding full text retrieval indices. Another system has also been proposed aiming to speed up the full text retrieval by reducing the number of files by linking files. An engine or the like capable of fast comparisons and employing automaton theory is used for comparing keywords and character strings.

Conventional techniques of Japanese Patent Nos. 2817103 and 2835335 disclose a method that obtain faster full text retrieval by extracting and then utilizing occurrence frequency and addresses of each character of retrieval target data.

A conventional technique of Japanese Patent Application Laid-Open Publication No. 4-274557 discloses a full text retrieval method that extracts characters from a text of a document to be registered for each character type and that creates a character occurrence bitmap of one-bit information indicating characters occurring in the text. During retrieval, the full text retrieval method refers to the character occurrence bitmap, selects only documents that include all of the characters in a character string targeted for retrieval, and from the selected documents, extracts only documents that include the retrieval character string in their texts.

However, with the increased prevalence of HTML format and the increasing number of files, such as with content for dictionaries, a problem of decreased compression efficiency of the content has arisen. For example, the conventional technique recited the International Patent Application No. WO 99-21092 does not support the compression of files that included mixed character data of 8-bit, 16-bit, and 32-bit codes, such as Shift JIS code, resulting in a problem of reduced compression efficiency for content targeted for retrieval and including Shift JIS code.

Since each file of content is formed by blocks having a fixed even number of bytes when compressed, there is a problem in that separation of a character string occurred at boundaries of blocks, and thus retrieval precision of compressed content was reduced. There is a problem in that the conventional technique can not sum the occurrence frequency for each character data if 8-bit character data is included as the conventional technique sums the occurrence frequency only for 16-bit character data, and thus compression rate is drastically reduced.

There was a problem that compression rate was reduced if a file includes a large volume of phonogram data such as alphanumeric characters and/or Japanese kana/katakana characters (hereinafter, "kana characters" and "katakana characters").

To prevent falsification and to protect content data copyrights, needs for encryption have been rising. However, a problem of reduced retrieval speed due to the time required for full text retrieval of each file of the content targeted for retrieval and the decrypting process for display.

Although a conventional technique has aimed to increase full text retrieval speed by allocating full text retrieval indices, there is a problem in that the volume of highly compressed content is still large as the volume of the full text retrieval indices is large. With the method aiming for increased speed by the linking of files, a problem arises in that file size becomes rather enormous, necessitating increased memory for retrieval.

Thus there is a problem in that storage of the content in a portable terminal, such as a mobile phone or a PDA, or a standalone personal computer is difficult.

There is a problem that full text retrieval speed is reduced if each file of the content targeted for retrieval includes phonogram data such as alphanumeric characters and/or kana/katakana characters.

While comparison is made for every one byte or character in verification of a character string of uncompressed data, comparison needs to be made shifting every one bit for compressed data as identification of boundaries among characters is difficult. However, bit-by-bit operation of compressed file is difficult for a computer, and thus there is a problem in that verification speed is reduced as a result, such as in the conventional technique of Japanese Patent Application Laid-Open Publication No. 4-274557.

As for data such as additional data for files in large number and electronic forms (monthly aggregation table) that has a consistent population, names and addresses of customers and names of items appearing do not change, and parameters of Huffman compression are substantially similar. Since electronic forms have large processing volumes, increased speed of compression/encryption is desired.

SUMMARY OF THE INVENTION

It is an object of the present invention to at least solve the above problems in the conventional technologies.

A computer-readable recording medium according to one aspect of the present invention, stores therein an information retrieval program to retrieve information from content that includes a plurality of files, and causes a computer to execute extracting character data described in a plurality of target files to be retrieved from the content; computing an occurrence frequency of the character data; detecting a presence/absence of the character data in each of the target files; and generating compression information of the content including the occurrence frequency of each of the character data in the content, and presence/absence information of each of the character data in each of the target files.

A computer-readable recording medium according to another aspect of the present invention, stores therein an information retrieval program to retrieve information from content that includes a plurality of files, and causes a computer to execute extracting a first character data described in a first target file to be retrieved from the content; computing an occurrence frequency of the first character data; detecting a presence/absence of the first character data; generating a first compression information of the first target file including the occurrence frequency of each of the first character data in the first target file, and presence/absence information of each of the first character data detected at the detecting the presence/absence of the first character data; generating a Huffman tree based on the first compression information; extracting a second character data described in a second target file to be retrieved from the content; computing an occurrence frequency of the second character data; detecting a presence/absence of the second character data; compressing, using the Huffman tree, the second character data detected at the detecting the presence/absence of the second character data; generating a second compression information of the content including the occurrence frequencies of each of the first character data and each of the second character data in the content, and the presence/absence information of each of the first character data and each of the second character data that are detected at the detecting; and encrypting the second compression information.

An information retrieval method according yet another aspect of the present invention and for retrieving information from content that includes a plurality of files, includes extracting character data described in a plurality of target files to be retrieved from the content; computing an occurrence frequency of the character data; detecting a presence/absence of the character data in each of the target files; and generating compression information of the content including the occurrence frequency of each of the character data in the content, and presence/absence information of each of the character data in each of the target files.

An information retrieval apparatus that retrieves information from content that includes a plurality of files according to still another aspect of the present invention, includes an extracting unit that extracts character data described in a plurality of target files to be retrieved from the content; a computing unit that computes an occurrence frequency of the character data; a detecting unit that detects a presence/absence of the character data in each of the target files; and a generating unit that generates compression information of the content including the occurrence frequency of each of the character data in the content, and presence/absence information of each of the character data in each of the target files.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is a diagram of file configuration data of a text HTML file;

FIG. 9 is a diagram of a data configuration (B) shown in FIG. 8;

FIG. 10 is a diagram of a data configuration (E) shown in FIG. 8;

FIG. 35 is a flowchart of the Huffman tree generating process shown in FIG. 33;

FIG. 38 is a table of shift operation of the compressed block data shown in FIG. 37;

FIG. 45 is a schematic of narrowing.

DETAILED DESCRIPTION OF THE PREFERRED EMBODIMENTS

Referring to the accompanying drawings, exemplary embodiments according to the present invention are explained in detail below.

Figure 1:
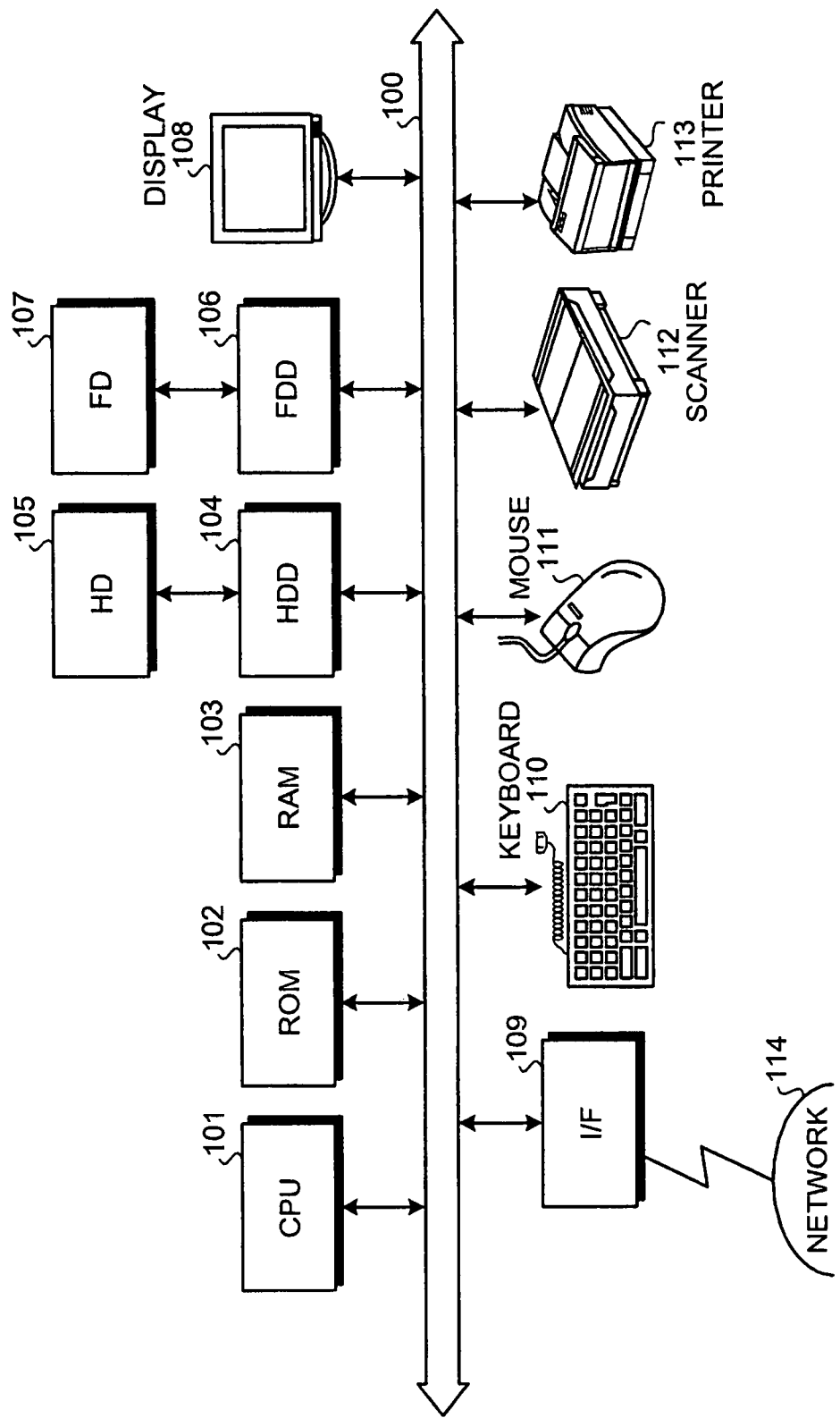
FIG. 1 is a diagram of an information retrieval apparatus according to a first embodiment of the present invention.

FIG. 1 is a diagram of an information retrieval apparatus according to the first embodiment of the present invention. The information retrieval apparatus includes a CPU 101, a ROM 102, a RAM 103, a hard disc drive (HDD) 104, a hard disc (HD) 105, a flexible disc drive (FDD) 106, a flexible disc (FD) 107 as a removable recording medium, a display 108, an interface (I/F) 109, a keyboard 110, a mouse 111, a scanner 112, and a printer 113. The components are interconnected by a bus 100.

The CPU 101 controls the entire information retrieval apparatus. The ROM 102 stores programs such as a boot program. The RAM 103 is used as a work area of the CPU 101. The HDD 104 controls the reading/writing on the HD 105 under the control of the CPU 101. The HD 105 stores data written thereto under the control of the HDD 104.

The FDD 106 controls reading/writing on the FD 107 under the control of the CPU 101. The FD 107 stores data written thereto under the control of the FDD 106 and enables the information retrieval apparatus to read the stored data.

In addition to the FD 107, a compact disk read-only memory (CD-ROM) (compact disk-recordable (CD-R), compact disc-rewritable (CD-RW)), a magneto optical disk (MO), a digital versatile disk (DVD), and a memory card may be employed as a removable recording medium. The display 108 displays a cursor, icons, tool boxes and/or data such as text, images, and function information. As the display 108, for example, a cathode ray tube (CRT), a thin-film-transistor (TFT) liquid crystal display, a plasma display, etc, may be employed.

The I/F 109 is connected to a network 114 such as the Internet through a communication line connected to other devices via the network 114. The I/F 109 functions as an interface between the network 114 and units of the information retrieval apparatus and controls the input and output of data to and from external devices. A modem or a local area network (LAN) adapter, for example, may be employed as the I/F 109.

The keyboard 110 has keys to input characters, numerals, various commands, etc., and inputs data. A touch-panel input pad or a numeric keypad may be substituted for the keyboard 110. The mouse 111 is used for moving a cursor, range selection, and/or for moving and changing the size of a window. A trackball, or a joystick having functions of a pointing device, may be employed.

The scanner 112 optically reads images and takes in data of the images into the information retrieval apparatus. The scanner 112 may have an optical character recognition (OCR) function. The printer 113 prints image data and text data. A laser printer or an inkjet printer, for example, is employed as the printer 113.

Figure 2:
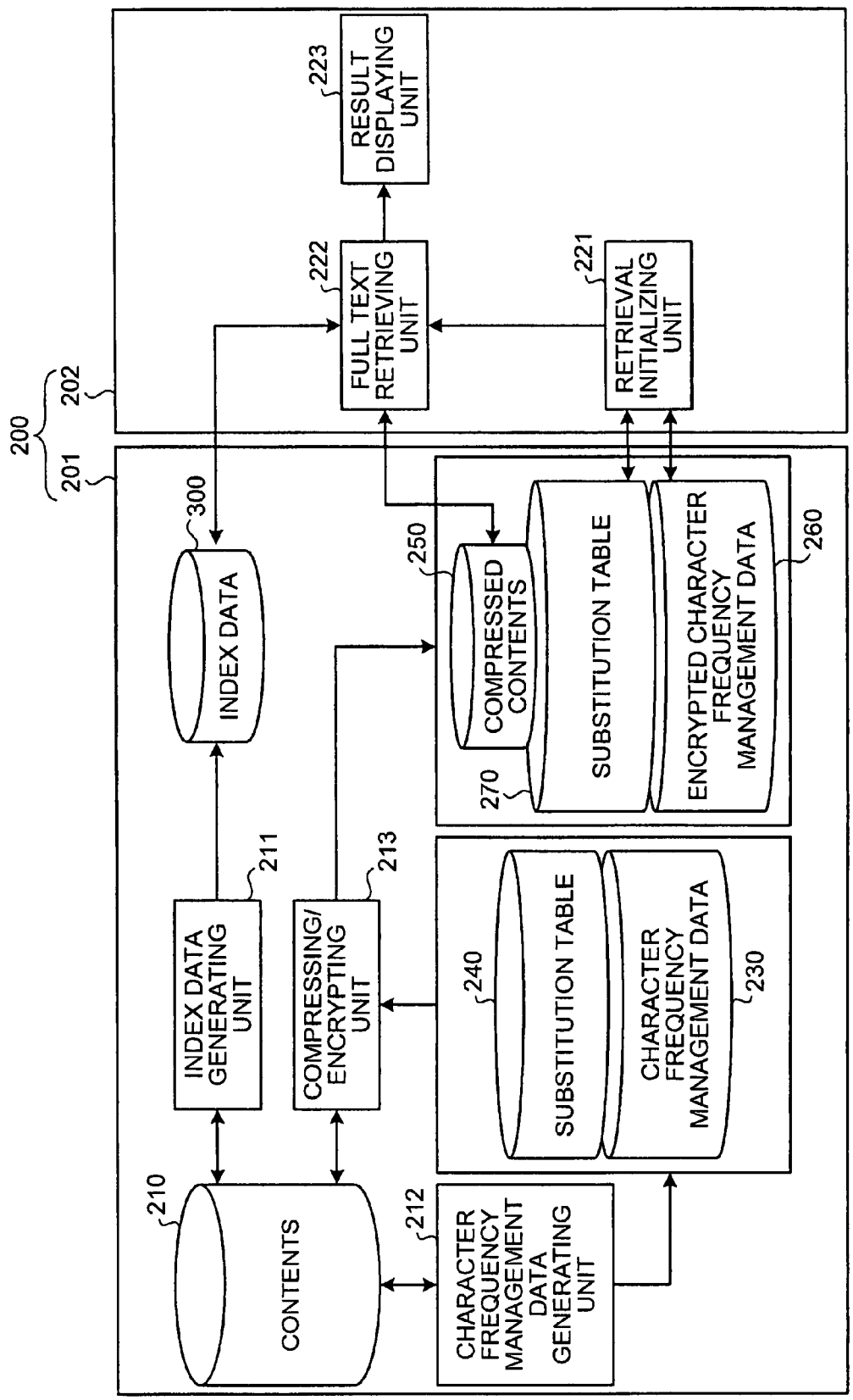
FIG. 2 is a function diagram of an information retrieval apparatus according to the first embodiment of the present invention.

FIG. 2 is a function diagram of an information retrieval apparatus 200 according to the first embodiment of the present invention. The information retrieval apparatus 200 includes an editing unit 201 and a retrieval processing unit 202.

The editing unit 201 includes content 210, an index data generating unit 211, a character frequency management data generating unit 212, and a compressing/encrypting unit 213. The content 210 includes electronic data that is a retrieval target such as dictionary content of, for example, a Japanese dictionary, an English-Japanese dictionary, a Japanese-English dictionary, a glossary, etc.

The content includes a plurality of files to be retrieved. If the content 210 is dictionary content, each file to be retrieved is a text HTML file including character data of plural types of bit code such as, 8-bit code, 16-bit code, 32-bit code, etc.

Each file includes character data such as alphanumeric characters, katakana characters, symbols, etc. of 8-bit series (American Standard Code for Information Interchange (ASCII)), alphanumeric characters, katakana characters, symbols, etc. of 16-bit series (JIS), and kana characters and kanji characters of 16-bit series (JIS). Character data of phonograms such as those alphanumeric characters, kana characters, and katakana characters that are mainly of 8-bit code and kanji characters are referred to as "standard character data" in this specification.

In addition to the standard character data, character data includes supplementary character data and combined character data. The combined character data is character data composed of character strings of more than two characters. For example, in the case of a combined character data of two 16-bit kana characters, the combined character data is composed of 32-bit code character data. Although binary data such as an address pointer is non-character data, binary data is also included in the "character data" for convenience. Hereinafter, binary data is also included in the term "character data" unless otherwise specified.

The index data generating unit 211 generates index data 300 related to character strings such as words and terms described in the content 210, i.e., the plurality of files to be retrieved. The character frequency management data generating unit 212 generates character frequency management data 230 related to occurrence frequencies of character data described in the plurality of files to be retrieved from the content 210. The character frequency management data generating unit 212 also generates a combined character/supplementary character substitution table 240 (hereinafter, "substitution table 240") for substituting, with supplementary character data, combined character data described in the plurality of files to be retrieved.

The compressing/encrypting unit 213 generates compressed content 250 by compressing the content 210, and generates encrypted character frequency management data 260 and an encrypted combined character/supplementary character substitution table 270 (hereinafter, "encrypted substitution table 270") by encrypting the character frequency management data 230 and the substitution table 240, respectively.

The retrieval processing unit 202 includes a retrieval initializing unit 221, a full text retrieving unit 222, and a retrieval result display unit 223. The retrieval initializing unit 221 initializes retrieval by the full text retrieving unit 222 by decrypting compression information such as the encrypted character frequency management data 260 and the encrypted substitution table 270.

The full text retrieving unit 222 receives input of retrieval keywords, executes full text retrieval of the compressed content 250, and generates a list of retrieval candidates using the character frequency management data 230, the substitution table 240, and the index data 300. The retrieval result display unit 223 displays a retrieval result by selecting and decompressing a retrieval candidate selected by a user from the retrieval candidates that are retrieved by the full text retrieving unit 222.

The content 210, the index data 300, the character frequency management data 230, the substitution table 240, the compressed content 250, the encrypted character frequency management data 260, and the encrypted substitution table 270 may be stored on a recording medium such as the ROM 102, the RAM 103, or the HD 105 shown in FIG. 1. The functions of the editing unit 201 (including internal functional configuration) and the retrieval processing unit 202 (including internal functional configuration) are realized by the CPU 101 executing programs stored on the recording medium such as the ROM 102, the RAM 103, or the HD 105 shown in FIG. 1.

Figure 3:
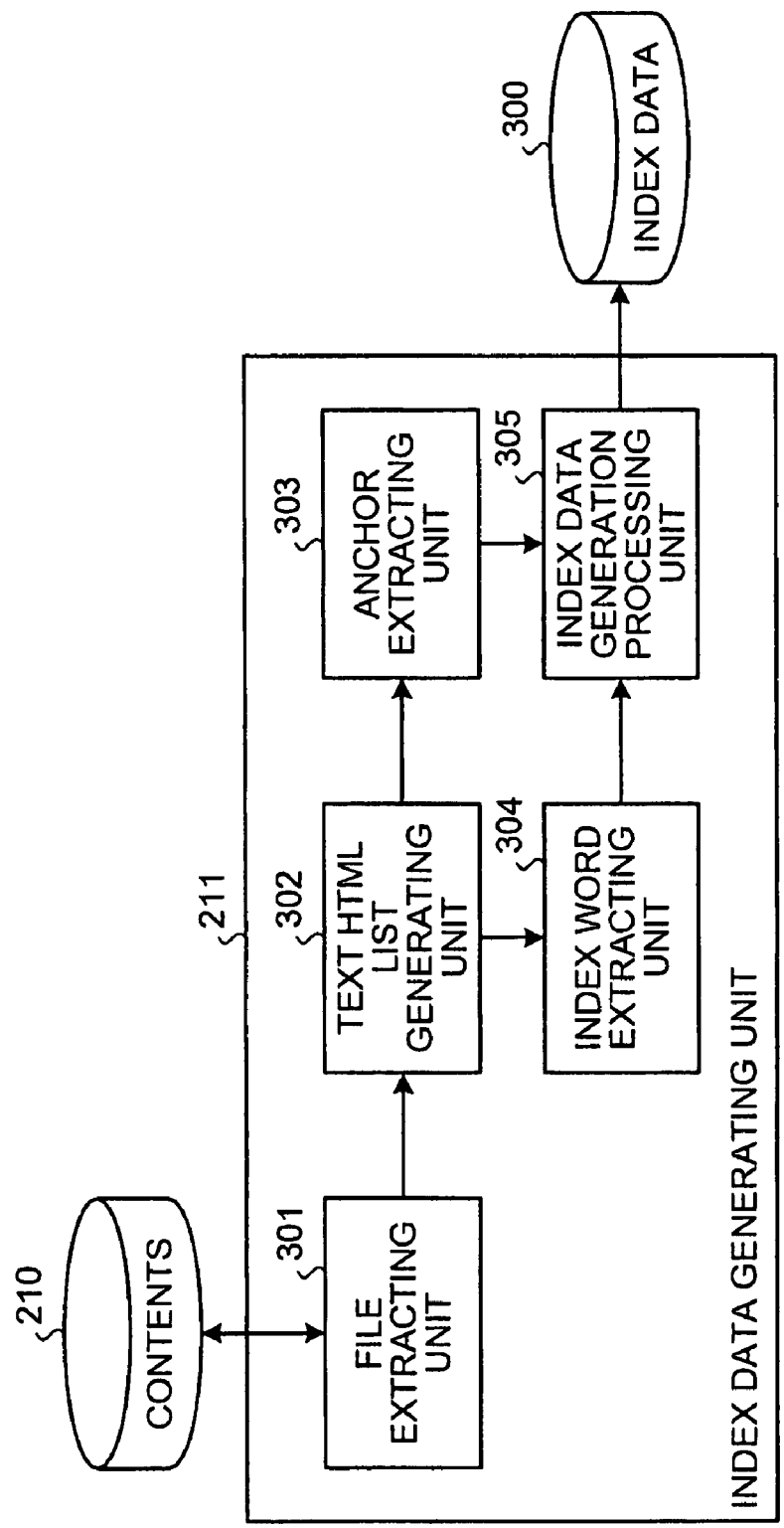
FIG. 3 is a function diagram of an index data generating unit.

FIG. 3 is a function diagram of an index data generating unit 211. The index data generating unit 211 includes a file extracting unit 301, a text HTML list generating unit 302, an anchor extracting unit 303, an index word extracting unit 304, and an index data generation processing unit 305.

The file extracting unit 301 extracts each of the text HTML files that are files to be retrieved from the content 210. The text HTML list generating unit 302 generates a text HTML list composed of a plurality of item data based on each text HTML file extracted by the file extracting unit 301. The anchor extracting unit 303 extracts anchors from each item data of the text HTML list generated by the text HTML list generating unit 302.

The index word extracting unit 304 extracts index words from each item data of the text HTML list generated by the text HTML list generating unit 302. The index data generation processing unit 305 generates index data 300 to be used for full text retrieval by associating the anchor of each item data extracted by the anchor extracting unit 303 with the index word of each item data extracted by the index word extracting unit 304.

Figure 4:
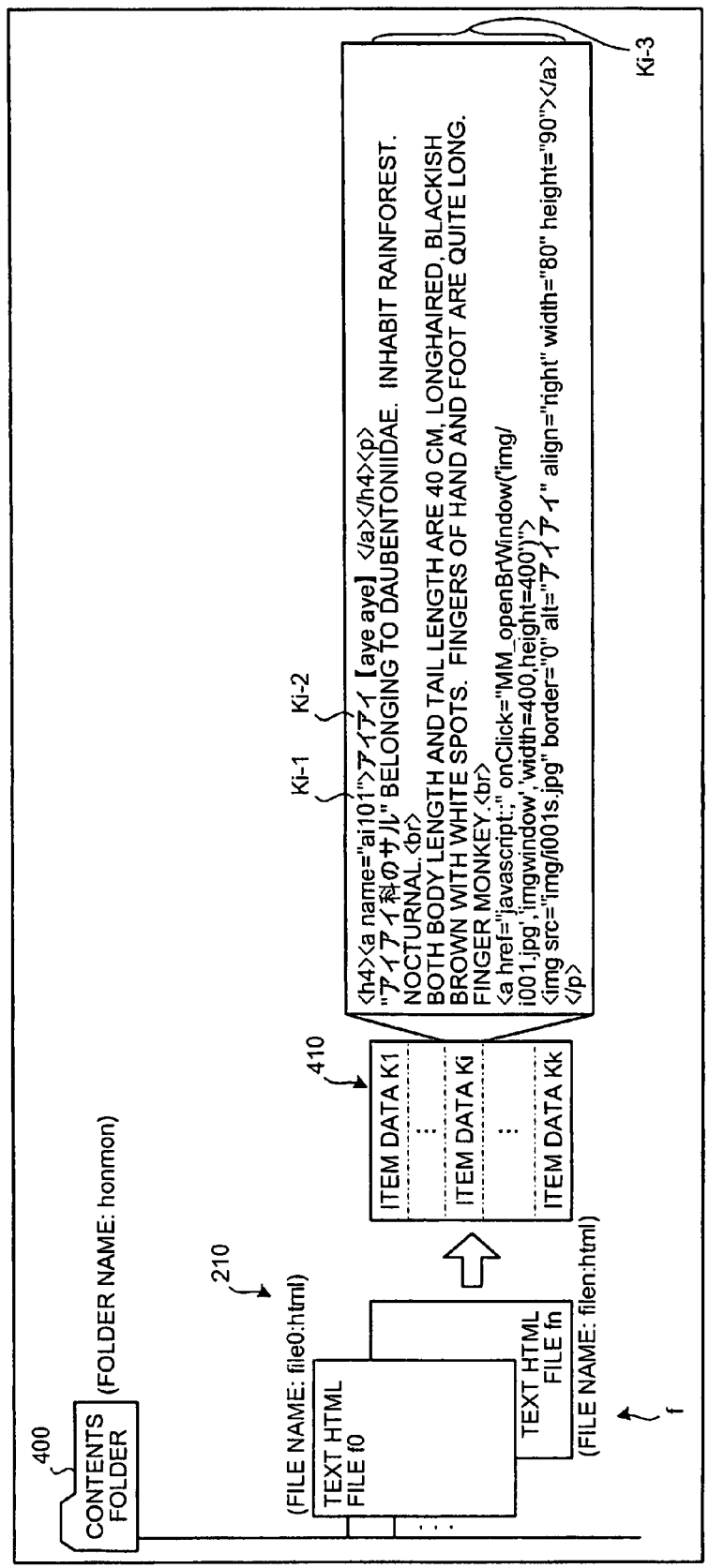
FIG. 4 is a diagram of an exemplary text HTML list.
Figure 6:
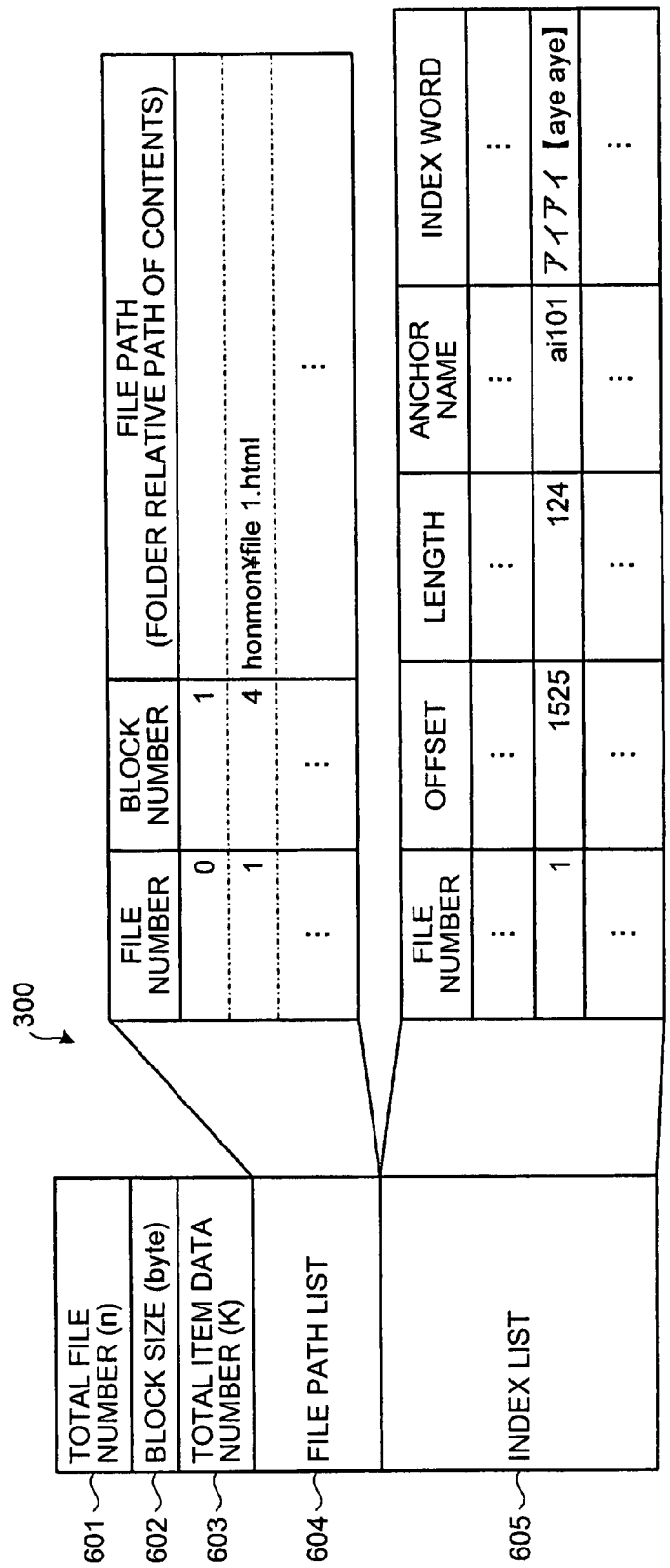
FIG. 6 is a diagram of index data.

FIG. 4 is a diagram of an exemplary text HTML list; FIG. 5 is a diagram of file configuration data 500 of a text HTML file; and FIG. 6 is a diagram of index data 300.

As shown in FIG. 4, a content folder 400 (folder name: honmon) stores text HTML files f from a first text HTML file f0 (file name: file0.html) to a last text HTML file fn (file name: filen.html) as the content 210.

Each of the text HTML files f0 to fn includes a plurality of item data including an anchor, an index word, and its description. The anchor is extracted by the anchor extracting unit 303, and the index word is extracted by the index word extracting unit 304.

The text HTML list generating unit 302 extracts item data described in each of the text HTML files f0 to fn, and generates a text HTML list 410 by combining individual item data K1 to Kk. An arbitrary item data Ki of the text HTML list 410 is an item data described in any of the text HTML files. In the item data Ki, an anchor-Ki-1 is "ai101", and an index word Ki-2 is "アイーアイ 'aye aye'". A reference numeral Ki-3 is a description.

As shown in FIG. 5, file configuration data 500 is data associating file number 501 of each of the text HTML files f0 to fn with file path 502 of each of the text HTML files f0 to fn shown in FIG. 4. The file number corresponds to a number labeled to a text HTML file f, e.g., "#0" is a file number of the text HTML file f0. As a folder name of the content folder 400 is "honmon", and a file name of the text HTML file f0 is "file0.html", a file path of the text HTML file f0 having file number #0 is "honmon\file0.html".

The index data 300 shown in FIG. 6 includes total file number information (n) 601 of text HTML files, total block size information 602 of text HTML files f0 to fn, total item data number information (K) 603 of text HTML list 410, a file path list 604 of each of the text HTML files f0 to fn, and an index list 605.

The file path list 604 is a list describing a file number, the number of blocks, and a file path for each of the text HTML files f0 to fn. The index list 605 is a list describing a file number, an offset value, a length, an anchor (name), and an index word for each of the text HTML files f0 to fn.

Figure 7:
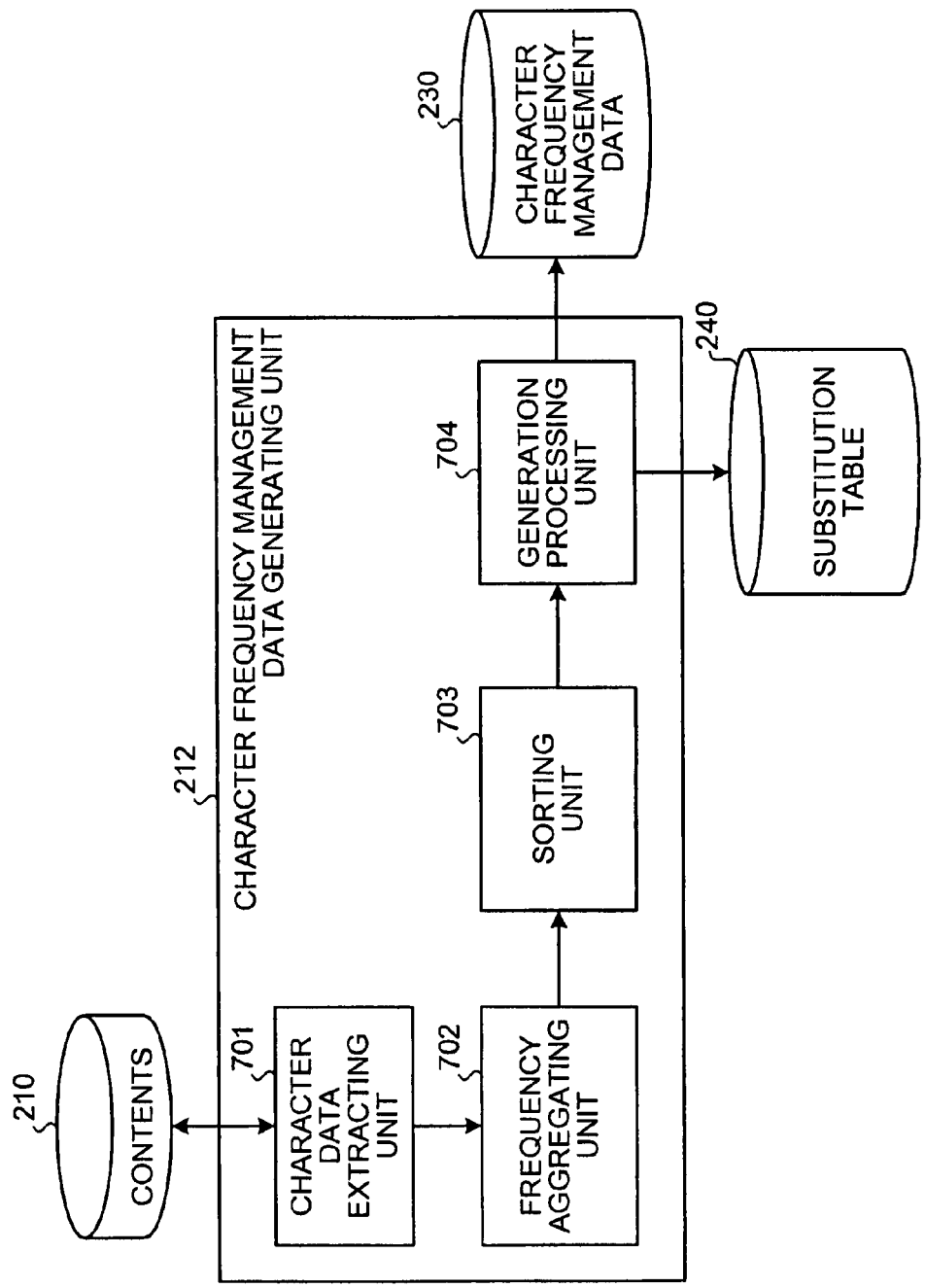
FIG. 7 is a function diagram of a character frequency management data generating unit.

FIG. 7 is a function diagram of a character frequency management data generating unit 212. The character frequency management data generating unit 212 includes a character data extracting unit 701, a character occurrence frequency aggregating unit 702 (hereinafter, "frequency aggregating unit 702"), a sorting unit 703, and a generation processing unit 704.

The character data extracting unit 701 sequentially extracts character data from each text HTML file of the content 210. The frequency aggregating unit 702 aggregates the occurrence frequency of character data, which is extracted by the character data extracting unit 701, in the content 210. The occurrence frequency is expressed by, for example, an occurrence number or an occurrence rate. The frequency aggregating unit 702 also determines the presence or absence of character data for each of the text HTML files f0 to fn.

The sorting unit 703 sorts character data in descending order of occurrence frequency. The generation processing unit 704 generates character frequency management data 230 using the occurrence frequency of each character data sorted and presence/absence information that is a result of presence/absence determination (hereinafter, "occurrence map") of each character data. The substitution table 240 is also generated.

Figure 8:
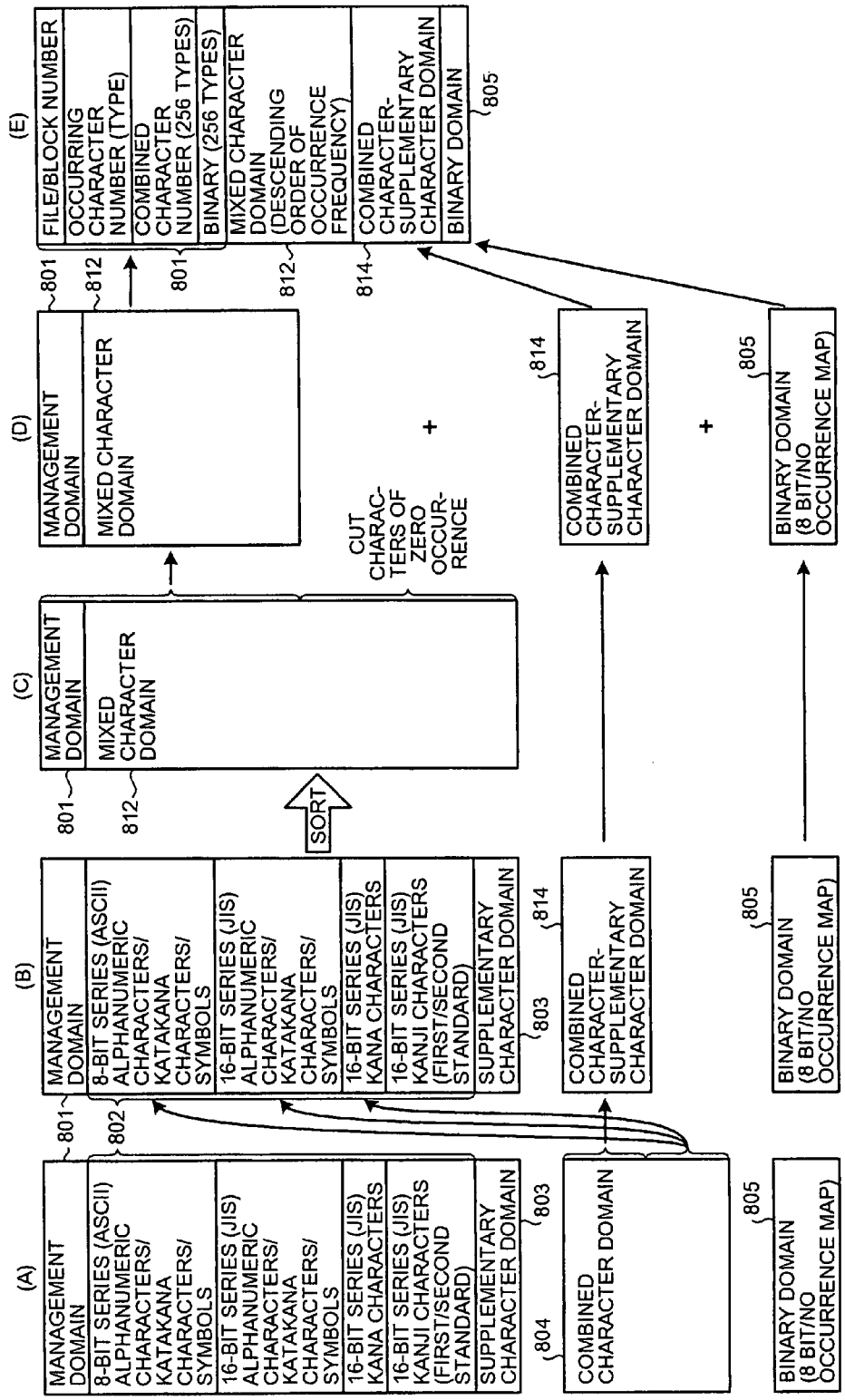
FIG. 8 is a data configuration diagram showing a process of generating character frequency management data.

FIG. 8 is a data configuration diagram showing a process for generating the character frequency management data 230. A data structure (A) illustrates a data configuration of the character frequency management data 230 when the frequency aggregating unit 702 aggregates character data; a data structure (B) illustrates a data configuration of the character frequency management data 230 after combined character/supplementary character substitution processing; a data structure (C) illustrates a data configuration of the character frequency management data 230 after a sorting of mixed data composed of standard character data and supplementary character data; a data structure (D) illustrates a data configuration of the character frequency management data 230 after cutting of mixed data of low occurrence frequencies; and a data structure (E) illustrates a data configuration of the character frequency management data 230 that is finally generated.

In the data structure (A), a reference numeral 801 denotes a management domain of the character frequency management data 230. A reference numeral 802 denotes a standard character domain storing occurrence frequencies, occurring file numbers, occurrence orders, and occurrence maps of standard character data, such as alphanumeric characters, katakana characters, and symbols of 8-bit series (ASCII), alphanumeric characters, katakana characters, and symbols of 16-bit series (JIS), and kana characters and kanji characters of 16-bit series (JIS).

A reference numeral 803 denotes a supplementary character domain storing occurrence frequencies, occurring file numbers, occurrence orders, and occurrence maps of supplementary character data. A reference numeral 804 denotes a combined character domain storing occurrence frequencies, occurring file numbers, occurrence orders, and occurrence maps of combined character data. A reference numeral 805 denotes a binary domain storing occurrence frequencies, occurring file numbers, and occurrence orders of 8-bit binary data.

In the data structure (A), combined character data of the combined character domain 804 is sorted in descending order of occurrence frequency. Combined character data of occurrence frequencies higher than or equal to a predetermined occurrence frequency are substituted with supplementary character data (hereinafter, "combined character/supplementary character") different from existing supplementary character data so as not to overlap with each other. Thus, by substituting combined character data of high occurrence frequency and composed of plural character components with supplementary character data that is data of a single-component character, data volume may be reduced, and compression efficiency may be improved. Combined character data of occurrence frequencies lower than the predetermined occurrence frequency is regarded to be low occurrence frequency combined character data, and hence the combined character data is fragmented into single-character data and allocated to a corresponding character domain. Consequently, the data configuration of the character frequency management data 230 after combined character/supplementary character substitution processing, the data configuration (B) is obtained.

FIG. 9 is an explanatory diagram of the data configuration (B) shown in FIG. 8. The data configuration (B) includes of a character data domain 900, an occurrence frequency domain 901, an occurring file number domain 902, an occurrence order domain 903, and an occurrence map 904, and each domain stores character data occurrence frequencies, occurring file numbers, occurrence orders, and presence/absence flags, respectively. Sixteen bits are assigned to one segment of the occurrence map 904.

Specifically, a left end of the occurrence map 904 is a presence/absence flag of the text HTML file f0 of a file number "#0", and presence/absence flags of a text HTML file f1 of a file number "1" and of a text HTML file f2 of a file number "2" are set in order. A right end is a presence/absence flag of a text HTML file fn of a file number "#n".

The data configuration (C) is a result induced from the data configuration (B) by mixing standard character data of the standard character domain 802 and supplementary character data of the supplementary character domain 803 and then by sorting in descending order of occurrence frequency. In the data configuration (C), combined character data of a combined character/supplementary character domain 814 and binary data of the binary domain 805 of the data configuration (B) are excluded from the sorting.

In a mixed character domain 812 of the data configuration (C) including both standard character data and supplementary character data, character data of low occurrence frequencies, e.g., zero occurrence, are cut. The data configuration (D) is a data configuration after the cut. The final character frequency management data 230 shown in the data configuration (E) can be generated by combining the management domain 801 and mixed character domain 812, the combined character/supplementary character domain 814, and the binary domain 805 of the data configuration (D). The management domain 801 of the character frequency management data 230 stores the number of file blocks, the number of occurring character data types (occurring character number (type)), the number of combined character/supplementary character data (combined character number (256 types)), and the number of binary data (binary (256 types)).

FIG. 10 is a diagram of the data configuration (E). The occurrence frequency domain 901 and the occurrence map 904 of the character frequency management data 230 are associated with each other for each character data excluding binary data. The character data is sorted in descending order of occurrence frequency. As shown in FIG. 10, character data in the character data domain 900 and occurrence frequency in the occurrence frequency domain 901 are encrypted by exclusive OR (XOR) using a predetermined master key, described hereinafter.

As shown in the occurrence map 904 of the character frequency management data 230, presence/absence flags of both characters 900a and 900b are "1" for the text HTML file f0 of file number "#0" located on the left end of the occurrence map 904, making AND (logical conjunction) "1". Hence, the text HTML file f0 includes the character 900a and the character 900b, and the text HTML file f0 is regarded as a retrieval object if input keywords include the character 900a and the character 900b.

On the other hand, while a presence/absence flag of the character 900*a* is "1", a presence/absence flag of character data 900*b* is "0" for a text HTML file f1 of file number "#1", making AND (logical conjunction) "0". Hence, the text HTML file f1 includes the character 900*a* but not the character 900*b*, and the text HTML file f1 is excluded from retrieval object if input keywords include the character 900*a* and the character 900*b*.

Figure 11:
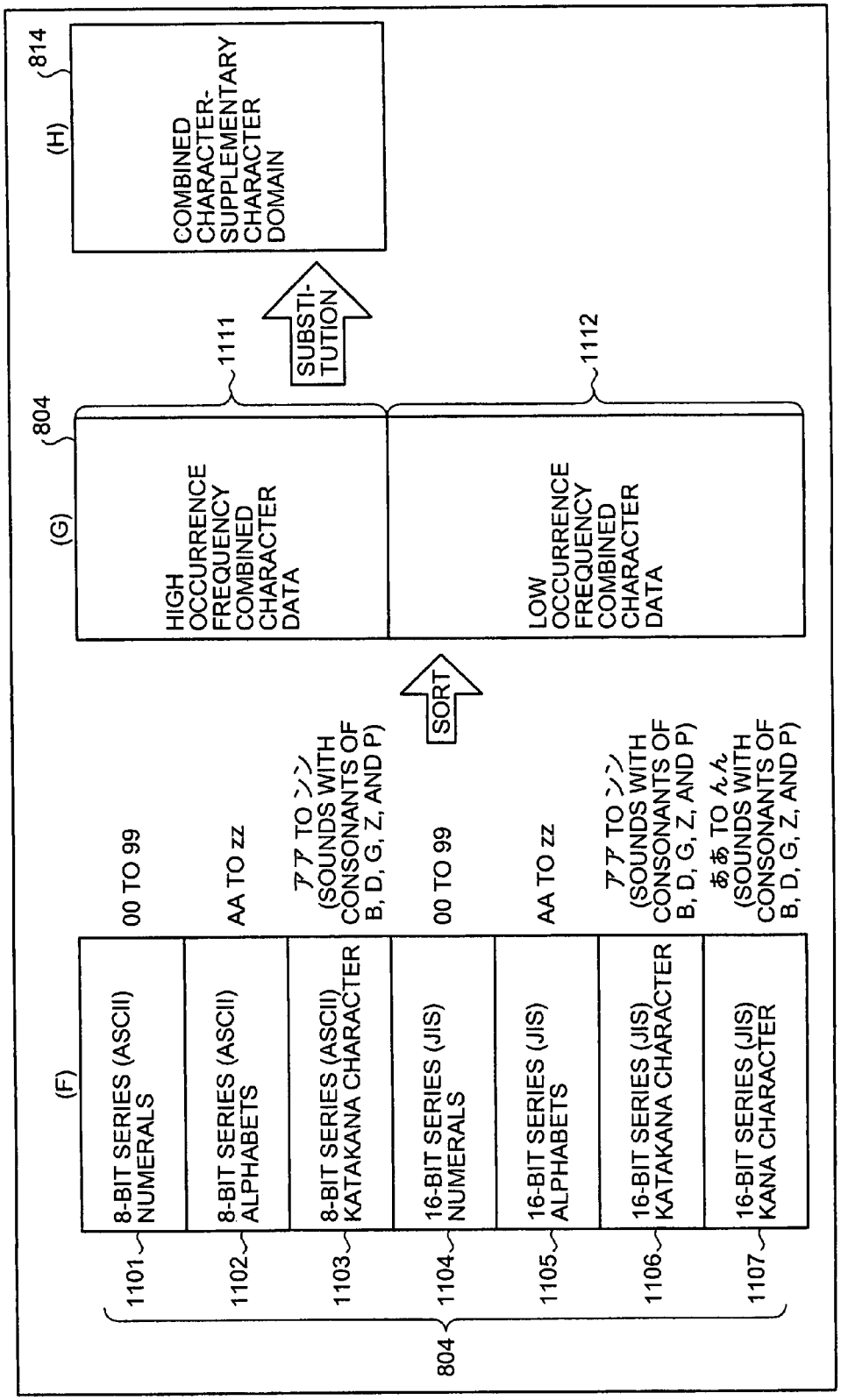
FIG. 11 is a data configuration diagram of a combined character/supplementary character substituting process.

FIG. 11 is a data configuration diagram of a combined character/supplementary character substituting process. A data configuration (F) illustrates a data configuration of the combined character domain 804 of the character frequency management data 230 when the frequency aggregating unit 702 aggregates combined character data; a data configuration (G) illustrates a data configuration of the combined character domain 804 after sorting of combined character data; and a data configuration (H) illustrates a data configuration after substitution.

The combined character domain 804 of the data configuration (F) includes domains 1101 to 1107. The domain 1101 stores information on numeric character string data ("00" to "99") of 8-bit series (ASCII) (the numeric character string data, occurrence frequency, occurring file number, occurrence order, and occurrence map).

The domain 1102 stores information on alphabetic character string data ("AA" to "zz") of 8-bit series (ASCII) (the alphabetic character string data, occurrence frequency, occurring file number, occurrence order, and occurrence map). The domain 1103 stores information on katakana character string data ("アア" to "ンン", sounds with consonants of b, d, g, z, and p) of 8-bit series (ASCII) (the katakana character string data, occurrence frequency, occurring file number, occurrence order, and occurrence map).

The domain 1104 stores information on numeric character string data ("00" to "99") of 16-bit series (JIS) (the numeric character string data, occurrence frequency, occurring file number, occurrence order, and occurrence map). The domain 1105 stores information on alphabetic character string data ("AA" to "zz") of 16-bit series (JIS) (the alphabetic character string data, occurrence frequency, occurring file number, occurrence order, and occurrence map).

The domain 1106 stores information on katakana character string data ("アア" to "ンン", sounds with consonants of b, d, g, z, and p) of 16-bit series (JIS) (the katakana character string data, occurrence frequency, occurring file number, occurrence order, and occurrence map). The domain 1107 stores information on kana character string data ("ああ" to "んん", sounds with consonants of b, d, g, z, and p) of 16-bit series (JIS) (the kana character string data, occurrence frequency, occurring file number, occurrence order, and occurrence map).

The data configuration (G) is obtained from the data configuration (F) by sorting each combined character data in descending order of occurrence frequency. A domain 1111 of the data configuration (F) includes information on combined character data of high occurrence frequencies and is an object for substituting with supplementary character data. On the other hand, a domain 1112 includes information on combined character data of occurrence frequencies lower than or equal to a predetermined occurrence frequency (low occurrence frequency combined character data). The low occurrence frequency combined character data is fragmented into single-character data, thereby compensating the occurrence frequency of character data and the occurrence map 904.

Figure 12:
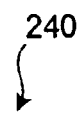
FIG. 12 is a diagram of a generated final combined character/supplementary character substitution table.

The data configuration (H) is obtained from the data configuration (G) by substituting combined character data of high occurrence frequencies with supplementary character data. The combined character/supplementary character domain 814 stores information on substituted combined character/supplementary character data (the combined character/supplementary character data, occurrence frequency, occurring file number, occurrence order, and occurrence map). FIG. 12 is a diagram of a finally generated substitution table 240. The substitution table 240 is generated by associating the combined character data in the domain 1111 of the data configuration (G) with the combined character/supplementary character data in the combined character/supplementary character domain 814 of the data configuration (H).

Figure 13:
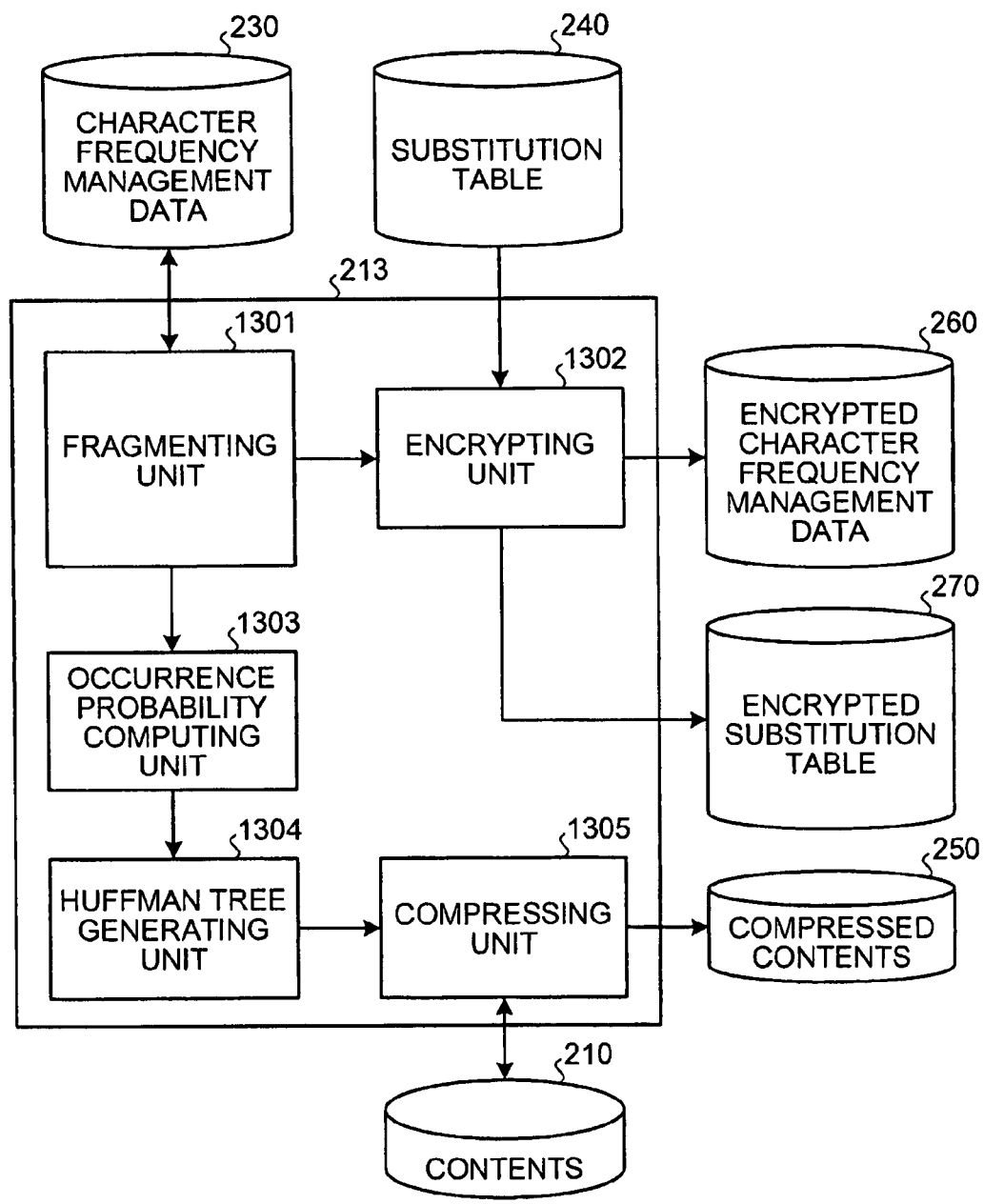
FIG. 13 is a function diagram of a compressing/encrypting unit shown in FIG. 2.

FIG. 13 is a function diagram of a compressing/encrypting unit 213 shown in FIG. 2. The compressing/encrypting unit 213 includes a low occurrence frequency character data fragmenting unit 1301 (hereinafter, "fragmenting unit 1301"), an encrypting unit 1302, an occurrence probability computing unit 1303, a Huffman tree generating unit 1304, and a compressing unit 1305.

The fragmenting unit 1301 sorts character data in a character domain of the character frequency management data 230 that is generated by the character frequency management data generating unit 212, in descending order of occurrence frequency. For low occurrence frequencies that are lower than or equal to a predetermined occurrence frequency, character data is fragmented into 8-bit code and stored in a binary domain including binary data of 8-bit code.

The encrypting unit 1302 generates encrypted character frequency management data 260 by encrypting the character frequency management data 230 that is obtained by the fragmentation by the fragmenting unit 1301, by XOR using a predetermined master key. The encrypted substitution table 270 may also be generated by encrypting the substitution table 240 by XOR using a predetermined master key.

The occurrence probability computing unit 1303 sorts standard character data, combined character/supplementary character data, and binary data of the character frequency management data 230 that is obtained by the fragmentation by the fragmenting unit 1301, in descending order of occurrence frequency, and computes occurrence probabilities of the data. The Huffman tree generating unit 1304 generates a Huffman tree based on the occurrence probabilities computed by the occurrence probability computing unit 1303.

The compressing unit 1305 generates a compressed content 250 by compressing the content 210 using the Huffman tree generated by the Huffman tree generating unit 1304. Specifically, the content 210 is compressed by assigning short bits to character data described in each of text HTML files f0 to fn in descending order of occurrence frequency, i.e., of occurrence probability. Text HTML files in the compressed content 250 are referred to as "compressed files".

Figure 14:
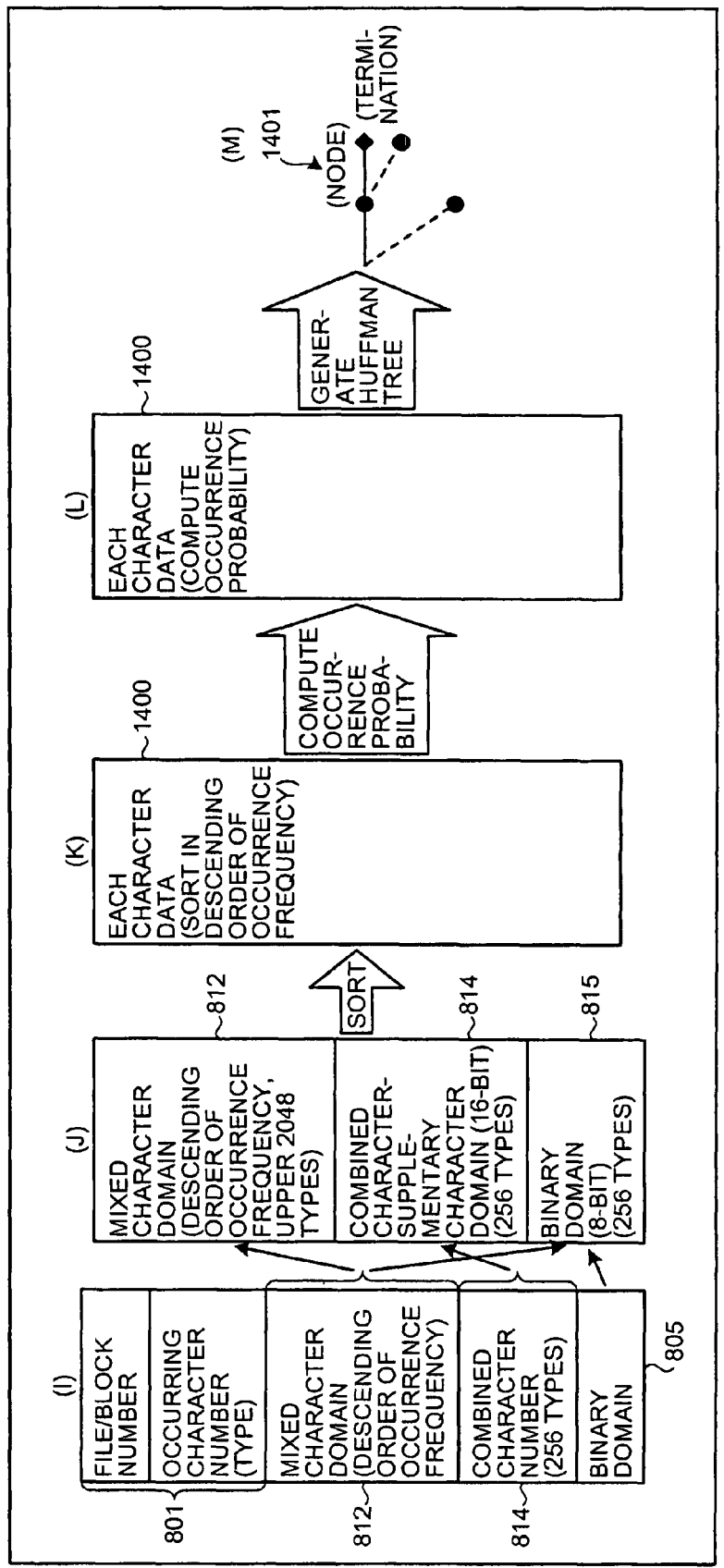
FIG. 14 is a diagram of a Huffman tree generating process by the compressing/encrypting unit.

FIG. 14 is an explanatory diagram of a Huffman tree generating process by the compressing/encrypting unit 213. Character data of low occurrence frequencies of the character frequency management data 230 of FIG. 14I is fragmented by the fragmenting unit 1301 and stored in a binary domain 815 including binary data (FIG. 14J).

All character data in the mixed character domain 812, the combined character/supplementary character domain 814, and the binary domain 815 of FIG. 14J are sorted in descending order of occurrence frequency (FIG. 14K). In a domain 1400 of FIG. 14K, occurrence probability of each character data is computed by introducing occurrence frequency as a Huffman compression parameter (FIG. 14L). A Huffman tree 1401 is finally generated based on the occurrence probability of each character data of FIG. 14L (FIG. 14M).

Figures 15, 16:
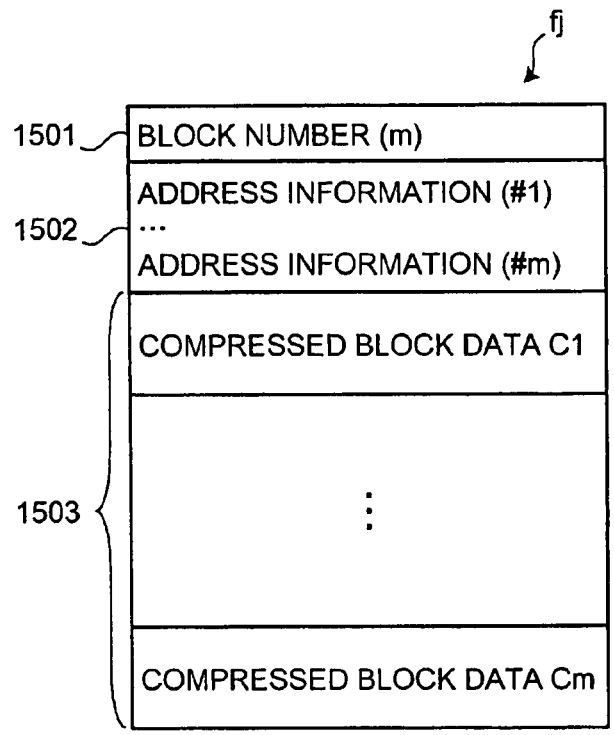
FIG. 15 is a diagram showing data structure of compressed content compressed by the compressing unit.
FIG. 16 is a table comparing compressed data and original block data before compression.

FIG. 15 is an explanatory diagram showing data structure of compressed content 250 compressed by the compressing unit 1305. FIG. 15 explains an arbitrary text HTML file fj. The text HTML file fj is composed of a block number domain 1501 including information on the number of blocks (m), an address domain 1502 including information on address of each of m blocks (#1 to #m), and a compressed block data domain 1503 including compressed block data (C1 to Cm) of each of the blocks.

FIG. 16 is a table for comparisons between compressed data C1 to Cm and original block data before compression. FIG. 16 shows that lengths of the compressed block data C1 to Cm are compressed to approximately a half of lengths of corresponding original block data.

Figure 17:
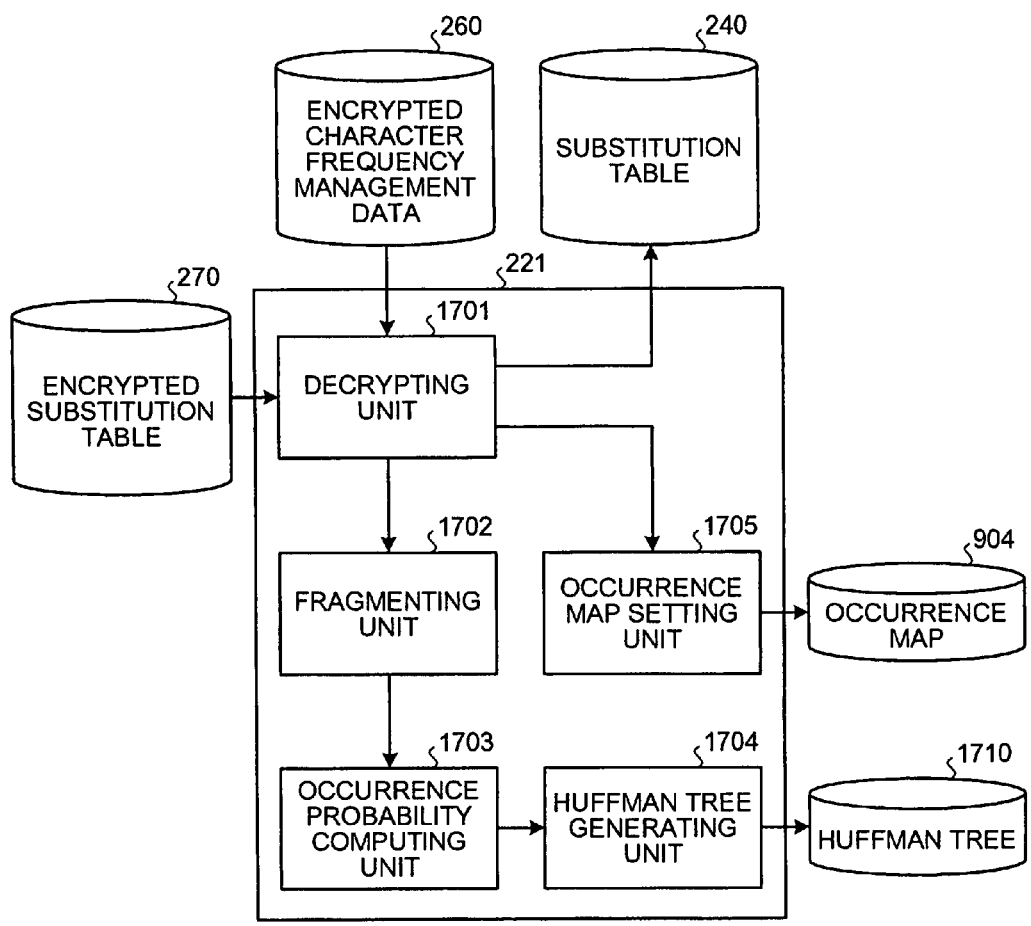
FIG. 17 is a function diagram of a retrieval initializing unit shown in FIG. 2.

FIG. 17 is a block diagram of a detailed functional configuration of a retrieval initializing unit 221 of FIG. 2. The retrieval initializing unit 221 includes an decrypting unit 1701, a low occurrence frequency character data fragmenting unit 1702 (hereinafter, "fragmenting unit 1702"), an occurrence probability computing unit 1703, a Huffman tree generating unit 1704, and an occurrence map setting unit 1705.

The decrypting unit 1701 decrypts the encrypted character frequency management data 260. Specifically, the decrypting unit 1701 executes decrypting process by exclusive OR (XOR) using the master key used for the encryption of FIG. 13. The encrypted substitution table 270 is also returned to an original combined character/supplementary character substitution table in the same manner. The fragmenting unit 1702, the occurrence probability computing unit 1703, and the Huffman tree generating unit 1704 generate a Huffman tree 1710 by executing the same process as the fragmenting unit 1301, the occurrence probability computing unit 1303, and the Huffman tree generating unit 1304, respectively, of FIG. 13.

Figure 18:
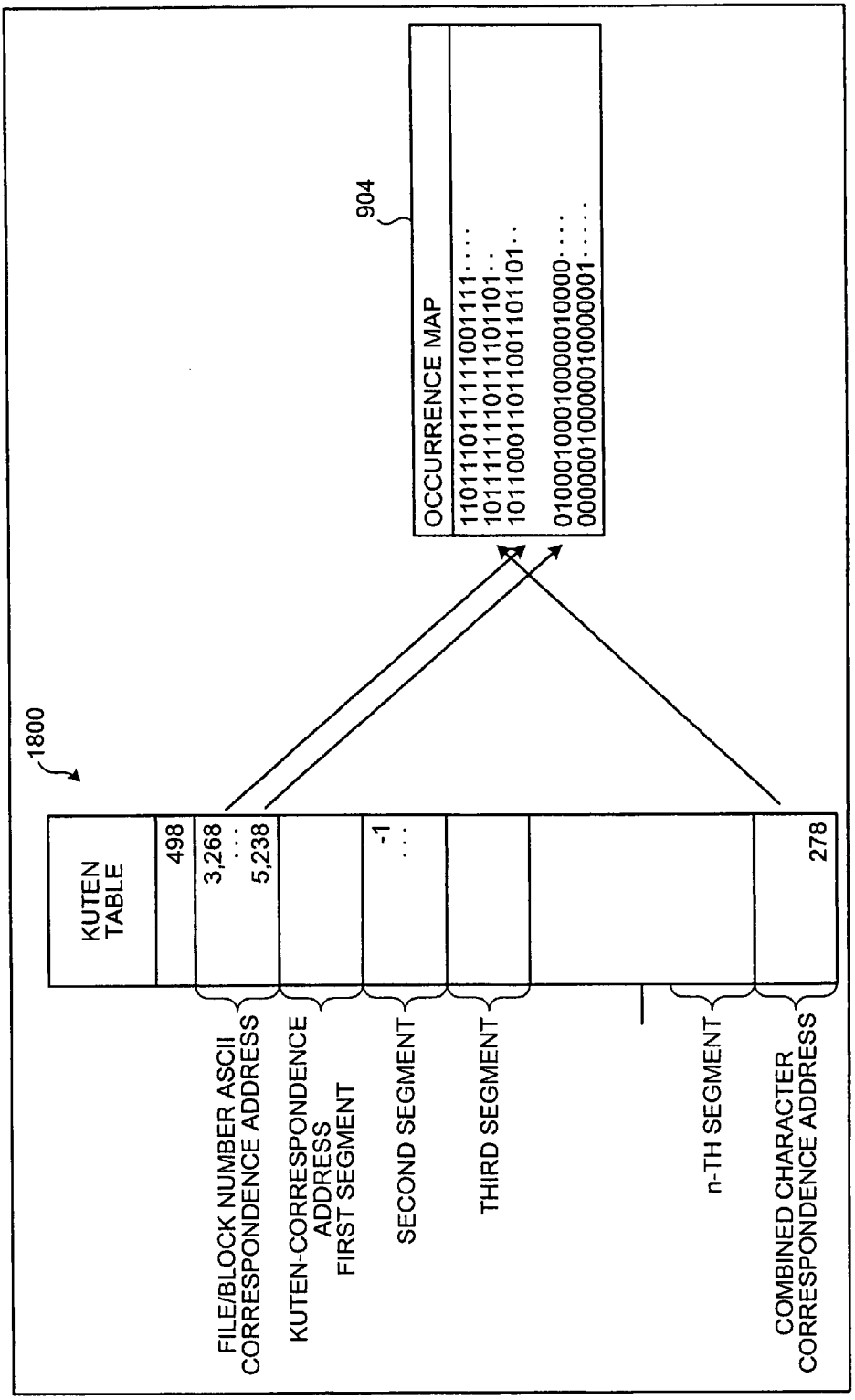
FIG. 18 is a diagram showing relationship between a kuten-correspondence table (kuten table) and an occurrence map.

The occurrence map setting unit 1705 reads the occurrence map 904 of the decrypted character frequency management data 230, expands in memory, and links to a kuten-correspondence table (hereinafter, "kuten table"). Kuten is character code established by JIS for two-byte characters, and the kuten table stores the address of each kuten. FIG. 18 is an explanatory diagram showing relationship between a kuten table 1800 and an occurrence map 904. By associating character data of the character frequency management data 230 with the kuten using the kuten table 1800, presence/absence flag rows of character data corresponding to the kuten may be called from the occurrence map 904.

Figure 19:
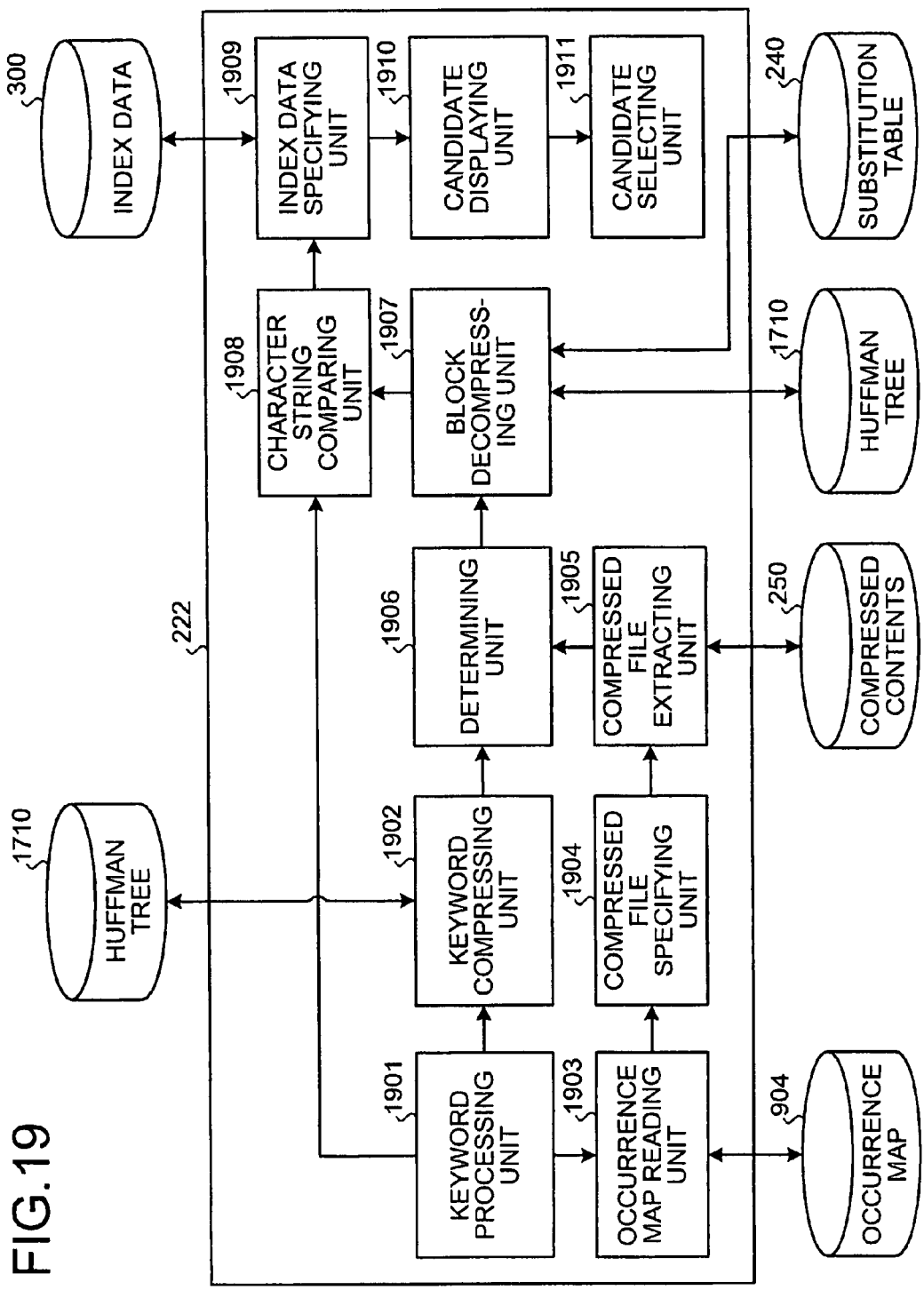
FIG. 19 is a function diagram of a full text retrieving unit shown in FIG. 2.

FIG. 19 is a function diagram of the full text retrieving unit 222 shown in FIG. 2. The full text retrieving unit 222 includes a retrieval keyword input processing unit 1901 (hereinafter, "keyword processing unit 1901"), a retrieval keyword compressing unit 1902 (hereinafter, "keyword compressing unit 1902"), an occurrence map reading unit 1903, a compressed file specifying unit 1904, a compressed file extracting unit 1905, determining unit 1906, a block expanding unit 1907, a character string comparing unit 1908, an index data specifying unit 1909, a retrieval candidate list displaying unit 1910 (hereinafter, "candidate displaying unit 1910"), and a retrieval candidate selecting unit 1911 (hereinafter, "candidate selecting unit 1911").

The keyword processing unit 1901 receives a retrieval keyword input by a user. In the case that plural retrieval keywords are input, character strings of individual retrieval keywords are linked. In the case that a combined character included in the retrieval keywords corresponds to a predetermined combined character, the combined character is substituted with a supplementary character using the substitution table 240. Subsequently, the keyword processing unit 1901 fragments the retrieval keyword into single characters.

The keyword compressing unit 1902 compresses a keyword input by the keyword processing unit 1901 using the Huffman tree 1710 generated by the Huffman tree generating unit 1704 of the retrieval initializing unit 221. The occurrence map reading unit 1903 reads presence/absence flag rows of each character of the retrieval keyword in each of the text HTML files f0 to fn using the occurrence map 904 set by the occurrence map setting unit 1705. Specifically, since each character data in the occurrence map 904 is linked to a kuten by the kuten table, the occurrence map reading unit 1903 may read presence/absence flag rows of each character data that corresponds to a kuten, of a retrieval keyword.

The compressed file specifying unit 1904 narrows compressed files by specifying compressed files including all data of each character of the retrieval keyword by computing logical conjunction of the presence/absence flag rows of each of the text HTML files f0 to fn read from the occurrence map 904. FIG. 45 is a schematic of narrowing. An example of narrowing is explained using a table 4500 shown in FIG. 45.

A retrieval keyword 4501 includes four characters 4501a, 4501b, 4501c, and 4501d. Hence, the content 210 relevant to the retrieval word 4501 includes four text HTML files f0 to f3, respectively file numbers #0 to #3. For example, a presence/absence flag row of the character 4501a is "1100". The flag row indicates that the text HTML files f0 and f1, file numbers #0 and #1, include the character 4501a and that the text HTML files f2 and f3, file numbers #2 and #3, do not include the character 4501a.

A narrowing result represents a result of logical conjunction (AND) of presence/absence flags of each file number. Only the text HTML file f1, file number #1, has a narrowing result with a flag "1" showing presence, indicating that all the characters 4501a, 4501b, 4501c, and 4501d configuring the retrieval keyword 4501 are only present in the text HTML file f1, file number of #1, and not in the text HTML files f0, f2, and f3, file numbers #0, #2, and #3. Use of the narrowing result guards against the unnecessary opening/closing of files and thus improves the speed of retrieval as the file to be opened as a retrieval object can be narrowed to the text HTML file f1, file number #1.

The compressed file extracting unit 1905 extracts the text HTML file specified by the compressed file specifying unit 1904 from compressed text HTML files included in the compressed content 250. In the present example, the compressed text HTML file (hereinafter, "compressed text HTML file") f1, file number #1 is extracted.

The determining unit 1906 determines whether the compressed text HTML file extracted by the compressed file extracting unit 1905 includes the retrieval keyword compressed (hereinafter, "compressed keyword") by the keyword compressing unit 1902. Specifically, the determination is done for each compressed block data included in the compressed text HTML file.

Discrepancy in a result of the determination indicates that the compressed text HTML file does not include the retrieval keyword. On the other hand, correspondence in a result of the determination indicates that the compressed text HTML file includes the retrieval keyword. In the present example, the text HTML file f1, file number #1, includes a character string of the retrieval keyword 4501.

The block expanding unit 1907, expands only compressed block data of a compressed text HTML file that is determined by the determining unit 1906 as correspondent. The determining unit 1906 may make determination for compressed text HTML files without decompression and eliminate discrepant compressed text HTML files from retrieval candidates before expanding the compressed text HTML files, enabling the block expanding unit 1907 to expand only correspondent compressed text HTML files. When an expanded text HTML file is found to include combined character/supplementary character data, the combined character/supplementary character data is substituted with the original combined character data at the block expanding unit 1907 using the substitution table 240 decrypted by the decrypting unit 1701.

The character string comparing unit 1908 compares a character string in a block data expanded by the block expanding unit 1907 and a retrieval keyword input by the keyword processing unit 1901. When an item data of the character string corresponds to the retrieval keyword, the index data specifying unit 1909 records the file number and anchor name of the item data and specifies index data 300. The index data 300 specified is referred to as "specified index data 300".

The candidate displaying unit 1910 edits the index data 300 based on the file number and anchor name of the item data for the specified index data 300 and displays a retrieval candidate list enumerating index words on the display 108 of FIG. 1. The candidate selecting unit 1911 accepts a retrieval candidate selected by user operation from the retrieval candidate list displayed by the candidate displaying unit 1910.

Figure 20:
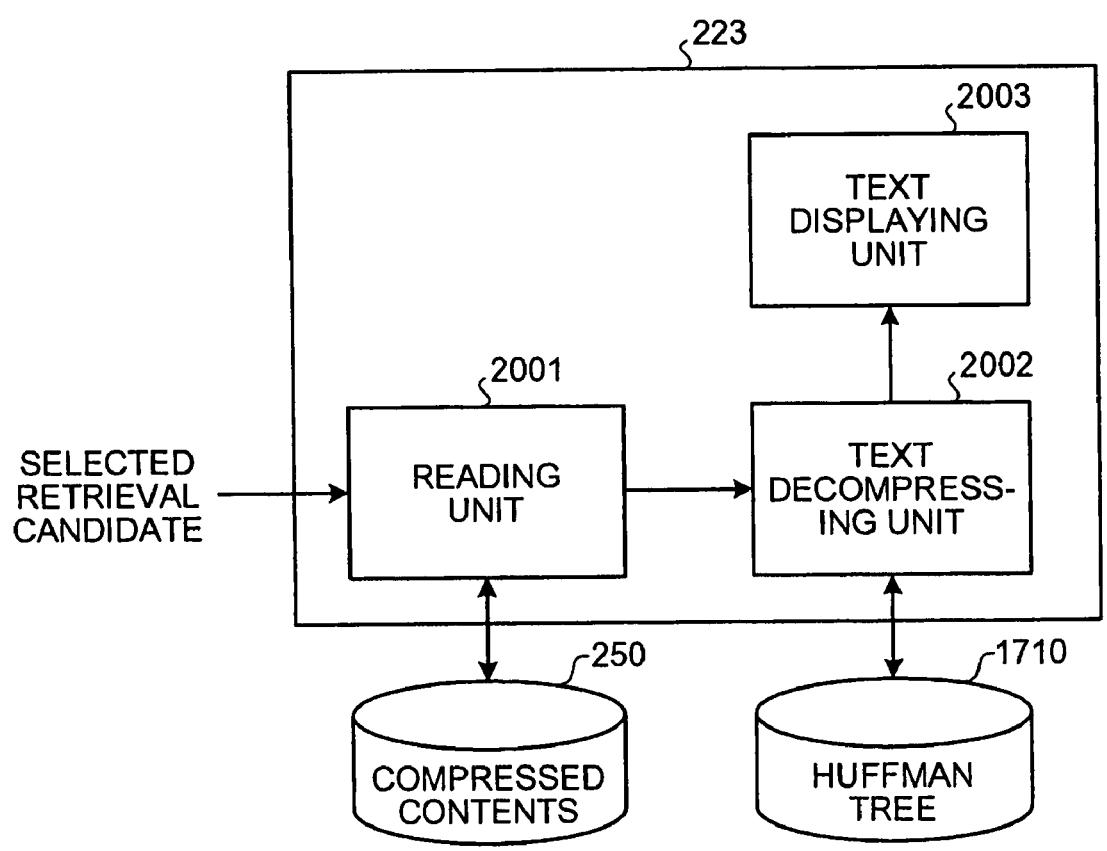
FIG. 20 is a function diagram of a retrieval result displaying unit shown in FIG. 2.

FIG. 20 is a function diagram of a retrieval result displaying unit 223 (hereinafter, "result displaying unit 223") of FIG. 2. The result displaying unit 223 includes a reading unit 2001, a text expanding unit 2002, and a text indicating unit 2003.

The reading unit 2001 reads out item data that is a retrieval candidate selected by the candidate selecting unit 1911, from the compressed content 250. The text expanding unit 2002, using the Huffman tree 1710, expands the item data read out by the reading unit 2001. The result displaying unit 223 displays the item data expanded by the text expanding unit 2002 as a retrieval result.

Figure 21:
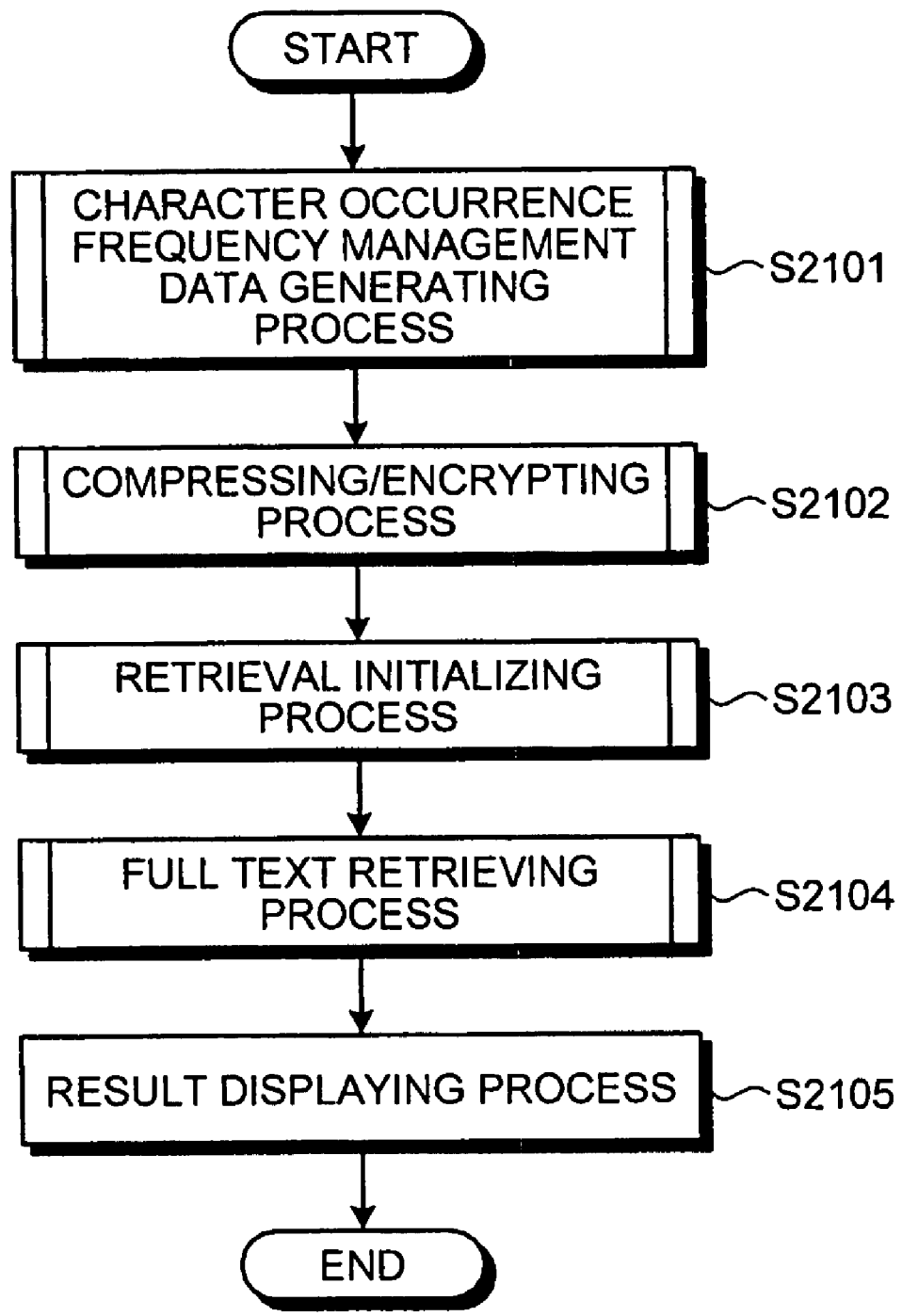
FIG. 21 is a flowchart of the information retrieval apparatus according to the first embodiment of the present invention.

FIG. 21 is a flowchart of the information retrieval apparatus according to the first embodiment. The character frequency management data generating unit 212 executes a character frequency management data generating process (step S2101).

The compressing/encrypting unit 213 executes a compressing/encrypting process (step S2102). The retrieval initializing unit 221 executes a retrieval initializing process (step S2103). The full text retrieving unit 222 executes a full text retrieving process (step S2104). The result displaying unit 223 executes a retrieval result displaying process (hereinafter, "result displaying process") (step S2105). The result displaying process may display a full text of item data as a retrieval result by expanding a retrieval candidate that is selected from the retrieval candidate list and read out from the compressed content 250 using the Huffman tree.

Figure 22:
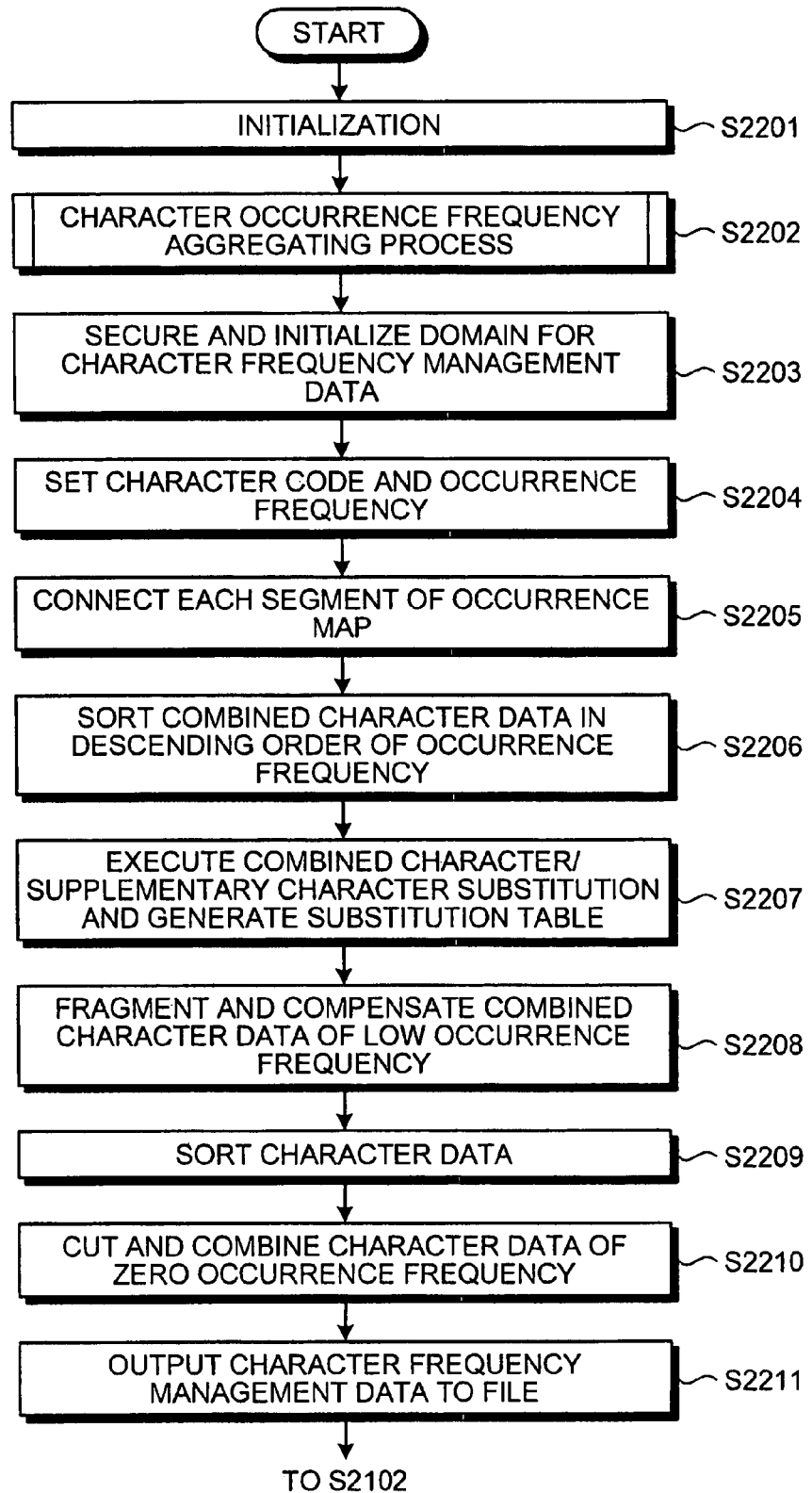
FIG. 22 is a flowchart of the character frequency management data generating process shown in FIG. 21.

FIG. 22 is a flowchart of the character frequency management data generating process (step S2101) of FIG. 21. As shown in FIG. 22, an initializing process is executed (step S2201). Specifically, the step S2201 secures a kuten-correspondence aggregating domain for 8- and 16-bit character data, combined character data, and binary data, and initializes segments of occurrence frequency and occurrence map. Codes of character data are set, and various counters are initialized.

A character occurrence frequency aggregating process (step S2202) is executed. The character occurrence frequency aggregating process is explained hereinafter. After the character occurrence frequency aggregating process, a domain for the character frequency management data 230 is secured and initialized (step S2203). Character codes and occurrence frequencies of 8- and 16-bit character data, combined character data, and binary data are set (step S2204).

Each segment of the occurrence map is linked (step S2205). Two hundred fifty-six types of combined character data are selected by sorting combined character data in the combined character domain in descending order of occurrence frequency (step S2206). This ensures reduction of combined character data.

Combined character/supplementary character substitution is executed, and the substitution table 240 is generated (step S2207). Specifically, combined character/supplementary character data and the substitution table 240 are generated by substituting combined character data with supplementary character data in descending order of occurrence frequency.

Combined character data of low occurrence frequencies, i.e., combined character data that has not been substituted with supplementary character data, is fragmented into single-character data and assigned to a corresponding character domain for compensation (step S2208). In other words, combined character data of low occurrence frequency is fragmented into phonograms, and addition of frequencies and OR of occurrence map of the character data are calculated.

The character data is sorted in descending order of occurrence frequency (step S2209). Character data of zero occurrence is cut, and combined character/supplementary character data and binary data are combined (step S2210). The character frequency management data 230 obtained by the combination is output to a file (step S2211), and the process returns to the step S2102.

Figure 23:
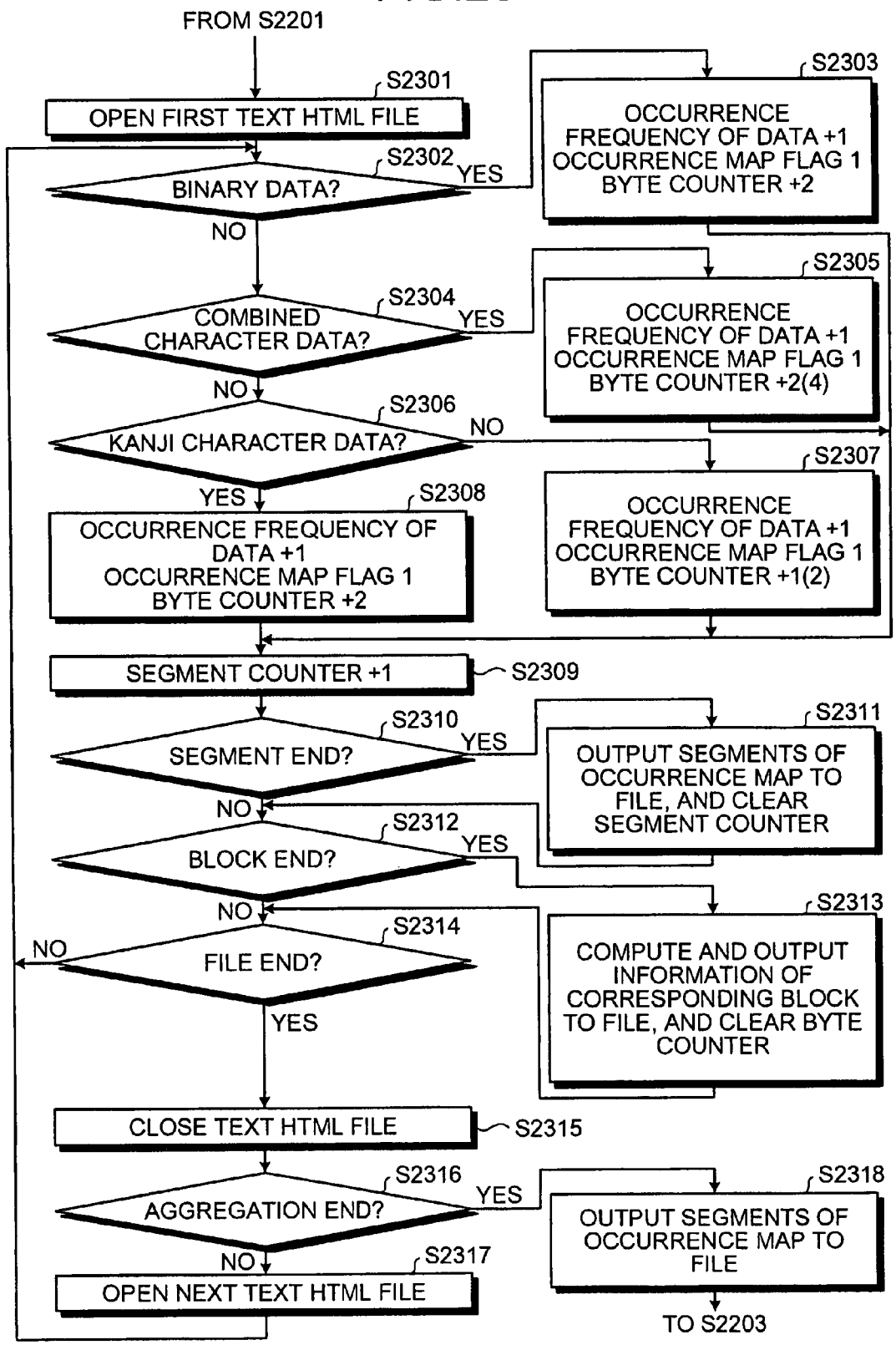
FIG. 23 is a flowchart of a character occurrence frequency aggregating process.

FIG. 23 is a flowchart of the character occurrence frequency aggregating process (step S2202). The first (file number #0) text HTML file f0 is opened (step S2301).

Data is sequentially extracted from the text HTML file f0 opened. If extracted data is binary data (step S2302: YES), the occurrence frequency of the data is increased by one point, the presence/absence flag in the occurrence map of the data is set as "1", and the byte counter is increased by two points (step S2303).

On the other hand, if the data extracted is determined not to be binary data at the step S2302 (step S2302: NO), it is determined whether the data is combined character data (step S2304). If the data is combined character data (step S2304: YES), the occurrence frequency of the data is increased by one point, the presence/absence flag in the occurrence map of the data is set as "1", and the byte counter is increased by two (or four) points (step S2305).

On the other hand, if the data extracted is determined not to be combined character data at the step S2304 (step S2304: NO), it is determined whether the data is kanji character data (step S2306). If the data is determined not to be kanji character data (step S2306: NO), the data is determined to be phonogram data, and thus the occurrence frequency of the data is increased by one point, the presence/absence flag in the occurrence map of the data is set as "1", and the byte counter is increased by one (or two) points (step S2307).

On the other hand, if the extracted data is kanji character data (step S2306: YES), the occurrence frequency of the data is increased by one point, the presence/absence flag in the occurrence map of the data is set as "1", and the byte counter is increased by two points (step S2308).

A segment counter of segments of the occurrence map is increased by one point (step S2309). Whether aggregation of segments has finished is determined (step S2310). If aggregation of segments has finished (step S2310: YES), segments of the occurrence map are additionally output to the file, and the segment counter is cleared (step S2311), and the process proceeds to step S2312.

On the other hand, if aggregation of the segments has not finished (step S2310: NO) or after the step S2311, at step S2312 it is determined whether block aggregation has ended, e.g., whether the number of aggregated characters has reached 4000 characters.

If block aggregation has ended (step S2312: YES), the file number of the text HTML file that includes the block data, and the block information that includes the block number of the block data, offsets, number of characters, and lengths are generated and additionally output to the file, and the byte counter is cleared (step S2313), and the process proceeds to step S2314.

On the other hand, if block aggregation has not ended (step S2312: NO) or after the step S2313, at step S2314 it is determined whether aggregation of the text HTML file presently open has finished. If aggregation of the text HTML file presently open has not finished (step S2314: NO), the process returns to the step S2302, the next data is extracted, the type of the data is identified, and the data is aggregated (steps S2302 to S2308).

On the other hand, if aggregation of the text HTML file presently open is determined to have finished (step S2314: YES), the text HTML file is closed (step S2315). It is determined whether aggregation has finished, i.e., whether aggregation of all text HTML files has finished (step S2316).

If aggregation of all text HTML files has not finished (step S2316: NO), a text HTML file of the next file number is opened (step S2317), and the process returns to the step S2302, the next data is extracted, the type of the data is identified, and the data is aggregated (steps S2302 to S2308).

On the other hand, if aggregation of all text HTML files is determined to have finished (step S2316: YES), segments of the occurrence map are additionally output to the file (step S2318), a series of protocols ends, and the process returns to the step S2203.

Figure 24:
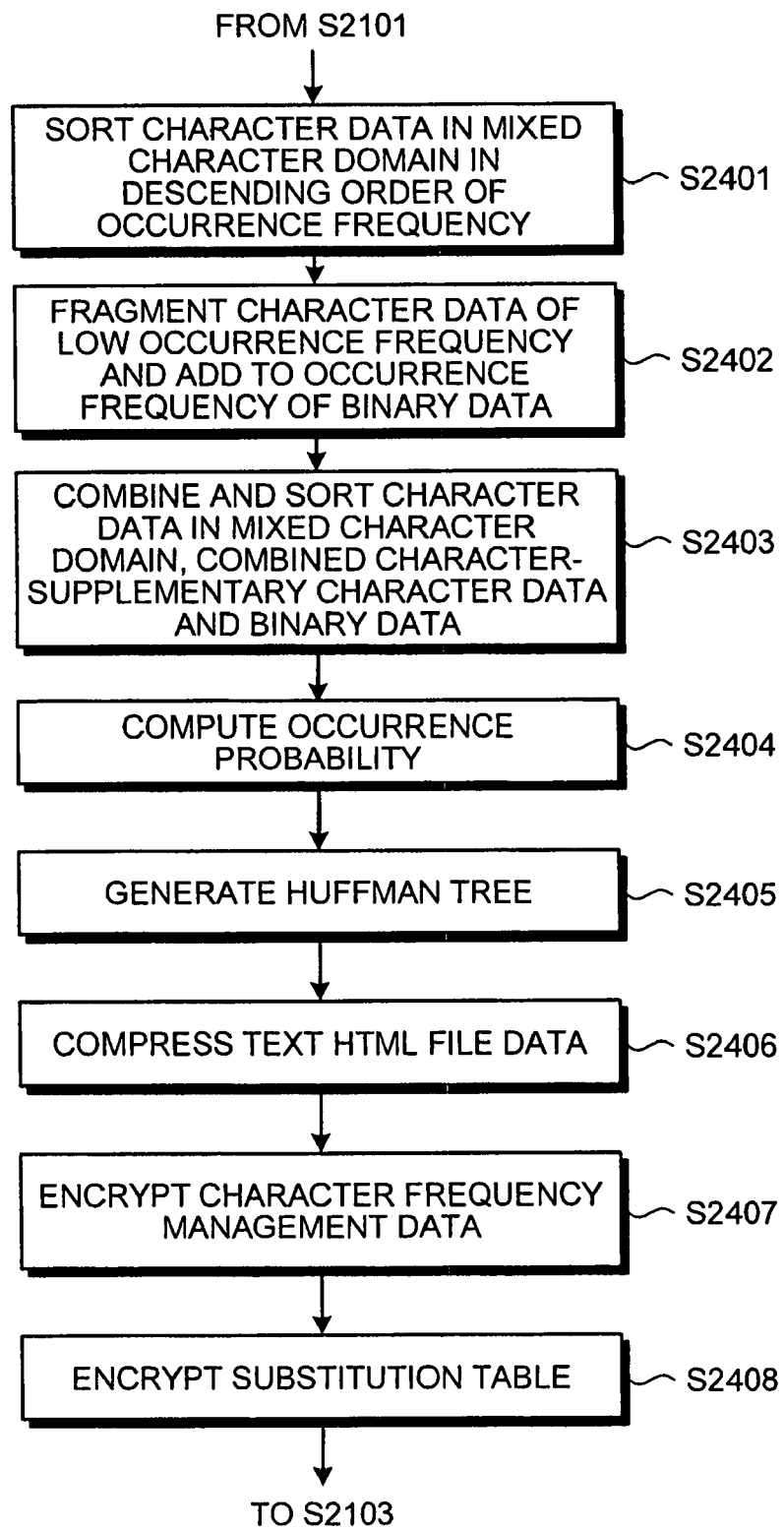
FIG. 24 is a flowchart of the compressing/encrypting process shown in FIG. 21.

FIG. 24 is a flowchart of the compressing/encrypting process (step S2102) of FIG. 21. Character data in the mixed character domain 812 are sorted in descending order of occurrence frequency (step S2401).

Character data of low occurrence frequencies are fragmented into 8-bit fragments and added to the occurrence frequency of corresponding binary data (step S2402). Character data in the mixed character domain 812, combined character/supplementary character data, and binary data are combined and sorted in descending order of occurrence frequency (step S2403). Occurrence probability is computed based on the occurrence frequency for each of the sorted character data (step S2404). Based on the occurrence probabilities, a Huffman tree common to 8- and 16-bit character data is generated (step S2405).

Each text HTML file is compressed (step S2406). Specifically, each text HTML file under the content folder 400 is blocked into blocks every 4000 characters and then compressed using the Huffman tree. The character frequency management data 230 is encrypted (step S2407). Specifically, encryption domains (domains of character data and occurrence frequency) of the character frequency management data 230 are encrypted by exclusive OR (XOR) using a master key. The substitution table 240 is encrypted (step S2408). Specifically, an encryption domain of the substitution table 240 is encrypted by exclusive OR (XOR) using a master key. A series of protocols ends, and the compressing/encrypting process proceeds to a retrieval initializing process (step S2103).

Figure 25:
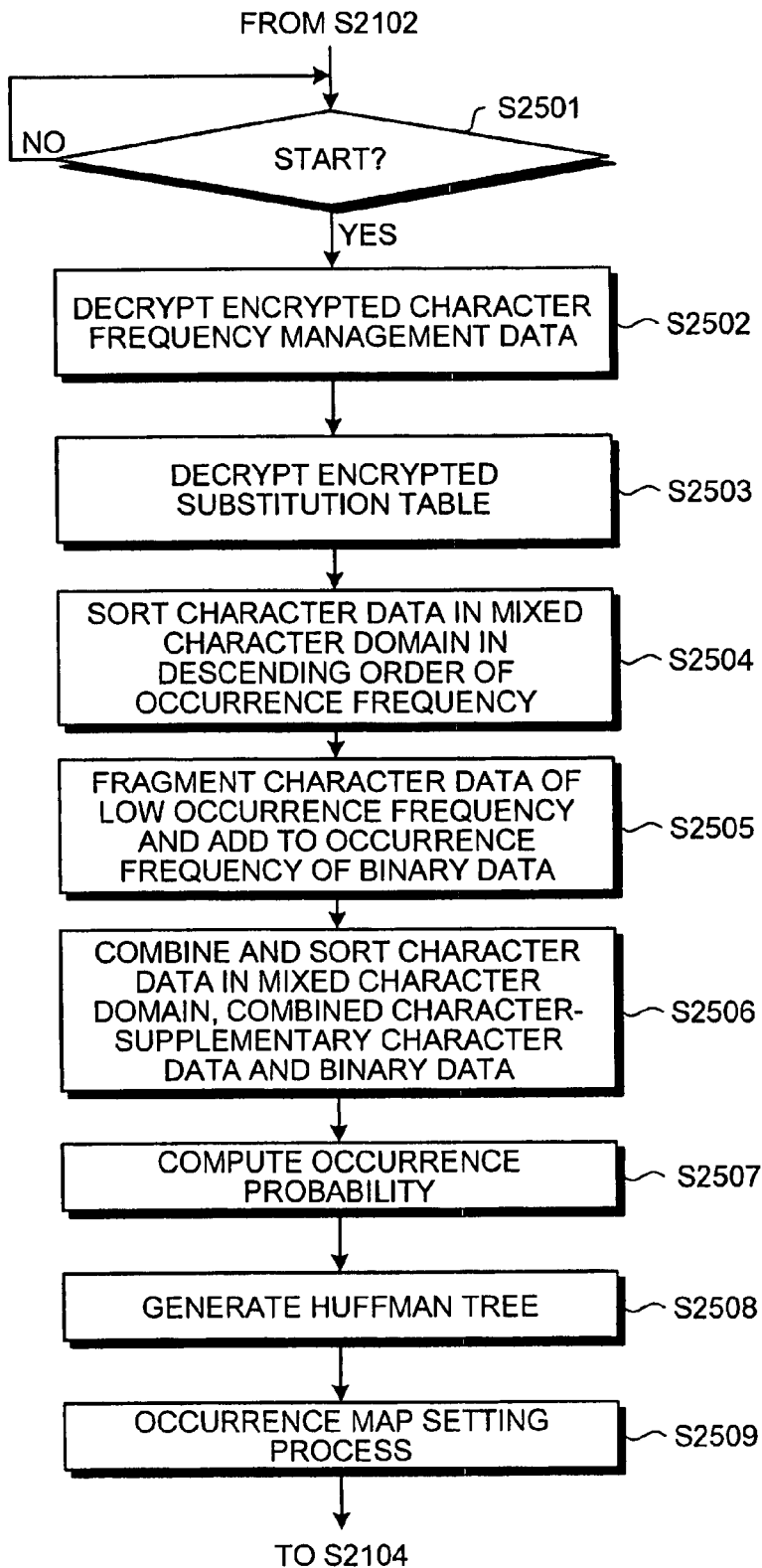
FIG. 25 is a flowchart of the retrieval initializing process shown in FIG. 21.

FIG. 25 is a flowchart of the retrieval initializing process (step S2103) of FIG. 21. Waiting for the start of the retrieval initializing process occurs (step S2501: NO). When the retrieval initializing process starts (step S2501: YES), the encrypted character frequency management data 260 encrypted by the compressing/encrypting process is decrypted (step S2502). Specifically, the encryption domains (domains of character data and occurrence frequency) of the encrypted character frequency management data 260 are decrypted by exclusive OR (XOR) using the master key used for the encryption. The encrypted substitution table 270 is decrypted (step S2503). Specifically, the encryption domain of the encrypted substitution table 270 is decrypted by exclusive OR (XOR) using the master key used for the encryption.

A process similar to the steps from S2401 to S2405 of the compressing/encrypting process is executed. Character data is sorted in descending order of occurrence frequency (step S2504). Character data of low occurrence frequencies are fragmented into 8-bit fragments and added to the occurrence frequency of the corresponding binary data (step S2505). Character data, combined character data, and binary data are combined and sorted in descending order of occurrence frequency (step S2506). Occurrence probability is computed based on occurrence frequency for each of the sorted character data (step S2507). Based on the occurrence probabilities, a Huffman tree common to 8- and 16-bit character data is generated (step S2508).

A setting process of occurrence maps is executed (step S2509). Specifically, securing of a domain for a kuten table, writing of the occurrence order of each character data in the kuten table, expanding of occurrence maps of the decrypted character frequency management data 230 in memory, and linking of the occurrence maps and the kuten table are executed. A series of protocols ends, and the setting process of occurrence maps proceeds to a full text retrieval process (step S2104).

Figure 26:
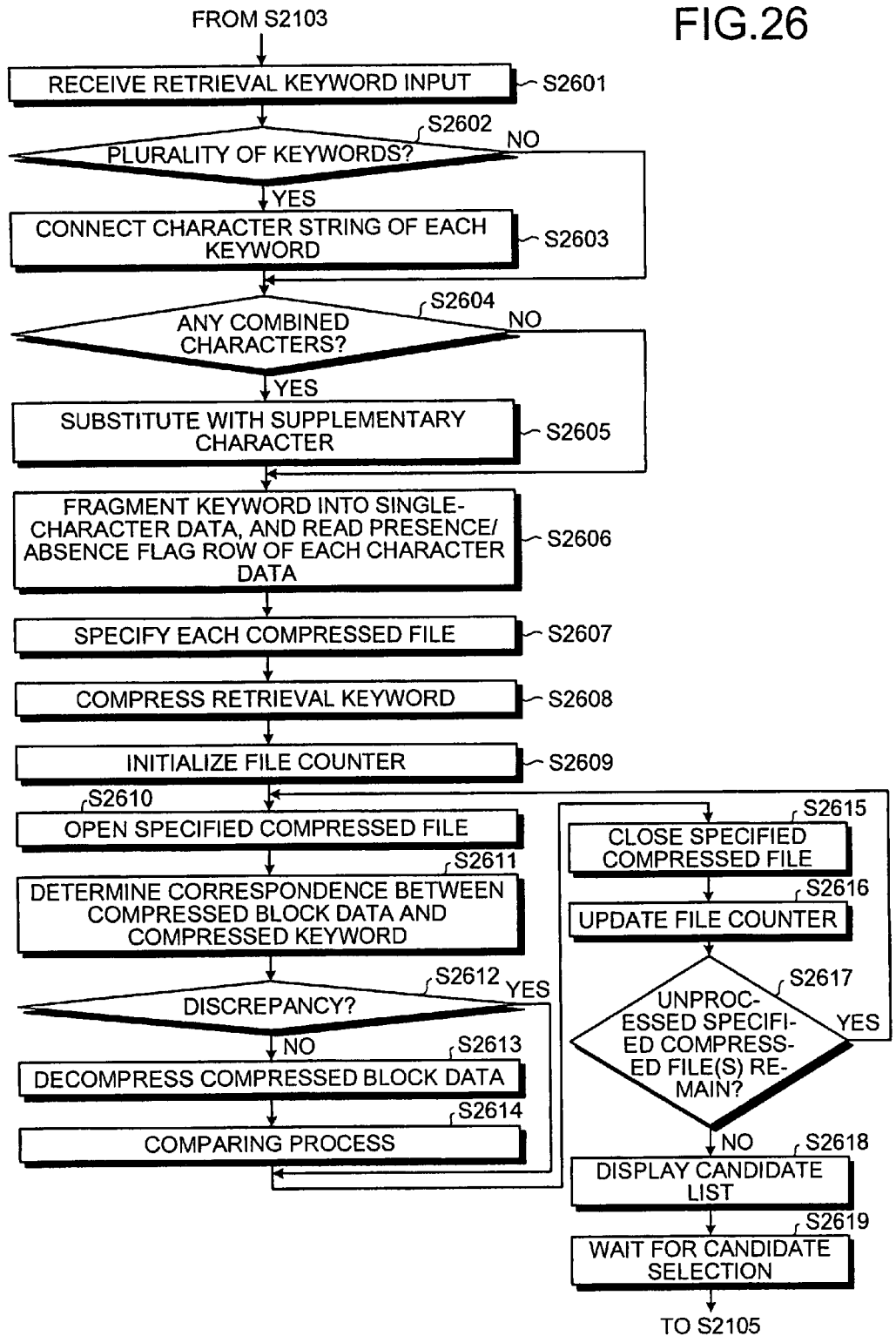
FIG. 26 is a flowchart of the full text retrieving process of shown in FIG. 21.

FIG. 26 is a flowchart of the full text retrieving process (step S2104) of FIG. 21. After the retrieval initializing process (step S2103), input of a retrieval keyword is accepted (step S2601).

If the retrieval keyword is not of a plurality (step S2602: NO), the process proceeds to step S2604. On the other hand, if the retrieval keyword is of a plurality (step S2602: YES), a character string of each keyword is linked (step S2603), and the process proceeds to step S2604.

If combined character data is determined not to be included in the retrieval keyword at the step S2604 (step S2604: NO), the process proceeds to step S2606. On the other hand, if combined character data is included (step S2604: YES), the combined character data is substituted with two supplementary characters using the substitution table 240 (step S2605), and the process proceeds to step S2606.

At the step S2606, the retrieval keyword is fragmented into single-character data, and a presence/absence flag row of each character data in each text HTML file is read out from the occurrence maps (step S2606). Compressed files are specified (narrowed) by logical conjunction of the presence/absence flag row of each character data (step S2607). The retrieval keyword is compressed (step S2608) by the Huffman tree generated at the retrieval initializing process (step S2103). A file counter is initialized (step S2609).

A compressed file specified at the step S2607 (specified compressed file) is opened (step S2610). Discrepancy between compressed block data of the opened specified compressed file and the compressed retrieval keyword is determined (step S2612). If a discrepancy exists (step S2612: YES), the process proceeds to step S2615.

On the other hand, if no discrepancy exists (step S2612: NO), the compressed block data is decompressed by the Huffman tree (step S2613). The decompressed block data and the retrieval keyword are compared, and file number and anchor of item data corresponding to the retrieval keyword are recorded (step S2614), and the process proceeds to step S2615.

The open specified compressed file is closed (step S2615). The file counter is updated (step S2616). If the existence of any unprocessed specified compressed file is determined by the updating of the counter (step S2617:YES), the next specified compressed file is opened and the process returns to the step S2610.

On the other hand, if no unprocessed specified compressed files are determined to exist (step S2617: NO), a retrieval candidate list is displayed (step S2618). Selection input by a user is waited for (step S2619), and a series of protocols ends, and the full text retrieving process proceeds to the result displaying process (step S2105).

Thus, according to the first embodiment, even when the content 210 includes plural files to be retrieved, the files to be retrieved can be standardized by a single compression information (character frequency management data 230).

Further, a large-sized file to be retrieved is blocked depending upon the number of character data and thereby ensures establishment of a Huffman compression technique for retrieval of a file that includes mixed character data of 8-bit code, 16-bit code, or 32-bit code.

Moreover, as a file to be retrieved is blocked corresponding to not size (volume), but according to the number of character data, when the occurrence frequency of each character data in a file to be retrieved are to be aggregated, aggregation of occurrence frequencies can be ensured by determining the type of character data (8-bit code, 16-bit code, or 32-bit code).

According to the first embodiment, 8-bit code character data of high occurrence frequencies, such as alphabetic characters included in an English-Japanese dictionary, are replaced with 16-bit code character data, such as 0x'FF**', and is compressed by Huffman compression. Hence, efficient compression is ensured by distinguishing 8-bit code character data of high occurrence frequencies from 8-bit code character data of low occurrence frequencies.

As non-character data such as a pointer has a random value, non-character data is substituted with 8-bit code. To reduce the size of a Huffman tree, 16-bit code character data of low occurrence frequency is fragmented and substituted with 8-bit code character data, attaining efficient compression.

The character frequency management data 230, which is a source of a Huffman tree for compression or a part thereof, is encrypted. Improved security is ensured since the source of the Huffman tree is encrypted rather than directly encrypting the contents and/or the Huffman tree for compressing the contents.

According to the first embodiment, the speed of full text retrieval based on character frequency management data can be improved. Improvement of compression rate is ensured by compressing contents after substituting combined character data having a high occurrence frequency among sequential phonogram data with supplementary character data.

According to the first embodiment, the number of files to be opened and closed is reduced by using supplementary character data, thereby reducing the comparison domain of character strings and resulting in improved speed of full text retrieval. Further improvement of full text retrieval speed is also ensured by comparing character strings in as supplementary character data after decompression.

An information retrieval apparatus, an information retrieval method, and computer product according to the first embodiment of the present invention ensure an improved compression rate by standardizing character frequency management data (Huffman tree). Retrieval speed can be improved since retrieval and display can be executed without decompression of the entire compressed file block by block. A file that includes mixed data, such as binary data of non-character code, e.g., a pointer, and text data may also be compressed.

A Huffman tree may be reduced by generating a Huffman tree after cutting character data of low occurrence frequencies, thereby reducing the amount memory used, and enabling the compression process to be applied to a PDA and/or a portable mobile terminal, such as a mobile phone. Since two-pass Huffman compression is employed as a compression process, compared to other compression methods, the fastest compression and decompression can be attained. The compression rate of Huffman compression is approximately 50%, the fastest decompression speed compared to other compression methods.

In an encrypting process, since a source of a Huffman tree is encrypted, decryption is not necessary for full text retrieval and display, thereby ensuring improvement of both security and retrieval speed. Since an encryption domain is only character frequency management data (less than 1% of the entire capacity), and this enables the processing time for encryption to be shortened and decryption to be executed only once at the generation of a Huffman tree. Hence, the decryption process does not adversely affect retrieval speed, thereby improving security and retrieval speed.

In a full text retrieving process, by reducing the number of files to be opened and closed and thereby reducing the comparison domain of character strings, the speed of full text retrieval can be improved. Since occurrence maps for full text retrieval that is added for improved retrieval speed, is less than several percent, generation of occurrence maps for full text retrieval can be done in a short time comparable to the time for compressing a file. Compression rate and full text retrieval speed can be improved even when phonogram data, such as alphanumeric characters and/or kana/katakana characters, are mixed in.

Based on character frequency management data, a file to be retrieved that does not include characters of a retrieval keyword can be excluded from files to be opened, improving full text retrieval speed by reducing the time for opening and closing files and by reducing the comparison domain of character strings when full text retrieval is executed. Specifically, the character frequency management data that has a volume of several percent of a text file, can reduce the frequencies of both the opening of files to be retrieved and the comparison of character strings, thereby improving retrieval speed by several times (retrieval of two phonogram characters) to hundreds of times (retrieval of three kanji characters). In particular, the greater the number of characters included in a keyword is, the greater the number of files to be retrieved that do not include characters of the keyword is. These files are excluded from the files to be opened, improving full text retrieval speed by reducing the time for the opening and closing files and by reducing the comparison domain of character strings when full text retrieval is executed.

The first embodiment was explained using contents of a dictionary as the content 210. A second embodiment is explained using electronic forms such as daily reports, weekly reports, and monthly reports for the content 210. As for electronic forms, names and addresses of customers and the names of items appearing do not change for data having a consistent population, and parameters of Huffman compression are substantially similar. On the other hand, since electronic forms have large processing volumes, improved compression/encryption speed is desired.

Therefore, the second embodiment aims at improvement of compression/encryption speed by generating character frequency management data for character data included in arbitrary files to be retrieved among a plurality of files to be retrieved, and by using the generated character frequency management data for other files to be retrieved. Since the hardware configuration of an information retrieval apparatus according to the second embodiment is similar to the hardware configuration of the information retrieval apparatus according to the first embodiment as shown in FIG. 1, explanation is herein omitted. In the description below, the same reference numerals are given to configurations identical to the configurations of the first embodiment, omitting explanations.

Figure 27:
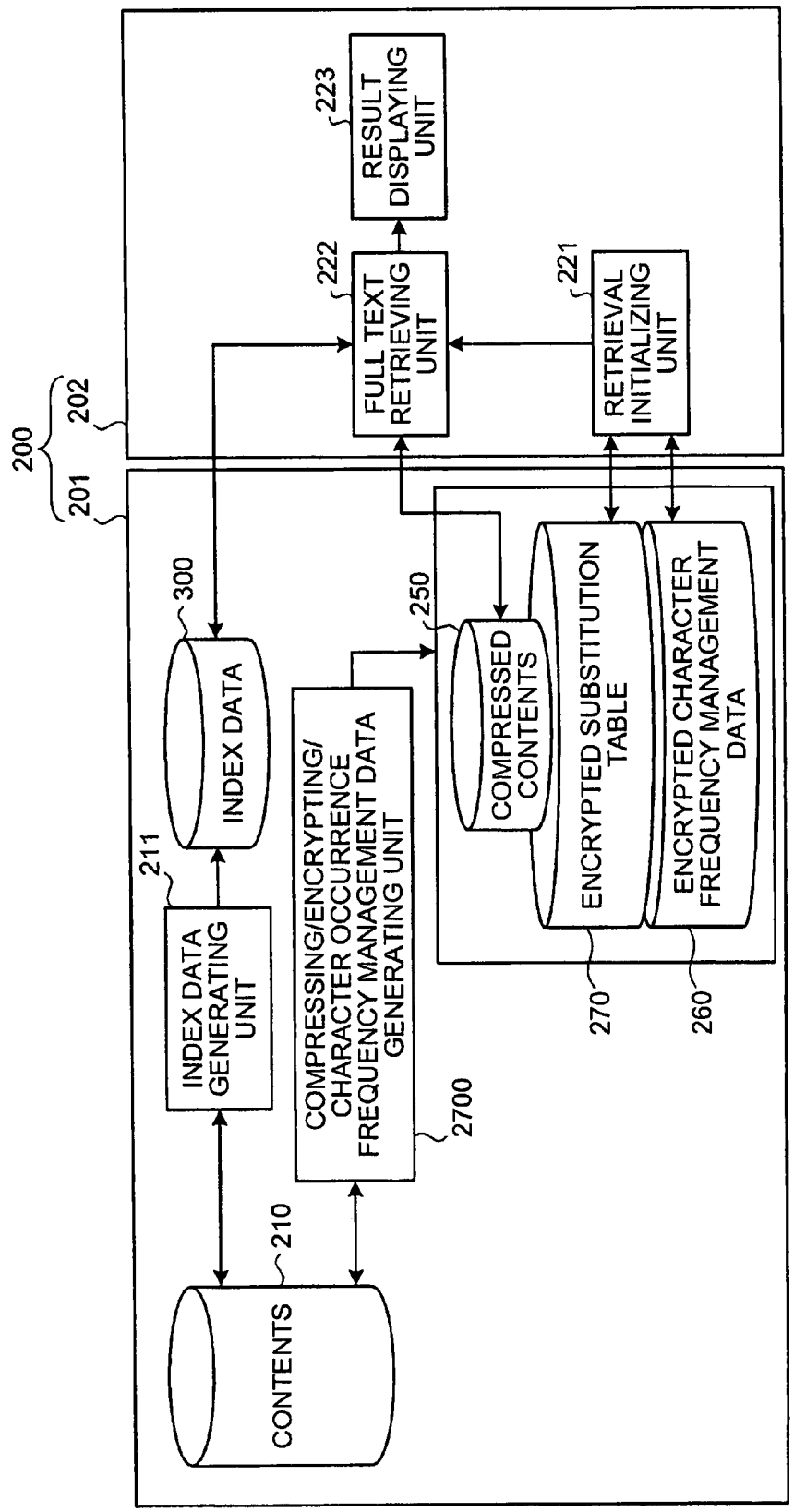
FIG. 27 is a function diagram of an information retrieval apparatus according to a second embodiment of the present invention.

FIG. 27 is a function diagram of configuration of the information retrieval apparatus according to the second embodiment of the present invention. The editing unit 201 includes a compressing/encrypting/character frequency management data generating unit 2700 in place of the character frequency management data generating unit 212 and the compressing/encrypting unit 213 shown in FIG. 2.

Figure 28:
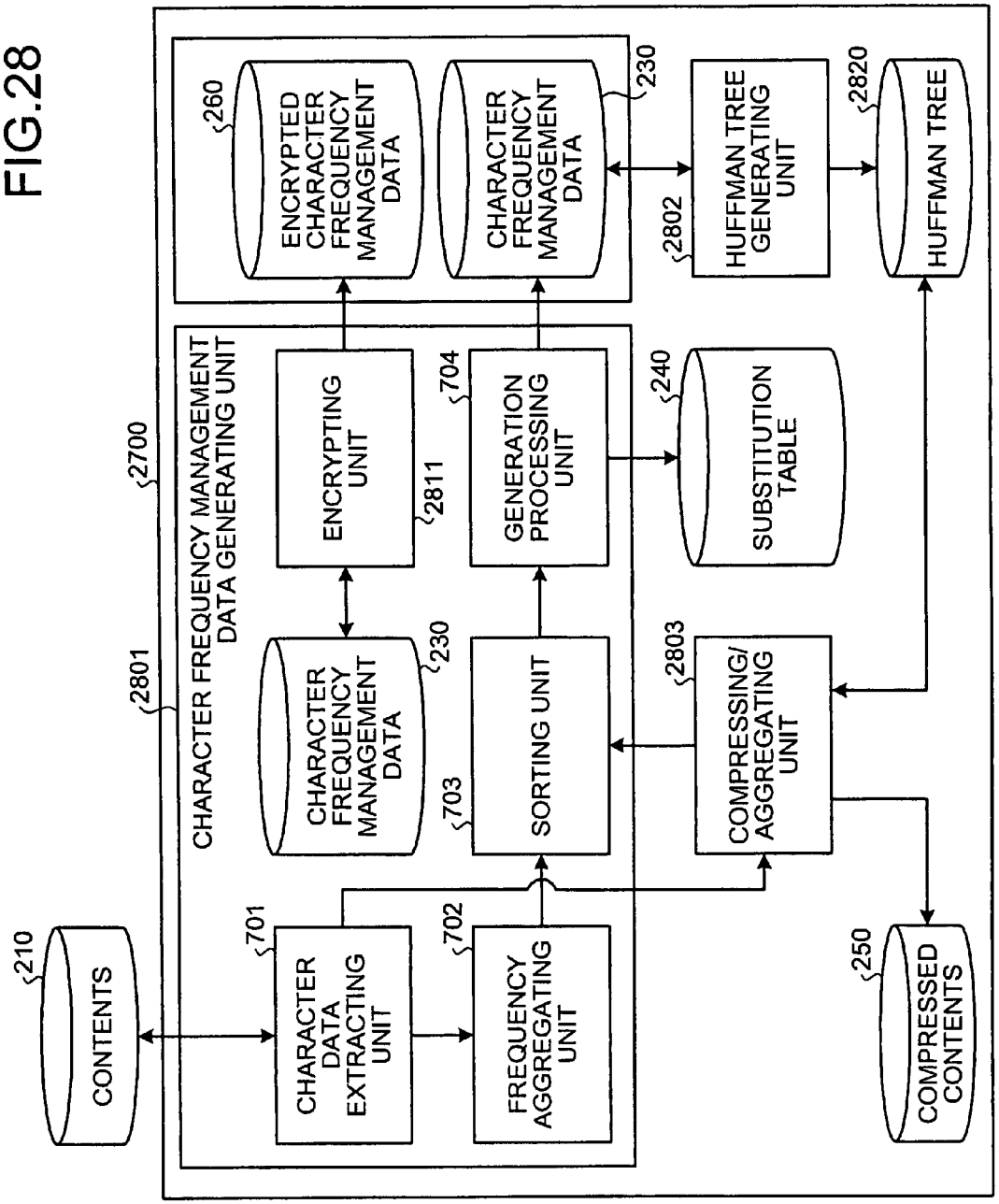
FIG. 28 is a function diagram of a compressing/encrypting/character frequency management data generating unit.

FIG. 28 is a function diagram of the compressing/encrypting/character frequency management data generating unit 2700. The compressing/encrypting/character frequency management data generating unit 2700 includes a character frequency management data generating unit 2801, a Huffman tree generating unit 2802, and a compressing/aggregating unit 2803.

The character frequency management data generating unit 2801 includes the character data extracting unit 701, the frequency aggregating unit 702, the sorting unit 703, the generation processing unit 704, and an encrypting unit 2811. The encrypting unit 2811 generates the encrypted character frequency management data 260 by encrypting the character frequency management data 230 generated by the generation processing unit 704 by XOR using a predetermined master key. The encrypting unit 2811 also encrypts the substitution table 240.

The Huffman tree generating unit 2802 generates a Huffman tree 2820 for character frequency management data of one file to be retrieved generated by the generation processing unit 704, e.g., for the character frequency management data 230-$i$ of file number #i (i=0 to n). The compressing/aggregating unit 2803 counts occurrence frequency in the content 210 of character data extracted by the character data extracting unit 701 and compresses the counted character data by the Huffman tree 2820 for each character data type (kanji character, phonogram, combined character, and binary).

Figure 29:
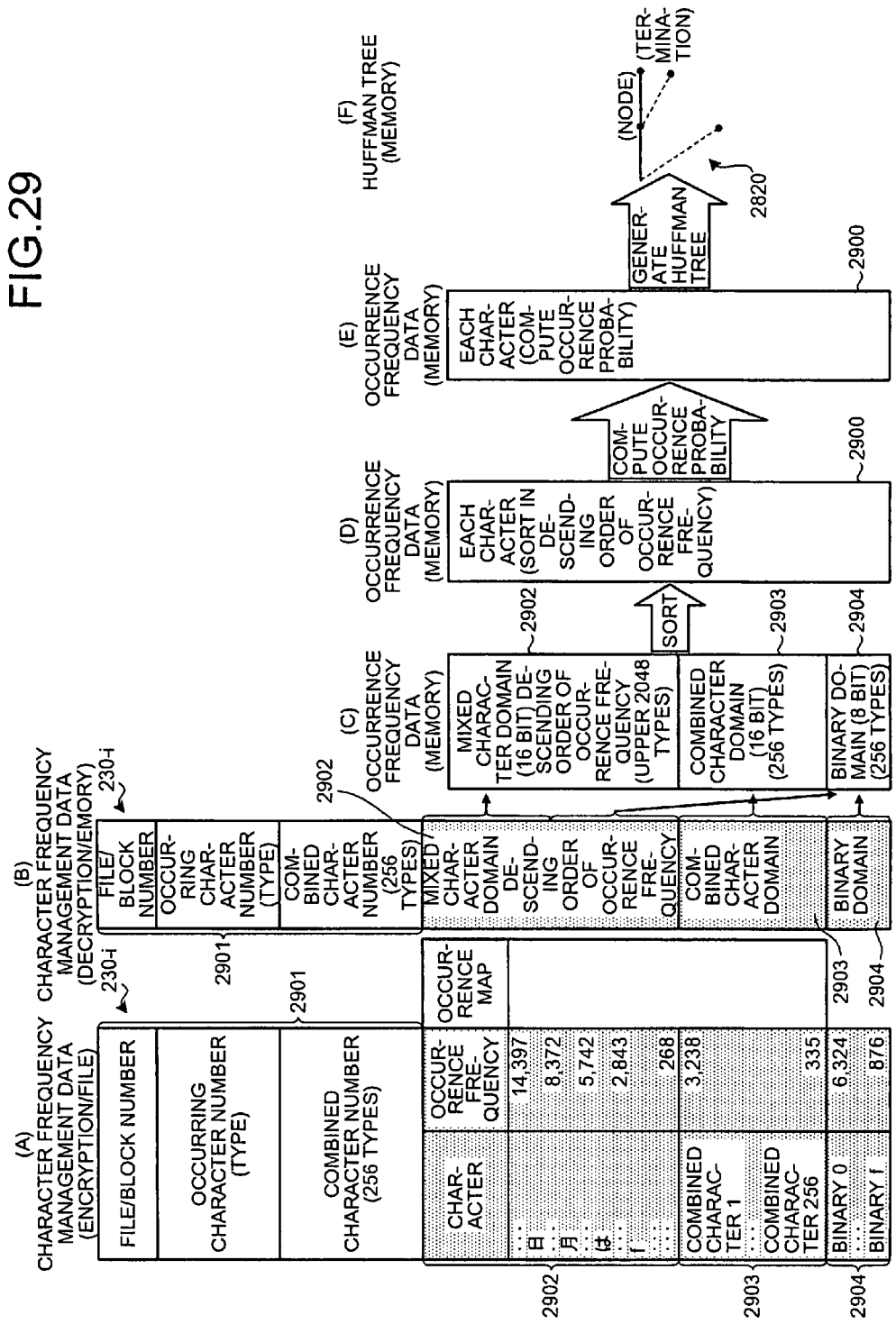
FIG. 29 is a diagram of a concrete Huffman tree generating process by a Huffman tree generating unit.

Sections (A) to (F) shown in FIG. 29 illustrate a Huffman tree generating process by the Huffman tree generating unit 2802. Section (A) shows the character frequency management data 230-$i$.

A reference numeral 2901 in the character frequency management data 230-$i$ of Section (A) denotes a management domain of character frequency management data 230. The management domain 2901 includes the number of files/blocks, the number of types of occurring character data (occurring character number (type)), the number of combined character/supplementary character data (combined character number (256 types)), and the number of binary data (binary (256 types), not shown).

A reference numeral 2902 denotes a mixed character domain including occurrence frequencies, occurring file number (not shown), occurrence order (not shown), and occurrence maps of standard character data and supplementary character data such as alphanumeric characters, katakana characters, symbols of 8-bit series (ASCII), alphanumeric characters, katakana characters, symbols of 16-bit series (JIS), and kana and kanji characters of 16-bit series (JIS).

A reference numeral 2903 denotes a combined character domain including occurrence frequencies, occurring file number (not shown), occurrence order (not shown), and occurrence maps of combined character data. A reference numeral 2904 denotes a binary domain including occurrence frequencies, occurring file number (not shown), and occurrence order (not shown) of 8-bit binary data.

The character frequency management data 230-$i$ of Section (A) is expanded in a memory as shown in Section (B). Character data having a low occurrence frequency extracted from the mixed character domain 2902 of Section (B) is fragmented and stored in the binary domain 2904 of (Section (C)).

All character data in the mixed character domain 2902, the combined character domain 2903, and the binary domain 2904 in the data structure of Section (C) are sorted in descending order of occurrence frequency (Section (D)). In a domain 2900 of Section (D), the occurrence probability of each character data is computed using the occurrence frequency as a parameter of Huffman compression (Section (E)). A Huffman tree 2820 is consequently generated (Section (F)) at a step of Section (E) based on the occurrence probability of each character data.

Figure 30:
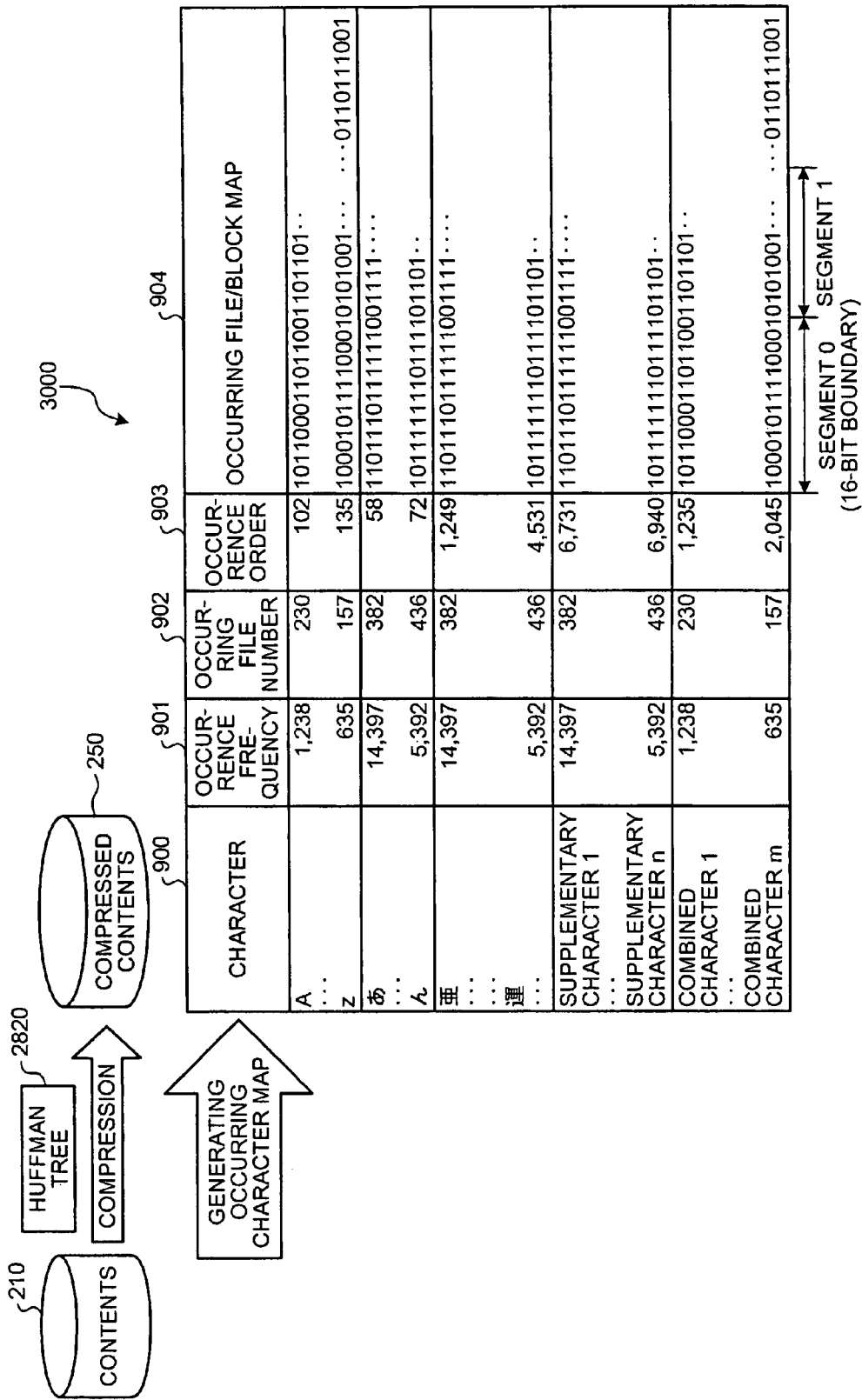
FIG. 30 is a diagram of a compressing and an occurrence map generating process by a compressing/aggregating unit.

FIG. 30 is a diagram showing compressing and occurrence map generating processes by the compressing/aggregating unit 2803. The compressing/aggregating unit 2803 executes a process that generates the compressed content 250 by compressing the content 210, specifically, a plurality of files to be retrieved among the content 210, by the Huffman tree 2820 in parallel with a process that generates an occurrence map 3000 that is similar to the occurrence map shown in FIG. 9, from the content 210.

Figure 31:
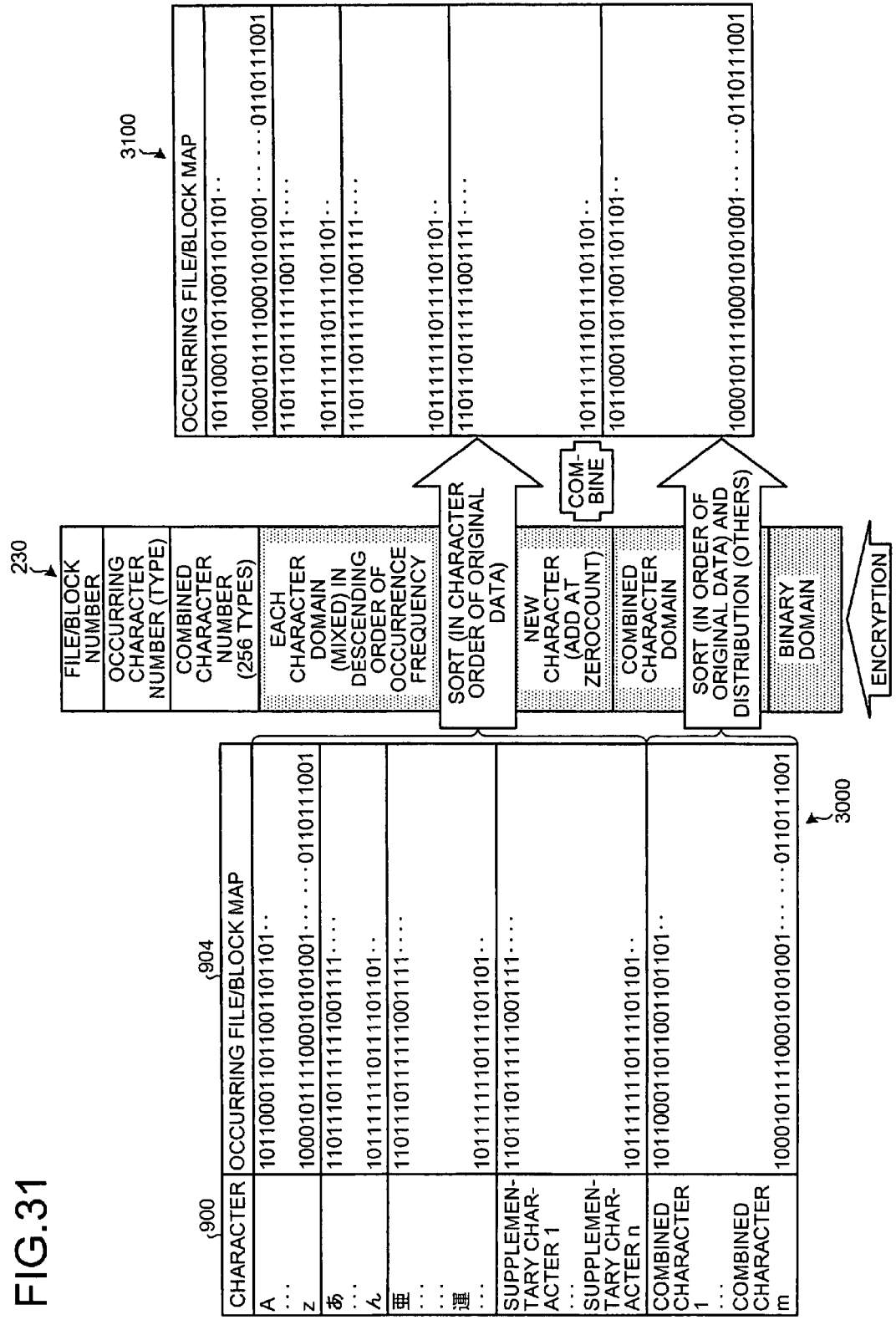
FIG. 31 is a diagram of a process by a sorting unit, a generation processing unit, and an encrypting unit.

FIG. 31 is a diagram of a process by the sorting unit 703, the generation processing unit 704, and the encrypting unit 2811. An occurrence map 3100 is generated by sorting character data in the occurrence map 3000 in descending order of occurrence frequency by the sorting unit 703 using the character frequency management data 230 generated for all files to be retrieved by the generation processing unit 704. The character frequency management data 230 is encrypted using the predetermined master key.

Figure 32:
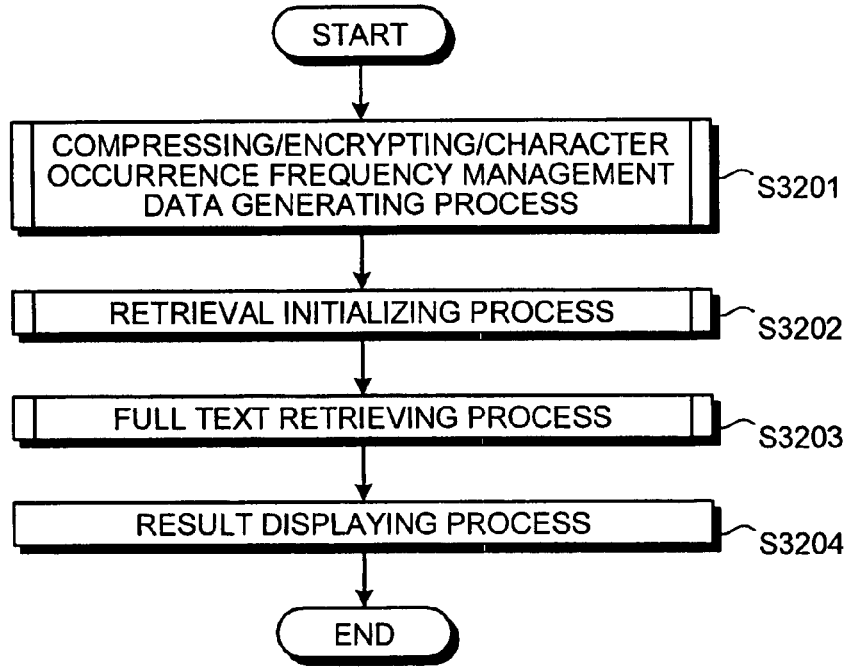
FIG. 32 is a flowchart of the information retrieval apparatus according to the second embodiment of the present invention.

FIG. 32 is a flowchart of the information retrieval apparatus according to the second embodiment. The compressing/encrypting/character frequency management data generating unit 2700 executes a compressing/encrypting/character frequency management data generating process (i-pass process) (step S3201).

A retrieval initializing unit 221 executes a retrieval initializing process (step S3202). This retrieval initializing process is similar to the retrieval initializing process (step S2103) of FIG. 21. A full text retrieving unit 222 executes a full text retrieving process (step S3203). This full text retrieving process is similar to the full text retrieving process (step S2104) of FIG. 21. The result displaying unit 223 executes a retrieval result displaying process (hereinafter, "result displaying process") (step S3204). This result displaying process is similar to the result displaying process (step S2105) of FIG. 21.

Figure 33:
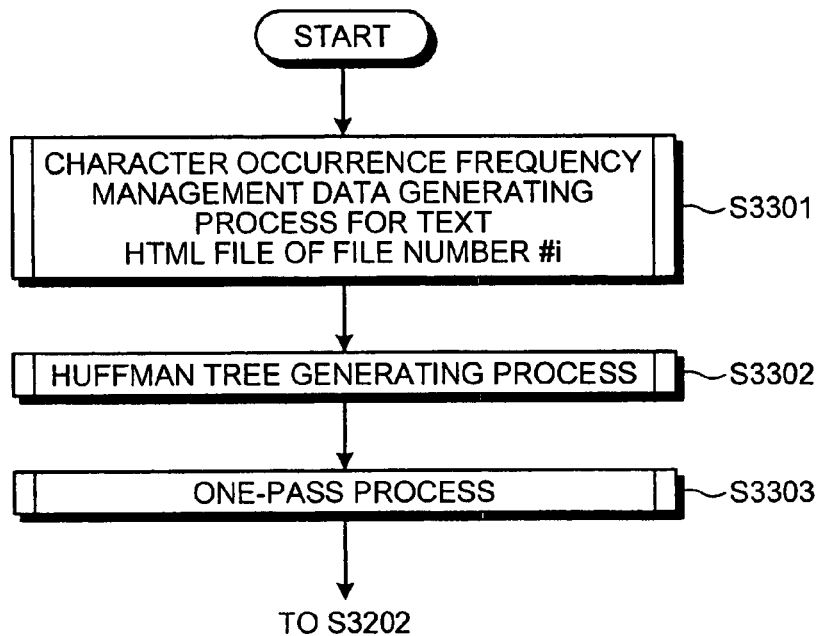
FIG. 33 is a flowchart of the compressing/encrypting/character frequency management data generating process shown in FIG. 32.

FIG. 33 is a flowchart of the compressing/encrypting/character frequency management data generating process (step S3201) of FIG. 32.

The character frequency management data generating unit 2801 executes the character frequency management data generating process for a text HTML file of file number #i (step S3301), generating the character frequency management data 230-$i$. The character frequency management data 230-$i$ is generated for a first text HTML file by setting i=1.

The Huffman tree generating unit 2802 executes a Huffman tree generating process (step S3302), generating the Huffman tree 2820. A compressing/encrypting/character frequency management data generating process (hereinafter, "one-pass processing") is executed for all text HTML files (step S3303). Hence, the character frequency management data 230 is generated and encrypted, thereby, generating the encrypted character frequency management data 260. The encrypted substitution table 270 is generated by generating and encrypting the substitution table 240. When the character frequency management data 230 is generated, the compressed content 250 is generated by compressing the content 210 by the Huffman tree 2820.

Figure 34:
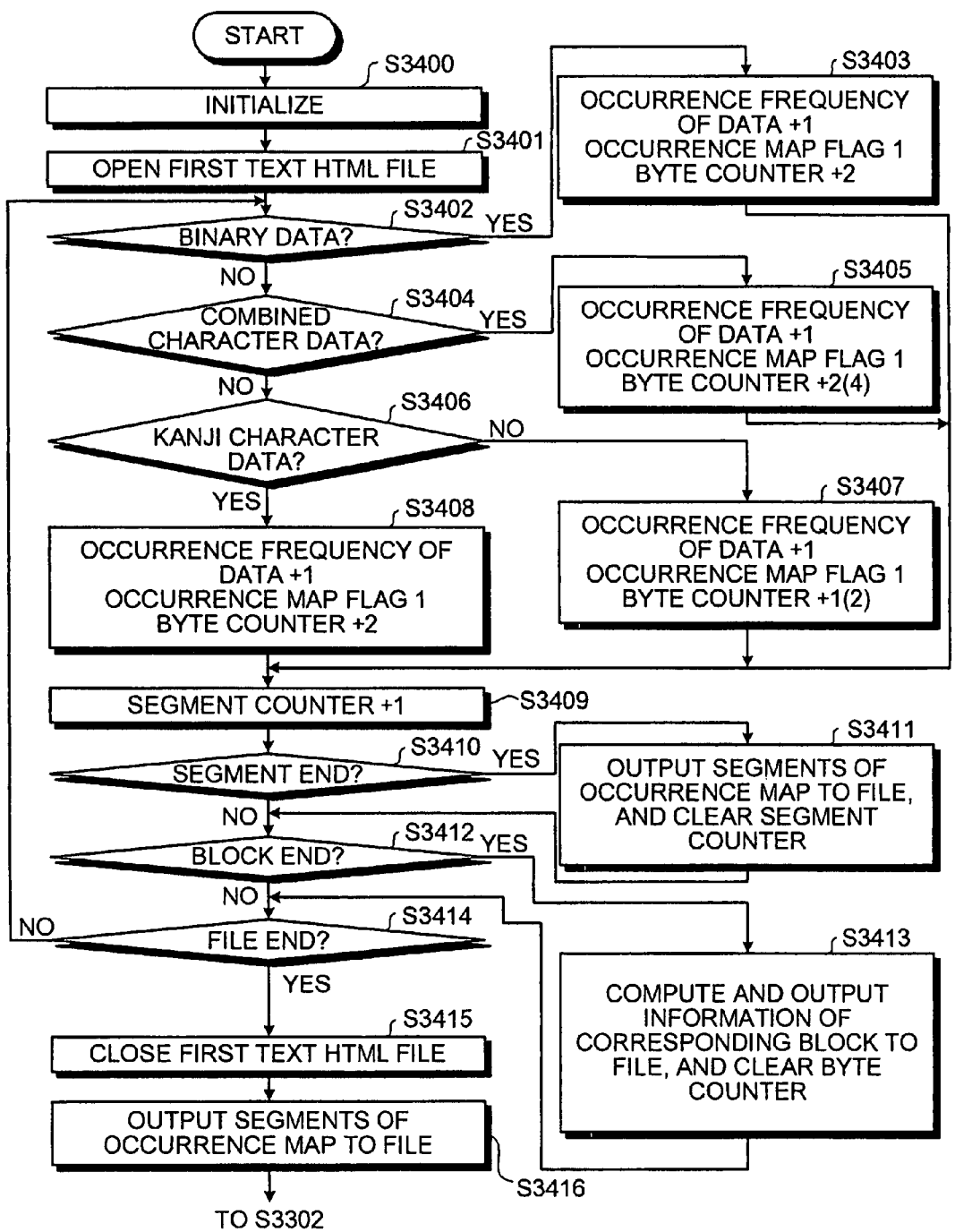
FIG. 34 is a flowchart of the character frequency management data generating process shown in FIG. 33.

FIG. 34 is a flowchart of the character frequency management data generating process (step S3301) of FIG. 33. An initializing process is executed (step S3400). Specifically, the step S3400 secures a kuten-correspondence aggregating domain for 8- and 16-bit character data, combined character data, and binary data, and initializes segments of occurrence frequency and occurrence map. Codes of character data are set, and various counters are initialized.

The first (file number #0) text HTML file f0 is opened (step S3401). Data is sequentially extracted from the opened text HTML file f0. If extracted data is binary data (step S3402: YES), the occurrence frequency of the data is increased by one point, the presence/absence flag in the occurrence map of the data is set as "1", and the byte counter is increased by two points (step S3403).

On the other hand, if the data extracted is determined not to be binary data at the step S3402 (step S3402: NO), it is determined whether the data is combined character data (step S3404). If the data is combined character data (step S3404: YES), the occurrence frequency of the data is increased by one point, the presence/absence flag in the occurrence map of the data is set as "1", and the byte counter is increased by two (or four) points (step S3405).

On the other hand, if the data extracted is determined not to be combined character data at the step S3404 (step S3404: NO), it is determined whether the data is kanji character data (step S3406). If the data is determined not to be kanji character data (step S3406: NO), the data is determined to be phonogram data, and thus the occurrence frequency of the data is increased by one point, the presence/absence flag in the occurrence map of the data is set as "1", and the byte counter is increased by one (or two) points (step S3407).

On the other hand, if the extracted data is kanji character data (step S3406: YES), the occurrence frequency of the data is increased by one point, the presence/absence flag in the occurrence map of the data is set as "1", and the byte counter is increased by two points (step S3408).

A segment counter of segment of the occurrence map is increased by one point (step S3409). It is determined whether aggregation of segments has finished (step S3410). If aggregation of segments has finished (step S3410: YES), segments of the occurrence map are additionally output to the file, and the segment counter is cleared (step S3411), and the process proceeds to step S3412.

On the other hand, if aggregation of segment has not finished (step S3410: NO) or after the step S3411, at step S3412 it is determined whether block aggregation has ended, e.g., whether number of aggregated character has reached 4000 characters.

If block aggregation has ended (step S3412: YES), the file number of the text HTML file that includes the block data, and block information that includes the block number of the block data, offsets, the number of characters, and lengths are computed and additionally output to the file, and the byte counter is cleared (step S3413). The process proceeds to step S3414.

On the other hand, if block aggregation has not ended (step S3412: NO) or after the step S3413, at step S3414 it is determined whether the file aggregation has ended, e.g., whether aggregation of the text HTML file presently open has finished. If aggregation of the text HTML file presently open has not finished (step S3414: NO), the process returns to the step S3402, the next data is extracted, the type is identified, and aggregation is performed (steps S3402 to S3408).

On the other hand, if aggregation of the first text HTML file presently open is determined to have finished (step S3414: YES), the text HTML file is closed (step S3415). Segments of the occurrence map are additionally output to the file (step S3416), and a series of process ends shifting to the step S3302.

FIG. 35 is a flowchart of the Huffman tree generating process (step S3302) of FIG. 33. Character data in the mixed character domain 2902 (see FIG. 29) are sorted in descending order of occurrence frequency (step S3501).

Character data of low occurrence frequencies are fragmented into 8-bit fragments and added to the occurrence frequency of corresponding binary data (step S3502). Character data in the mixed character domain 2902, combined character/supplementary character data, and binary data are combined and sorted in descending order of occurrence frequency (step S3503). Occurrence probability is computed based on occurrence frequency for each of sorted character data (step S3504). Based on the occurrence probabilities, a Huffman tree 2820 common to 8- and 16-bit character data is generated (step S3505). A series of protocols ends, and the process returns to the step S3303.

Figure 36A:
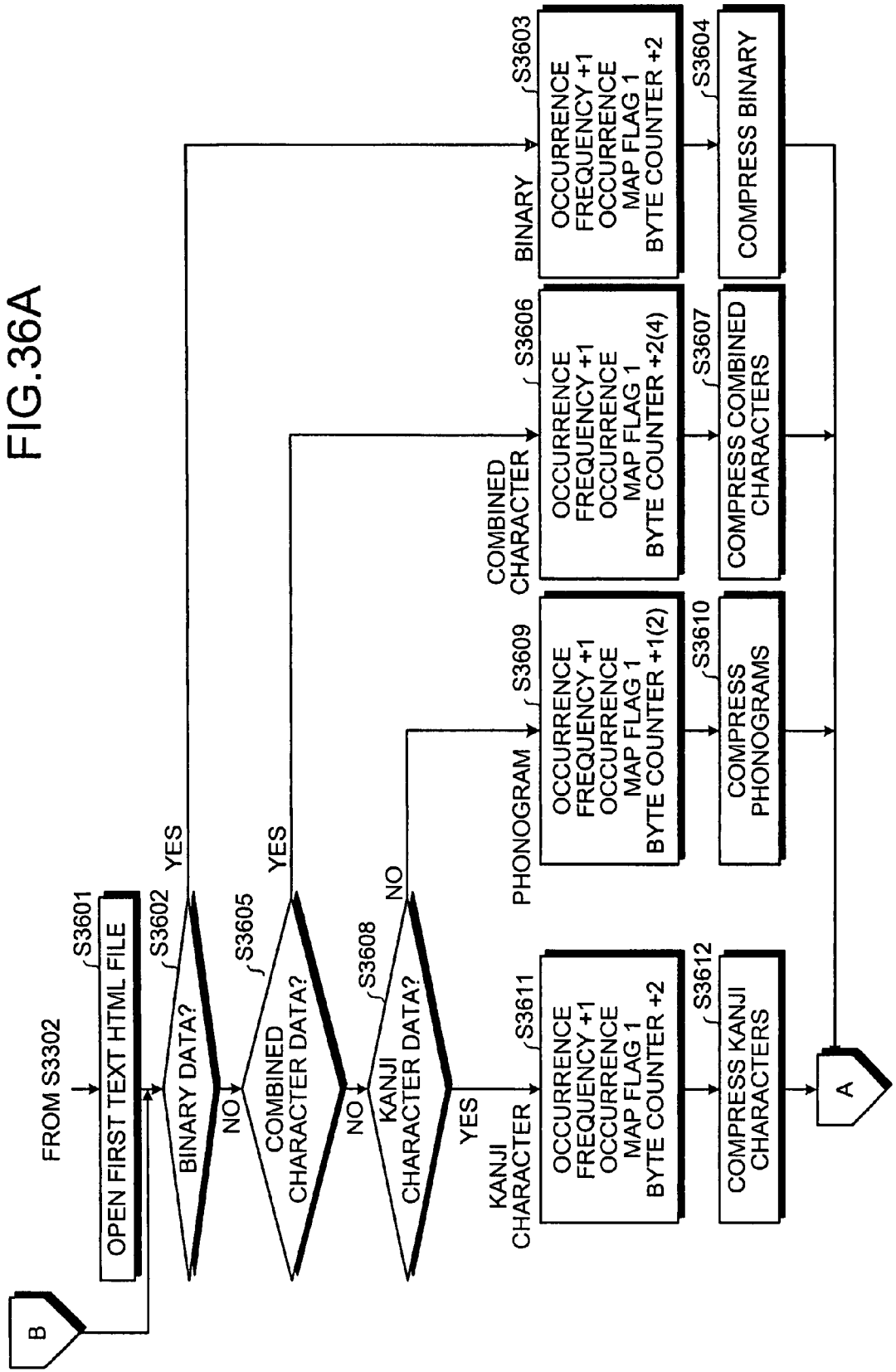
FIG. 36A is a flowchart (part 1) of the character frequency management data generating/encrypting process and the content compressing/encrypting process of text HTML files shown in FIG. 33.
Figure 36B:
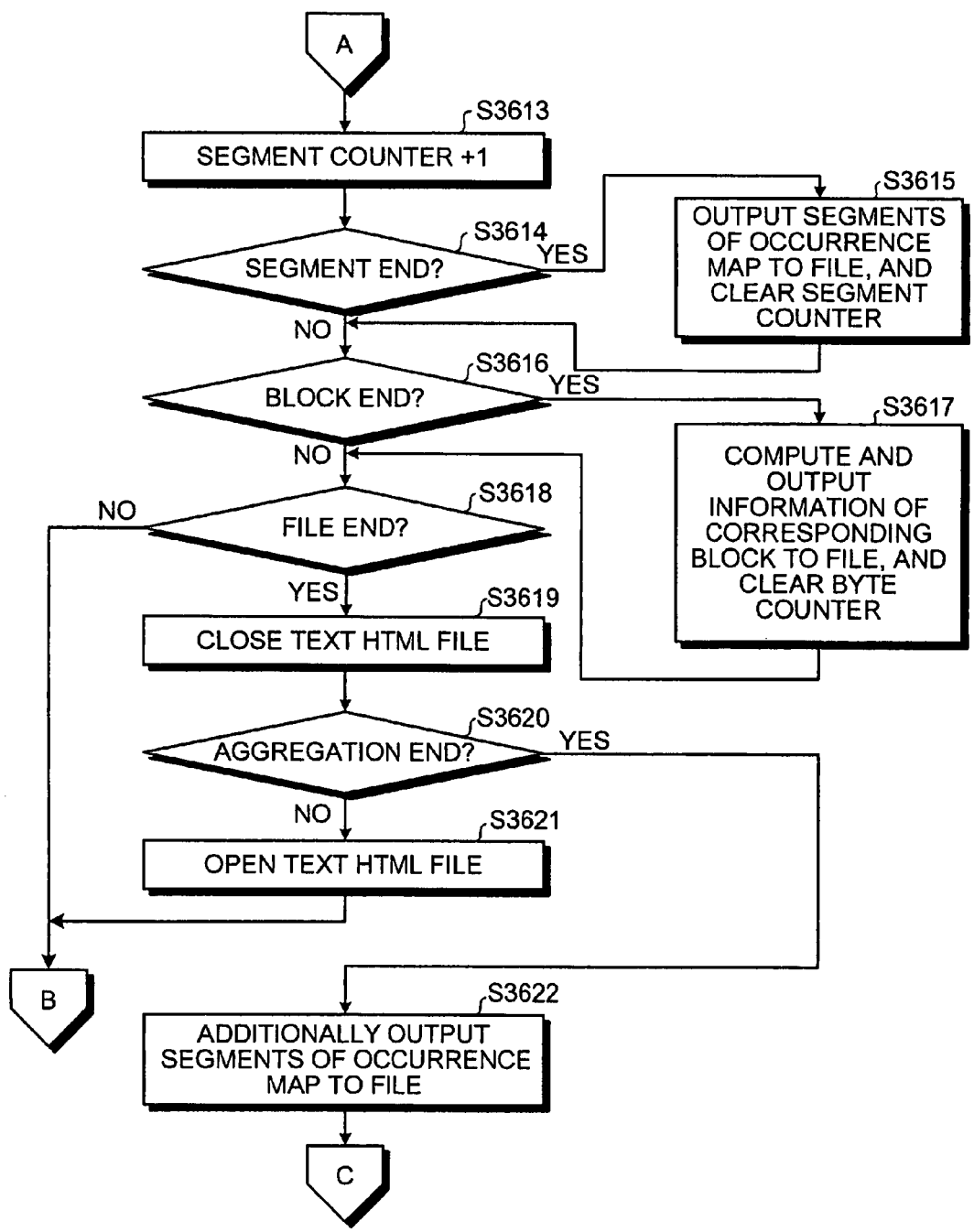
FIG. 36B is a flowchart (part 2) of the character frequency management data generating/encrypting process and the content compressing/encrypting process of text HTML files shown in FIG. 33.
Figure 36C:
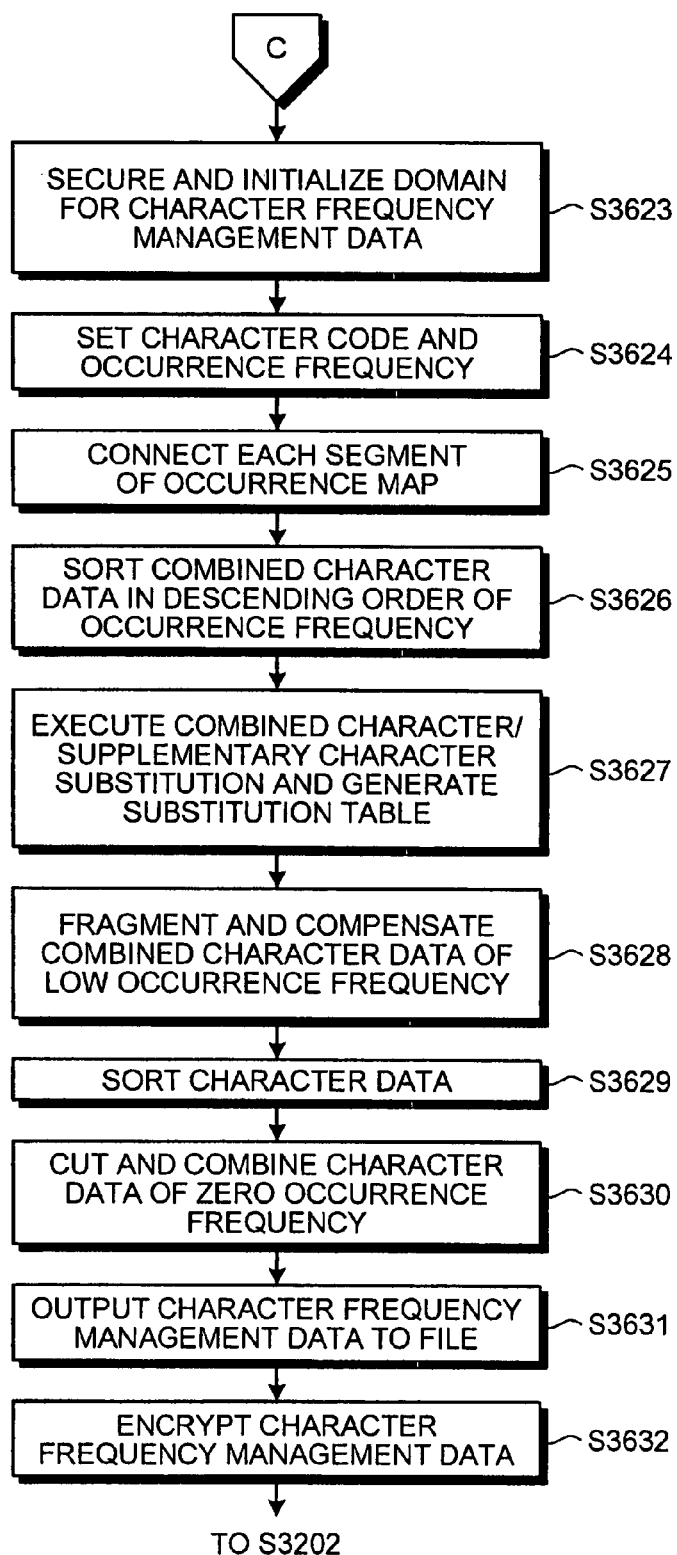
FIG. 36C is a flowchart (part 3) of the character frequency management data generating/encrypting process and the content compressing/encrypting process of text HTML files shown in FIG. 33.

FIGS. 36A to 36C are flowcharts of the one-pass process (step S3303) of FIG. 33. As shown in FIG. 36A, the first (file number #0) text HTML file f0 is opened (step S3601). Data is sequentially extracted from the opened text HTML file f0. If the extracted data is binary data (step S3602: YES), the occurrence frequency of the data is increased by one point, the presence/absence flag in the occurrence map of the data is set as "1", and the byte counter is increased by two points (step S3603). The data is compressed by the Huffman tree 2820 (step S3604), and the process proceeds to step S3613 of FIG. 36B.

On the other hand, if the extracted data is determined not to be binary data at the step S3602 (step S3602: NO), it is determined whether the data is combined character data (step S3605). If the data is combined character data (step S3605: YES), the occurrence frequency of the data is increased by one point, the presence/absence flag in the occurrence map of the data is set as "1", and the byte counter is increased by two (or four) points (step S3606). The data is compressed by the Huffman tree 2820 (step S3607), and the process proceeds to the step S3613 of FIG. 36B.

On the other hand, if the extracted data is determined not to be combined character data at the step S3605 (step S3605: NO), it is determined whether the data is kanji character data (step S3608). If the data is determined not to be kanji character data (step S3608: NO), the data is determined to be phonogram data, and thus the occurrence frequency of the data is increased by one point, the presence/absence flag in the occurrence map of the data is set as "1", and the byte counter is increased by one (or two) points (step S3609). The data is compressed by the Huffman tree 2820 (step S3610), and the process proceeds to the step 3613 of FIG. 36B.

On the other hand, if the extracted data is kanji character data (step S3608: YES), the occurrence frequency of the data is increased by one point, the presence/absence flag in the occurrence map of the data is set as "1", and the byte counter is increased by two points (step S3611). The data is compressed by the Huffman tree 2820 (step S3612), and the process proceeds to the step 3613 of FIG. 36B.

As shown in FIG. 36B, a segment counter of segment of the occurrence map is increased by one point (step S3613). It is determined whether aggregation of segments has finished (step S3614). If aggregation of segments has finished (step S3614: YES), segments of the occurrence map are additionally output to the file, and the segment counter is cleared (step S3615), and the process proceeds to step S3616.

On the other hand, if aggregation of segments has not finished (step S3614: NO) or after the step S3615, at step S3616 it is determined whether block aggregation has ended, e.g., whether number of aggregated character has reached 4000 characters.

If block aggregation has ended (step S3616: YES), the file number of the text HTML file that includes block data, and block information that includes the block number of the block data, offsets, the number of characters, and lengths are generated and additionally output to the file, and the byte counter is cleared (step S3617), shifting to step S3618.

On the other hand, if block aggregation has not ended (step S3616: NO) or after the step S3617, at step S3618 it is determined whether file aggregation has ended, i.e., whether aggregation of the text HTML file presently open has finished. If aggregation of the text HTML file presently open has not finished (step S3618: NO), the process returns to the step S3602 of FIG. 36A.

On the other hand, if aggregation of the text HTML file presently open is determined to have finished (step S3618: YES), the text HTML file is closed (step S3619). It is determined whether aggregation of all text HTML files has finished (step S3620).

If aggregation of all text HTML files has not finished (step S3620: NO), a text HTML file of the next file number is opened (step S3621), the process returns to the step S3602 of FIG. 36A.

On the other hand, if aggregation of all text HTML files is determined to have finished (step S3620: YES), segments of the occurrence map are additionally output to the file (step S3622), and the process proceeds to the step S3623 of FIG. 36C.

As shown in FIG. 36C, a domain for the character frequency management data 230 is secured and initialized (step S3623). Character codes and occurrence frequencies of 8- and 16-bit character data, combined character data, and binary data are set (step S3624).

Each segment of the occurrence map is linked (step S3625). Two hundred fifty-six types of combined character data are selected by sorting combined character data in the combined character domain 2903 in descending order of occurrence frequency (step S3626), thereby reducing combined character data.

Combined character/supplementary character substitution is executed, and the substitution table 240 is generated (step S3627). Specifically, combined character/supplementary character data and the substitution table 240 are generated by substituting combined character data with supplementary character data in descending order of occurrence frequency.

Combined character data of low occurrence frequencies, i.e., combined character data that has not been substituted with supplementary character data, is fragmented into single-character data and assigned to corresponding character domain for compensation (step S3628). In other words, combined character data of low occurrence frequency is fragmented into phonograms, and addition of frequencies and OR of occurrence map of the character data are calculated.

The character data is sorted in descending order of occurrence frequency (step S3629). Character data of zero occurrence is cut, and combined character/supplementary character data and binary data are combined (step S3630). The character frequency management data 230 obtained by the combination is output to a file (step S3631). The character frequency management data 230 is encrypted using the predetermined master key (step S3632). Thus the retrieval initializing process (step S3202, see FIG. 25) and then the full text retrieving process (step 3203, see FIG. 26) are executed.

According to the second embodiment, one-pass compression and encryption are executed by diverting a parameter of Huffman compression (Huffman tree 2820) generated for a text HTML file fi of file number #i (e.g., i=1) to another text HTML file fj (i≠j). In parallel with the one-pass compression/encryption, the occurrence map 3100 of character data in each text HTML file is generated.

When text HTML files are electronic forms, names and addresses of customers and names of items appearing do not change, and parameters of Huffman compression are substantially similar. Electronic forms have large processing volumes, and hence improved compression/encryption speed is desired. The one-pass compressing/encrypting process ensures improvement of compressing/encrypting speed.

A discrepancy verifying system for character strings in full text retrieval, according to the first embodiment, verifies discrepancy not by decompressing compressed/encrypted data, but by compressing a retrieval keyword. While comparison is made for every one byte or character in verification of a character string of uncompressed data, comparison needs to be made shifting every one bit for compressed data as identification of boundaries among characters is difficult. A third embodiment focuses on this aspect, and a discrepancy verifying process is executed a for compressed file by a full text retrieving unit 222 based on a per-byte operation, a forte of the CPU 101 of a computer. The same reference numerals are given to configurations identical to the configurations of the first and second embodiments, omitting explanations.

Figure 37:
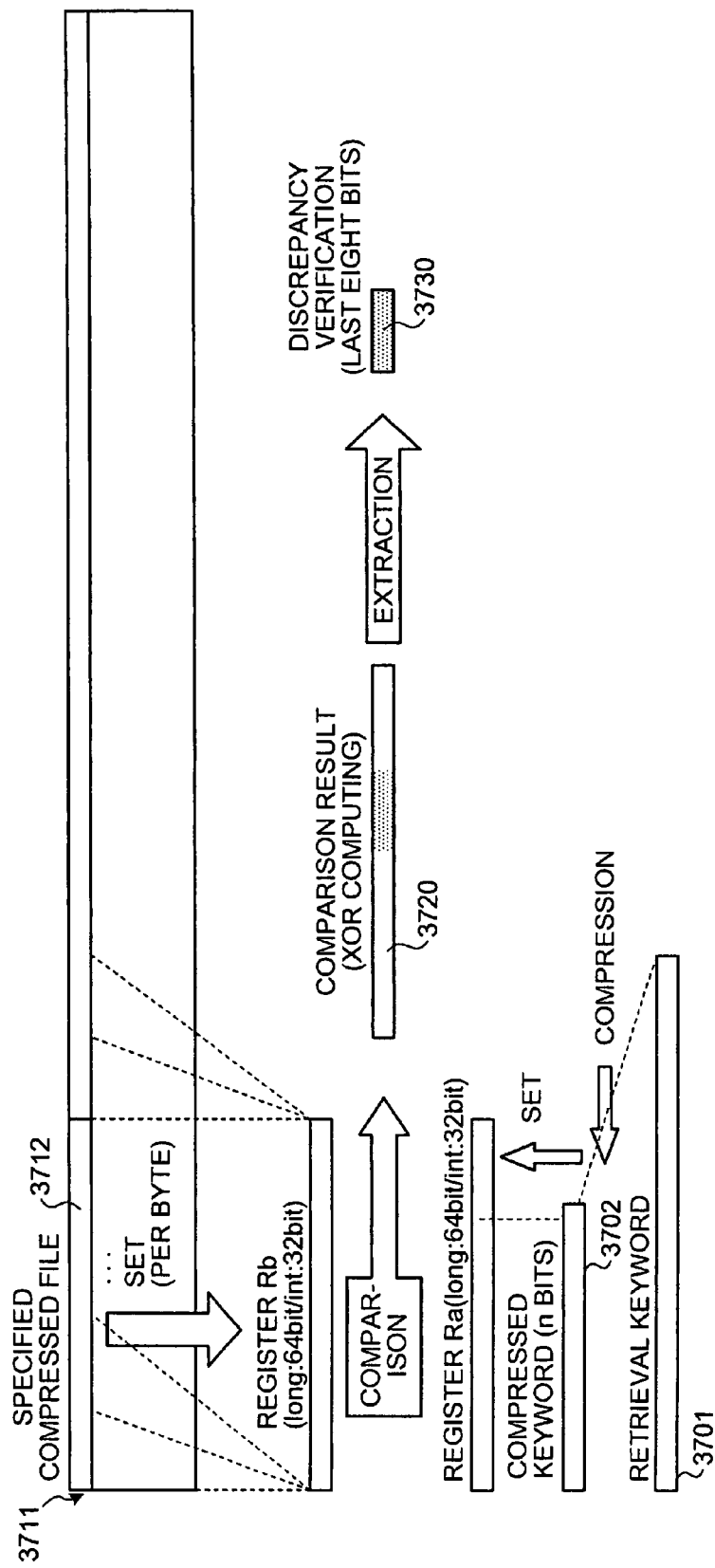
FIG. 37 is a diagram of a discrepancy verifying process according to a third embodiment.

FIG. 37 is an explanatory diagram showing a discrepancy verifying process according to the third embodiment. A keyword compressing unit 1902 of FIG. 19 compresses a retrieval keyword input from a keyword processing unit 1901 into a compressed keyword 3702 of n bit by a Huffman tree 1710 and set at a register Ra.

On the other hand, a compressed block 3712 data in a specified compressed file (compressed text HTML file) 3711 extracted by a compressed file extracting unit 1905 is set at a register Rb and compared with the compressed keyword 3702 set at the register Ra. Specifically, the compressed block data 3712, which are shifted every predetermined number of bytes, are set at the register Rb and sequentially compared with the compressed keyword 3702. A comparison result 3720 is obtained by XOR operation of the compressed keyword and the compressed block data 3712. A bit string 3730 of the last eight bits of the comparison result 3720 (FIG. 37, dot meshing) is extracted and verified for discrepancy.

FIG. 38 is a table of shift operation of the compressed block data of FIG. 37. This shift operation shifts the compressed keyword at verifying intervals corresponding to compressed size (compressed keyword length) of the compressed keyword 3702. While bit length for verification is eight bits when the compressed keyword length is 16 bits or longer, the last bits are adjusted to three to seven bits when the compressed keyword length is between 11 and 15 bits. When the compressed keyword length is between one and 10, discrepancy verification is not executed for the compressed form, but for decompressed retrieval keyword 3701.

Figure 39:
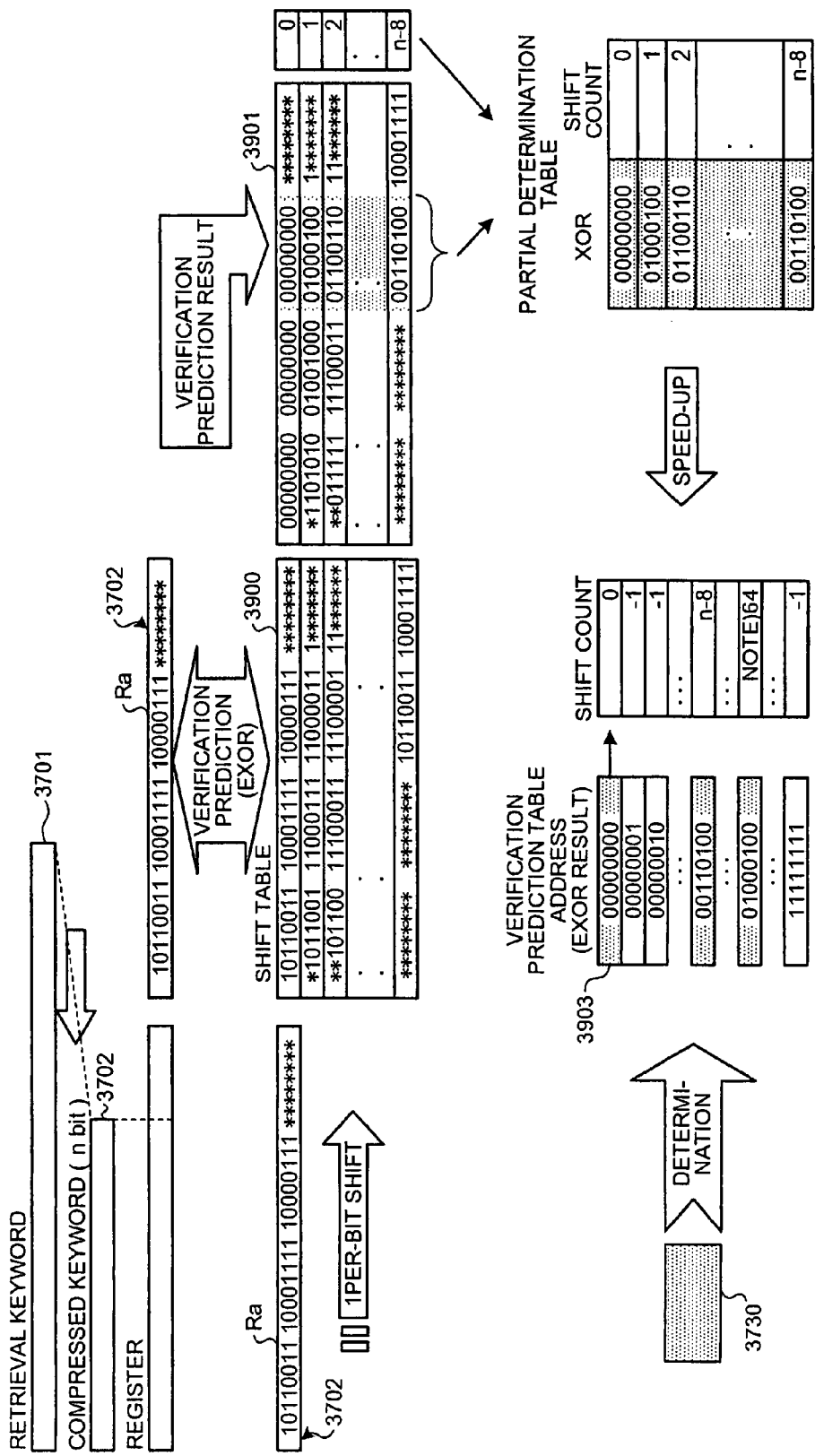
FIG. 39 is a diagram of a process of generating a verification prediction table.

FIG. 39 is a diagram of a process for generating a verification prediction table. The compressed keyword 3702 is set at the register Ra. Asterisks "*" (the last eight bits) in the register Ra indicate bits not retaining the compressed keyword 3702. A shift table 3900 is generated for the compressed keyword 3702 in the register Ra by shifting at one-bit intervals. Since the compressed keyword 3702 is n bits, the shift table 3900 is generated having shift-bit rows of shift counts from zero bit to n-8 bits.

Verification prediction between the compressed keyword 3702 set at the register Ra and the shift table 3900 is executed. Specifically, an XOR table 3901 is generated by executing XOR computing. A partial determination table 3902 is generated by coupling a partial bit string of eight bits from the 17th bit to the 24th bit, which do not include "*" (dot meshing), of each shift-bit row in the XOR table and a corresponding shift count of the shift-bit row.

A verification prediction table 3903 is generated for high speed determination. In generating the verification prediction table 3903, the partial determination table 3902 is referred to and a shift count is assigned to an 8-bit address. If bit strings having overlapping shift counts occur, "64" is assigned to the bit strings, and the partial determination table 3902 is referred to on verification. A shift count "−1" is assigned to an address that does not correspond to the partial determination table 3902. Discrepancy verification is executed by comparing the verification prediction table 3903 and the bit string 3730 for discrepancy verification.

Figure 40:
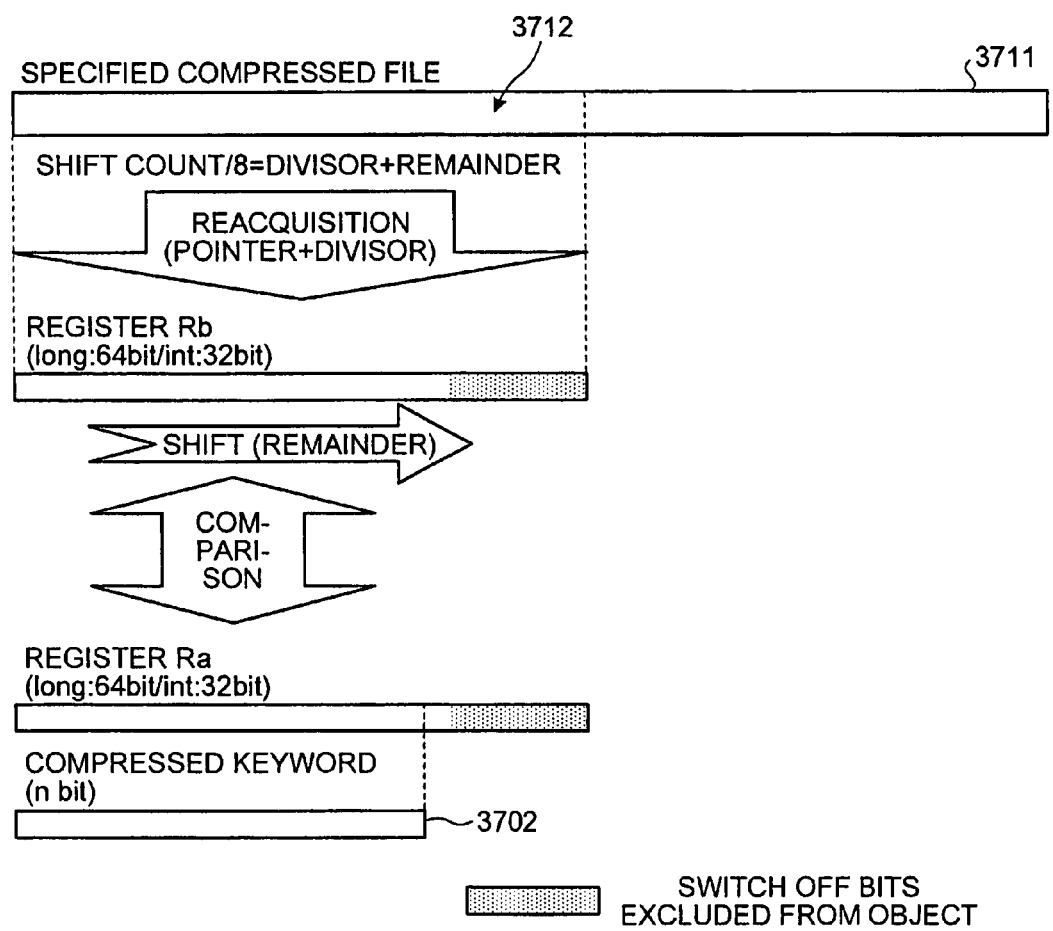
FIG. 40 is a diagram of full-bit discrepancy verifying process.

FIG. 40 is a diagram of the full-bit discrepancy verifying process. A present shift count is divided by eight to obtain a divisor and a remainder. The divisor is added to a present pointer in the specified compressed file 3711, and the compressed block data 3712 corresponding to a pointer after the addition is reacquired and set at the register Rb. The compressed block data 3712 that is set is shifted by a value of the remainder.

The compressed keyword 3702 is set at the register Ra. The registers Ra and Rb are both compared as switching off mask of bits excluded from verification object in the both registers Ra and Rb. If all bits correspond, the corresponding addresses are recorded.

Figure 41:
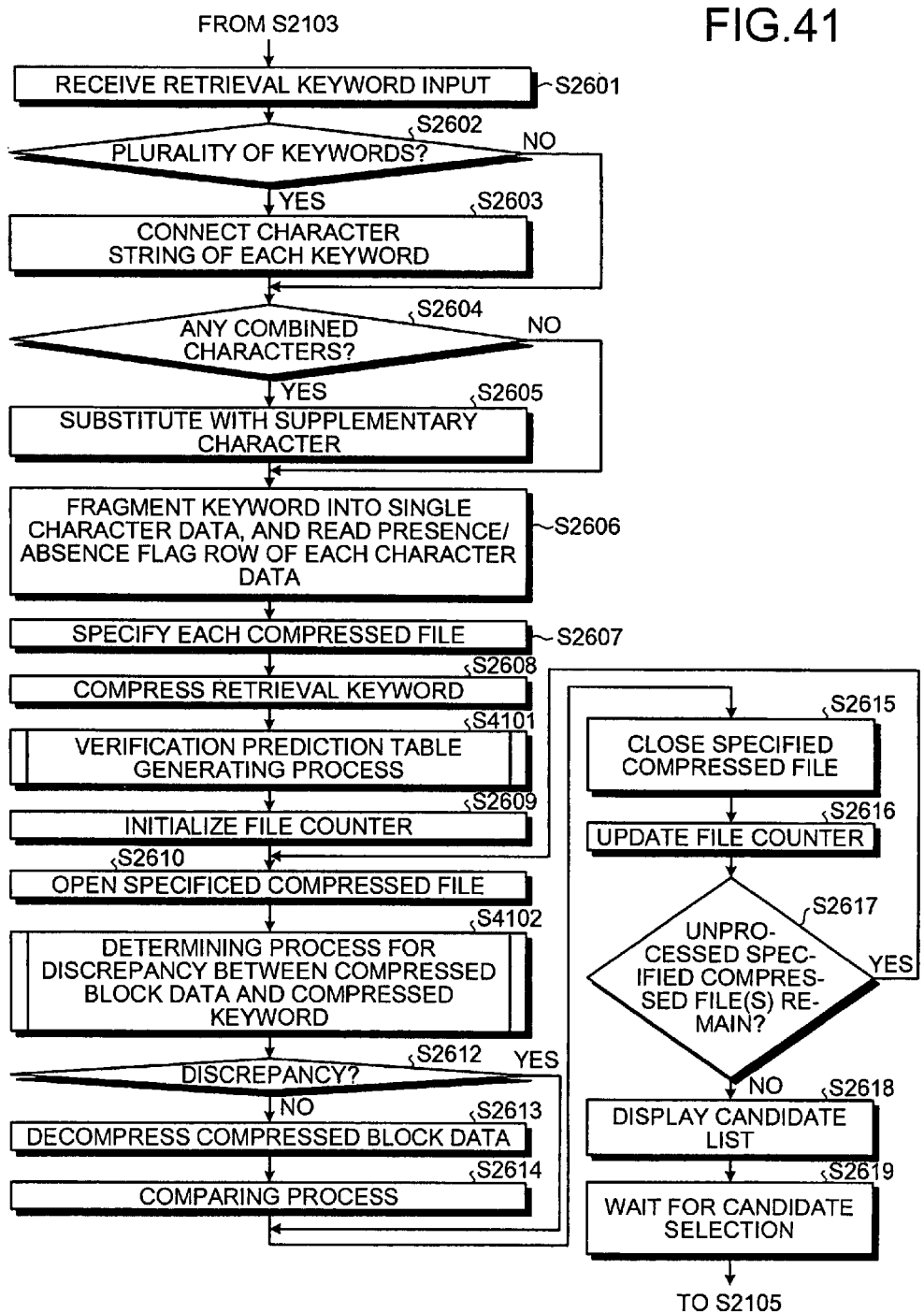
FIG. 41 is a flowchart of a full text retrieval protocol of an information retrieval apparatus according to the third embodiment of the present invention.

FIG. 41 is a flowchart of a full text retrieval protocol of an information retrieval apparatus according to the third embodiment of the present invention. A verification prediction table generating process (step S4101) is executed between steps S2608 and S2609 of FIG. 26. A discrepancy determining process (step S4102) between compressed block data and a compressed keyword is executed instead of step S2611. The same step numbers are given to processes identical with processes of FIG. 26, omitting explanations.

Figure 42:
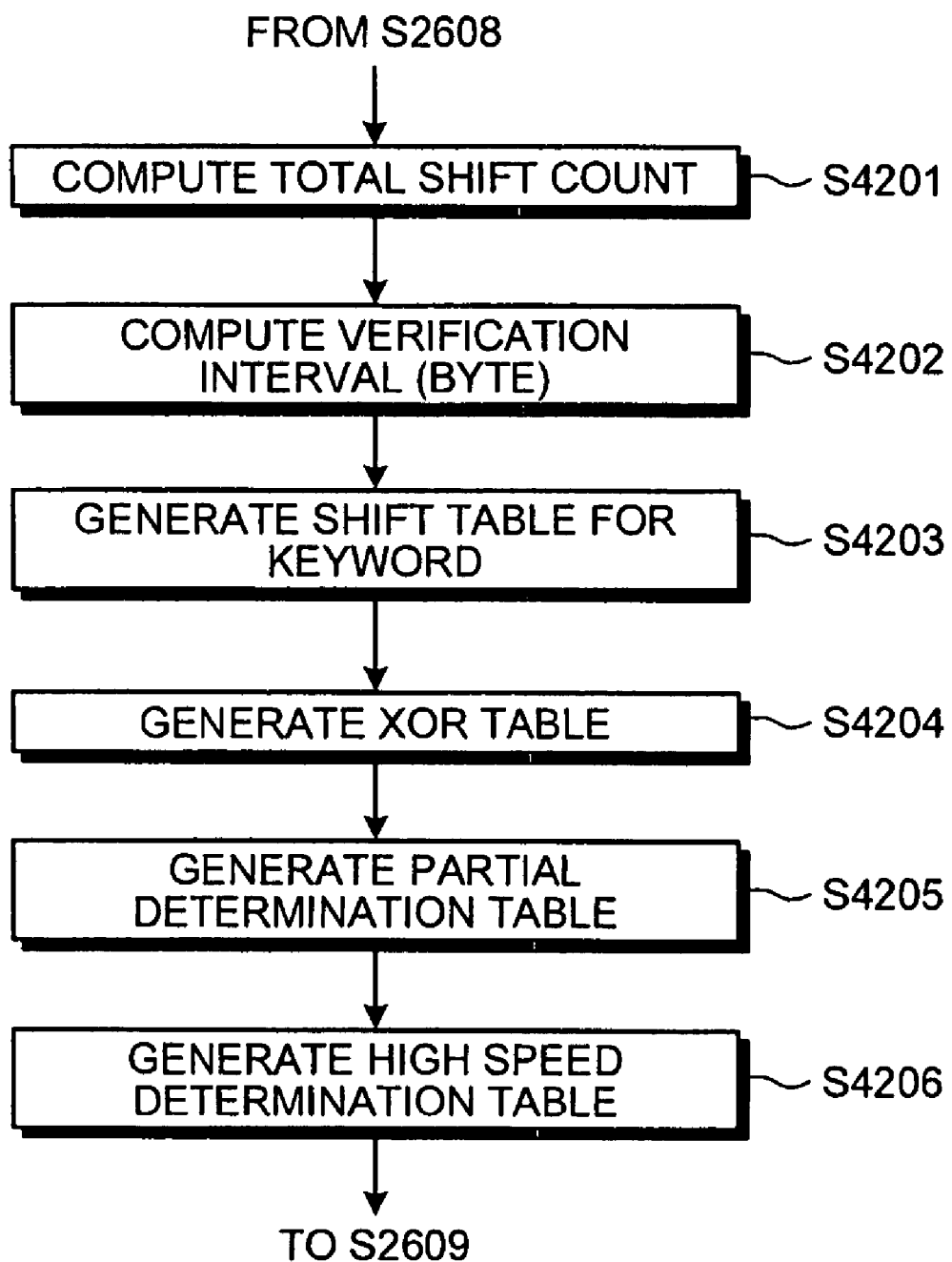
FIG. 42 is a flowchart of a verification prediction table generating protocol.

FIG. 42 is a flowchart of a verification prediction table generating protocol. A total shift count of a compressed keyword 3702 is computed (step S4201). Specifically, bit length in which the compressed keyword is not retained ("*" of FIG. 39) is computed as the total shift count based on compressed keyword length and bit length of the register Ra.

A verification interval (number of bytes) is computed referring to a shift operation table of FIG. 38 (step S4202). The shift table 3900 is generated for the compressed keyword 3702 shifting by one bit up to the total shift count (step S4203). The XOR table 3901 is generated by XOR computing each bit string of the shift table 3900 and the compressed keyword 3702 (step S4204).

The partial determination table 3902 is generated having the generated XOR table 3901 and shift counts of each bit string configuring the XOR table 3901 (step S4205). The verification prediction table 3903 is generated from the partial determination table 3902 (step S4206), and the process proceeds to step S2609.

Figure 43:
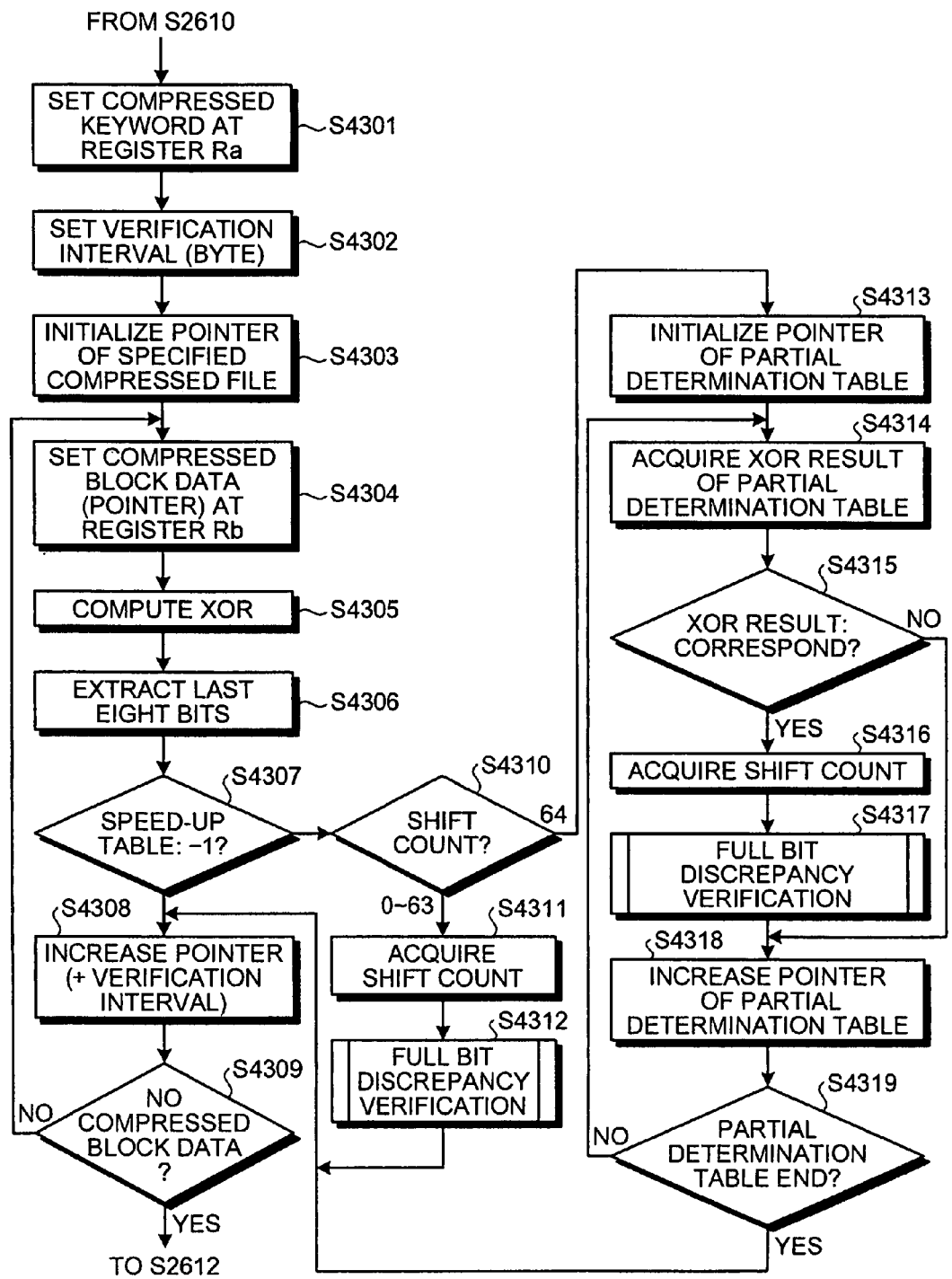
FIG. 43 is a flowchart for determining discrepancy between compressed block data and a compressed keyword

The discrepancy determining process (step S4102) for determining discrepancy between compressed block data and a compressed keyword is explained. FIG. 43 is a flowchart of a protocol for determining discrepancy between compressed block data and a compressed keyword. The compressed keyword 3702 is set at the register Ra (step S4301).

A verification interval (number of bytes) to shift the compressed block data 3712 is set (step S4302). A pointer of the specified compressed file 3711 is initialized (step S4303). The compressed block data 3712 is set at the register Rb based on the present pointer (step S4304). The registers Ra and Rb are XOR computed (step S4305), extracting the bit string 3730 of the last eight bits (step S4306).

The extracted bit string 3730 of the last eight bits is compared with the verification prediction table 3903, a shift count of a bit string corresponding to the bit string 3730 of last eight bits from bit strings in the verification prediction table 3903 is detected, and it is determined whether the detected shift count is "−1", i.e., a discrepancy exists (step S4307).

If a shift count is "−1" (step 4307: YES), the pointer of the specified compressed file 3711 is increased by points similar to the verification interval (step S4308). Existence of the compressed block data 3712 is determined (step S4309). If the compressed block data 3712 exists (step S4309: NO), the process returns to the step 4304. On the other hand, if the compressed block data 3712 does not exist (step S4309: YES), the process proceeds to the step S2612. A loop of the steps S4303 to S4309 ensures fast discrepancy verification and thus improves the speed of retrieval.

If a shift count is not "−1" at the step S4307 (step S4307: NO), and the shift count is 0 to 63 (step S4310: 0 to 63), i.e., partial correspondence, the shift count is acquired (step S4311), and the full-bit discrepancy verifying process (step S4312) is executed, and the process proceeds to the step S4308. The full-bit discrepancy verifying process (step S4312) is explained hereinafter.

If a shift count is 64 at the step S4310 (step S4310: 64), i.e., overlapped partial correspondence, a pointer in the partial determination table 3902 is initialized (step S4313). An XOR result of partial determination table 3902 corresponding to the present pointer is acquired (step S4314). It is determined whether a corresponding bit string and the XOR result of partial determination table 3902 (step S4315) correspond. If there is discrepancy (step S4315: NO), the process proceeds to step S4318.

On the other hand, if there is correspondence (step S4315: YES), a shift count corresponding to the XOR result is acquired from the partial determination table 3902 (step S4316). A full-bit discrepancy verifying process (step S4317) is executed. As the full-bit discrepancy verifying process (step S4317) is similar to the full-bit discrepancy verifying process (step S4312), explanation is provided hereinafter.

After the full-bit discrepancy verifying process (step S4317), the pointer in the partial determination table 3902 is increased (step S4318). If a present pointer in the partial determination table 3902 is not the last pointer (step S4319: NO), the process returns to the step S4314. On the other hand, if a present pointer in the partial determination table 3902 is the last pointer (step S4319: YES), the process proceeds to step S4308.

Figure 44:
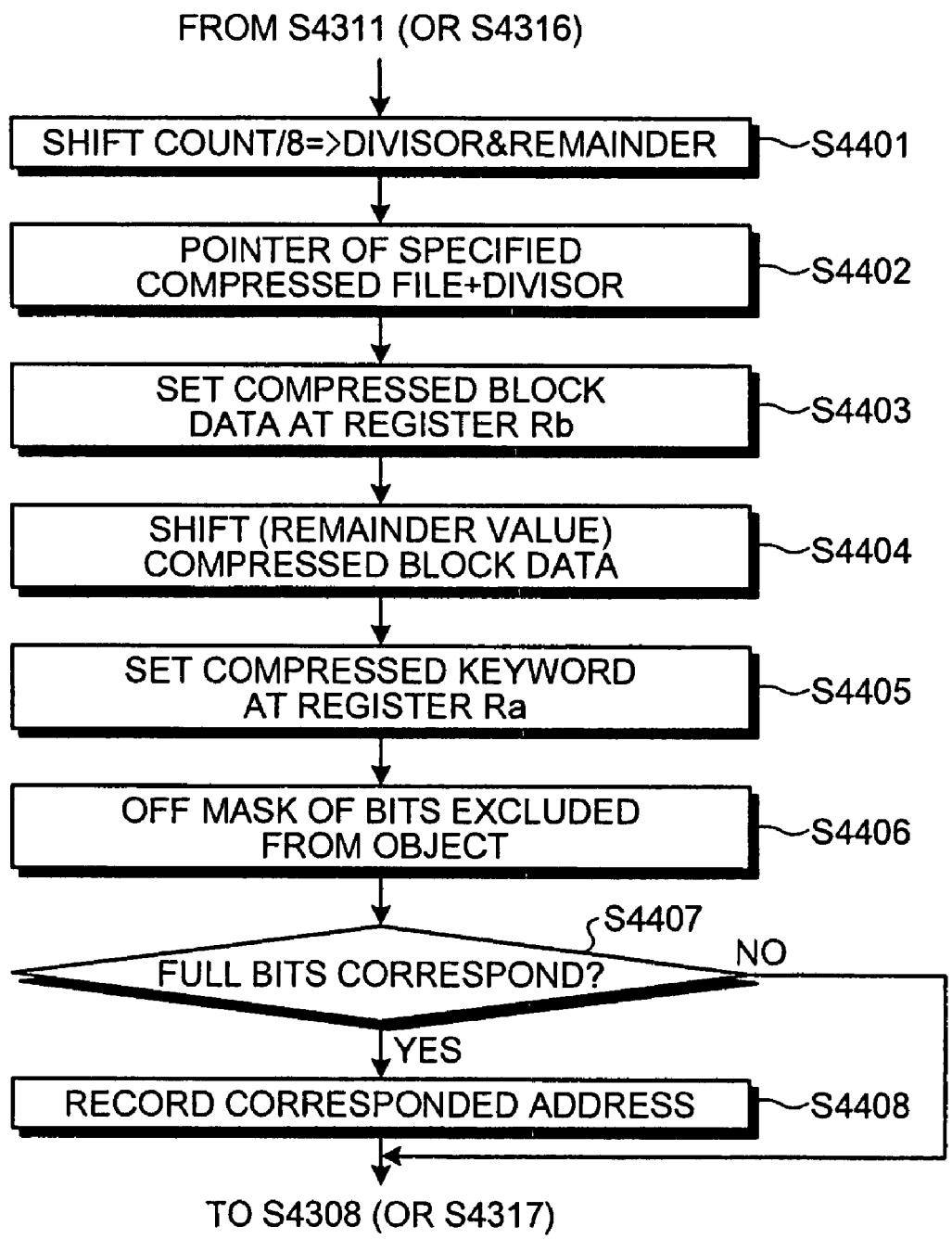
FIG. 44 is a flowchart of full-bit discrepancy verifying process.

FIG. 44 is a flowchart of full-bit discrepancy verifying process (steps S4312 and 4317). A shift count is divided by eight to obtain a divisor and a remainder (step S4401).

The divisor is added to a present pointer in the specified compressed file 3711 (step S4402). The compressed block data 3712 is set at the register Rb (step S4403). The compressed block data 3712 that is set is shifted by a value of the remainder (step S4404).

The compressed keyword 3702 is set at the register Ra (step S4405). Masks of bits excluded from verification object in the both registers Ra and Rb are switched off (step S4406). If full bits correspond (step S4407: YES), corresponding addresses are recorded (step S4408), and the process proceeds to the step S4308 (or S4317). On the other hand, if full bits do not correspond (step S4407: NO), the process proceeds to the step S4308 (or S4318).

According to the third embodiment, a discrepancy verifying system based on a per-byte operation, a forte of the CPU 101 of a computer, is realized for the specified compressed file 3711. In other words, for per-bit verification prediction, XOR is computed between the compressed keyword 3702 obtained by compressing the retrieval keyword 3701 input and the shift table 3900 that is an aggregation of data obtained by shifting the compressed keyword 3702 every one bit, and discrepancy verification is executed based on a result of the computing. The discrepancy verification speed may be improved by lengthening the interval for comparison with the specified compressed file 3711 depending upon compressed keyword lengths.

Although all the embodiments explain an HTML file as an exemplary file to be retrieved, a file to be retrieved may be a file such as XML that is described in other markup languages without limitation to HTML. Although all the embodiments substitute supplementary characters for combined characters, without limitation to combined characters, supplementary characters may also be substituted for tags of HTML or XML included in a file to be retrieved and then included in a combined character/supplementary character substitution table, thereby further enabling the compression rate of the file to be retrieved to be improved.

Thus the information retrieval apparatus, the information retrieval method, and the computer product according to the embodiments of the present invention are effective for improving the compression rate and the security of contents, and full text retrieval speed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium storing therein an information retrieval program to retrieve information from content that includes a plurality of files and causing a computer to execute:
generating compression information of the content including character data extracted from the content, an occurrence frequency of each of the character data in the content, and presence/absence information concerning a presence/absence of each of the character data in each of the files, wherein when the character data includes combined character data representing a predetermined sequential phonogram string, the combined character data is substituted by supplementary character data;
compressing the content to form a plurality of compressed files based on the occurrence frequency;
extracting a target file from among the compressed files based on the presence/absence information; and
decompressing the target file, wherein when the supplementary character data is included in the target file, the supplementary character data is substituted by the combined character data.

2. The computer-readable recording medium according to claim 1, wherein
the files include a plurality of character data types for each of which the compression information of the content is generated.

3. The computer-readable recording medium according to claim 1, wherein the files include binary data.

4. The computer-readable recording medium according to claim 1, wherein
the compressing includes compressing the content by a Huffman tree generated based on the occurrence frequency.

5. The computer-readable recording medium according to claim 1, wherein
the extracting includes:
receiving input of a retrieval keyword that includes retrieval character data;
extracting, from the compression information, presence/absence information of the retrieval character data;
specifying, based on the presence/absence information of each of the retrieval character data, the target file that includes all of the retrieval character data; and
the computer program further causes the computer to execute retrieving information equivalent or related to the retrieval keyword from the target file specified at the specifying.

6. The computer-readable recording medium according to claim 5, wherein
the computer program further causes the computer to execute:
compressing the retrieval keyword; and
determining whether a compressed retrieval keyword obtained at the compressing is included in the target file extracted at the extracting, and
the decompressing includes decompressing the target file that is determined at the determining to include the compressed retrieval keyword, and
the retrieving includes retrieving information equivalent or related to the retrieval keyword from a decompressed target file obtained at the decompressing.

7. The computer-readable recording medium according to claim 1, wherein
when the character data includes a tag, the tag is substituted by supplementary character data at the generating; and
when the supplementary character data is included in the target file, the supplementary character data is substituted by the tag at the decompressing.

8. The computer-readable recording medium according to claim 1, wherein
each of the files includes a plurality of block data each of which includes a predetermined number of characters and for each of which the compressing and the decompressing are performed.

9. The computer-readable recording medium according to claim 1, wherein the computer program further causes the computer to execute encrypting the compression information.

10. The computer-readable recording medium according to claim 9, wherein the computer program further causes the computer to execute:
decrypting the compression information encrypted at the encrypting;

compressing the retrieval keyword using a Huffman tree generated based on the compression information decrypted at the decrypting;

determining whether a compressed retrieval keyword obtained at the compressing is included in the target file extracted at the extracting, and the decompressing includes decompressing, by the Huffman tree, the target file determined at the determining to include the compressed retrieval keyword.

11. The computer-readable recording medium according to claim 10, wherein the determining includes:

comparing the compressed retrieval keyword and a plurality of bit strings obtained by shifting the compressed retrieval keyword by one bit increments to obtain a first result;

extracting a portion of the first result for each of the bit strings; and generating a verification prediction table including a shift count of each of the bit strings and the portion of the first result extracted at the extracting the portion of the first result, and the determining includes determining whether the compressed retrieval keyword is included in the target file using the verification prediction table.

12. The computer-readable recording medium according to claim 11, wherein the determining process further includes:

comparing a compressed block data in the target file and the compressed retrieval keyword to obtain a second result;

extracting a portion of the second result; and verifying a first discrepancy between the portion of the second result and the portion of the first result included in the verification prediction table.

13. The computer-readable recording medium according to claim 12, wherein the determining process further includes:

comparing new compressed block data obtained by shifting in byte increments in the target file and the compressed retrieval keyword when the first discrepancy is verified to obtain a third result;

extracting a portion of the third result; and verifying a second discrepancy between the portion of the third result and the portion of the first result included in the verification prediction table.

14. The computer-readable recording medium according to claim 13, wherein the comparing the compressed retrieval keyword/new compressed block data further includes comparing another compressed block data obtained by shifting in byte increments corresponding to a bit length of the compressed retrieval keyword in the target file and the compressed retrieval keyword when the first discrepancy is verified.

15. A computer-readable recording medium storing therein an information retrieval program to retrieve information from content that includes a plurality of files and causing a computer to execute:

extracting a first character data described in a first target file to be retrieved from the content;

computing an occurrence frequency of the first character data;

detecting a presence/absence of the first character data;

generating a first compression information of the first target file including the occurrence frequency of each of the first character data in the first target file, and presence/absence information of each of the first character data detected at the detecting the presence/absence of the first character data;

generating a Huffman tree based on the first compression information;

extracting a second character data described in a second target file to be retrieved from the content;

computing an occurrence frequency of the second character data;

detecting a presence/absence of the second character data;

compressing, using the Huffman tree, the second character data detected at the detecting the presence/absence of the second character data;

generating a second compression information of the content including the occurrence frequencies of each of the first character data and each of the second character data in the content, and the presence/absence information of each of the first character data and each of the second character data that are detected at the detecting; and encrypting the second compression information.

16. An information retrieval method to retrieve information from content that includes a plurality of files, the information retrieval method comprising:

generating compression information of the content including character data extracted from the content, an occurrence frequency of each of the character data in the content, and presence/absence information concerning a presence/absence of each of the character data in each of the files, wherein when the character data includes combined character data representing a predetermined sequential phonogram string, the combined character data is substituted by supplementary character data;

compressing the content to form a plurality of compressed files based on the occurrence frequency;

extracting a target file from among the compressed files based on the presence/absence information; and decompressing the target file, wherein when the supplementary character data is included in the target file, the supplementary character data is substituted by the combined character data.

17. An information retrieval apparatus that retrieves information from content that includes a plurality of files, the information retrieval apparatus comprising:

a generating unit that generates compression information of the content including character data extracted from the content, an occurrence frequency of each of the character data in the content, and presence/absence information concerning a presence/absence of each of the character data in each of the files, wherein when the character data includes combined character data representing a predetermined sequential phonogram string, the combined character data is substituted by supplementary character data;

a compressing unit that compresses the content to form a plurality of compressed files based on the occurrence frequency;

an extracting unit that extracts a target file from among the compressed files based on the presence/absence information; and a decompressing unit that decompresses the target file, wherein when the supplementary character data is included in the target file, the supplementary character data is substituted by the combined character data.

* * * * *